United States Patent
Miyasita et al.

[19]

[11] Patent Number: 5,875,245
[45] Date of Patent: Feb. 23, 1999

[54] HIGH VOLTAGE DETECTION CIRCUIT, BELL SIGNAL DETECTION CIRCUIT AND NON-RINGING RECEPTION DETECTION CIRCUIT

[75] Inventors: Tokio Miyasita; Tokuo Nakamura; Toshihiko Kotaka, all of Tokyo, Japan

[73] Assignee: Oki Electric Industry Co., Ltd., Tokyo, Japan

[21] Appl. No.: 891,104

[22] Filed: Jul. 10, 1997

[30] Foreign Application Priority Data

Nov. 25, 1996  [JP]  Japan .................................. 8-313936

[51] Int. Cl.$^6$ ............................. H04M 1/00; G08B 21/00
[52] U.S. Cl. ........................... 379/382; 340/660; 340/661
[58] Field of Search .................................. 379/382, 372, 379/375, 377, 402, 385, 399, 413; 340/660, 661; 307/112; 327/66, 288, 208, 57, 51, 100; 330/253, 257, 311; 323/311

[56] References Cited

U.S. PATENT DOCUMENTS

| | | | |
|---|---|---|---|
| 4,406,929 | 9/1983 | Pace et al. | 379/402 |
| 4,659,944 | 4/1987 | Miller, Sr. et al. | 327/97 |
| 5,202,916 | 4/1993 | Oliver | 379/106.04 |
| 5,636,273 | 6/1997 | Schopfer et al. | 379/412 |
| 5,684,874 | 11/1997 | Yagyu et al. | 379/382 |
| 5,745,563 | 4/1998 | Prentice | 379/399 |

*Primary Examiner*—Krista Zele
*Assistant Examiner*—Charles N. Appiah
*Attorney, Agent, or Firm*—Jones & Volentine L.L.P.

[57] ABSTRACT

In a high voltage detection circuit, a high voltage detection portion 10 constituted with, for instance, two constant voltage circuits 10a and 10c and a current mirror portion 10b, a strobe input 20 and an output communication device 30 are provided. This high voltage detection circuit outputs a high voltage detection signal S30 if an input voltage Vin, which is equal to or greater than a voltage value set by the constant voltage circuits 10a and 10c is supplied while a strobe control signal ST is provided. When high voltage detection on telephone lines is performed by such a high voltage detection circuit by inputting the results of the detection of a polarity inversion at telephone lines as a strobe control signal ST, only reception of bell signal can be detected. In addition, by resetting the results of polarity inversion detection using the results of high voltage detection, it is possible to identify a non-ringing reception that is not accompanied by a bell signal.

55 Claims, 26 Drawing Sheets

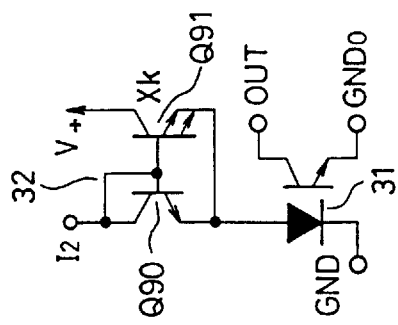
FIG.10(d)
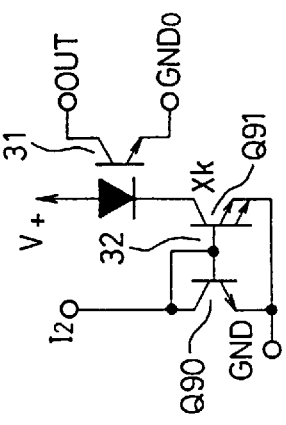
FIG.10(c)
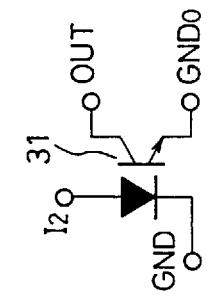
FIG.10(b)
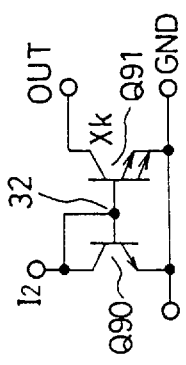
FIG.10(a)
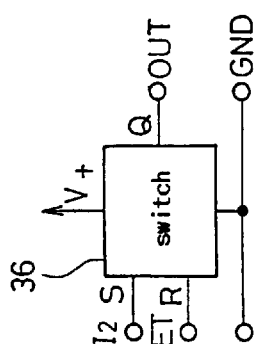
FIG.10(h)
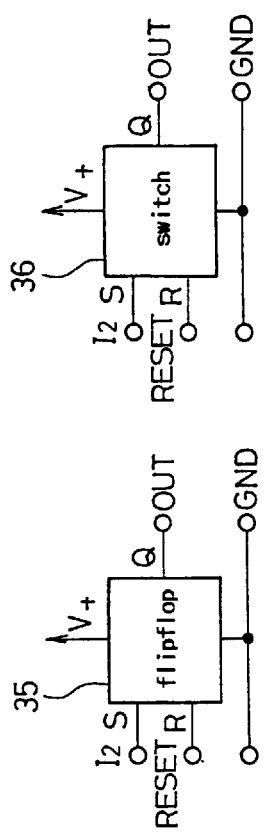
FIG.10(g)
FIG.10(f)
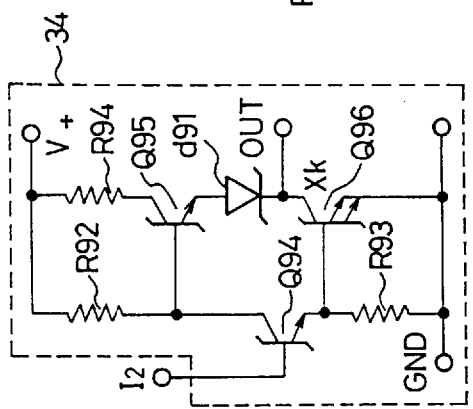
FIG.10(e)
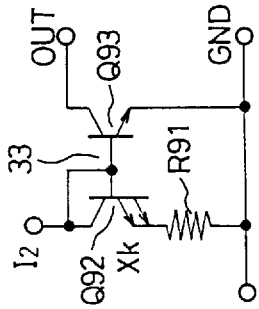

HIGH VOLTAGE DETECTION CIRCUIT, BELL SIGNAL DETECTION CIRCUIT AND NON-RINGING RECEPTION DETECTION CIRCUIT

BACKGROUND OF THE INVENTION

1. Field of the Invention

The present invention relates to a high voltage detection circuit and a bell signal detection circuit and a non-ringing reception detection circuit for a telephone line terminal employing the high voltage detection circuit.

2. Description of the Related Art

With a non-ringing terminal in the prior art that is connected to a pair of telephone lines, non-ringing call with a telephone station is implemented after identifying whether an incoming call is a normal call or a non-ringing call. Since non-ringing call is implemented by utilizing idle time on a telephone line when there are no normal calls, it is necessary to distinguish between the reception of a non-ringing call and the reception of a normal call. The telephone station makes this distinction based upon a change in the polarity inversion speed in a pair of telephone lines and the presence/absence of a bell signal.

In the case of a normal call, the polarity inversion is implemented at high speed from a standby state and then a bell signal with a high voltage amplitude is provided. In the case of non-ringing call, polarity inversion takes place at low speed with no bell signal provided.

A non-ringing terminal in the prior art is provided with a bell signal detection circuit that detects a bell signal by employing a high voltage detection circuit to selectively perform detection over a voltage range that is higher than the voltage between the lines in a standby state and lower than the voltage between the lines that will be used in an insulation test, a circuit that detects polarity inversion and the presence/absence of a bell signal thereafter, a slow polarity inversion detection circuit that detects the reception of a non-ringing call (non-ringing reception) by detecting a slow polarity inversion and the like, in order to differentiate between the reception of a normal call and the reception of a non-ringing call.

However, bell signal detection circuits employing a high voltage detection circuit, circuits for detecting non-ringing receptions, slow polarity inversion detection circuits and the like in the prior art have yet to address the following problems.

Since, in a bell signal detection circuit employing a high voltage detection circuit, the high voltage detection circuit detects an applied voltage that is equal to or greater than a preset voltage, if high voltage noise enters the telephone lines during a standby state, the circuit detects this noise as a bell signal. In addition, there is a problem in that it becomes impossible to implement an insulation test because during such a test, a current runs through the high voltage detection circuit.

While it is conceivable that a circuit capable of preventing high voltage detection during an insulation test could be constituted by employing a constant current circuit in which a constant current runs only within a preset voltage range, its structure would be complicated and, at any rate, if high voltage noise enters the telephone lines during a standby state, such noise would still be detected as a bell signal.

A circuit that detects a non-ringing reception by detecting polarity inversion and the presence/absence of a bell signal requires two or more photocouplers and the like that independently output the results of various detection. In addition, there is a problem with a slow polarity inversion detection circuit in that, since it employs both a polarity inversion detector in telephone lines and a holding circuit, its circuit structure becomes complicated and in that it always requires capacitors.

SUMMARY OF THE INVENTION

In order to solve the problems discussed above, in a first aspect of the present invention, a high voltage detection circuit that is provided with a voltage input terminal generates a high voltage detection signal to output to an external circuit when an input voltage input to the voltage input terminal is equal to or greater than a preset voltage value, comprises a current mirror portion, a means for strobe input, a constant voltage circuit and a means for output communication as described below.

The current mirror portion is provided with a current input terminal through which an input strobe current runs, a current output terminal through which an output current runs and a common terminal connected to the voltage input terminal, through which a current constituted with the sum of the currents running through the current input terminal and the current output terminal runs. The current mirror portion generates an output current achieved by linearly amplifying the strobe current for output via the current output terminal. The means for strobe input, which is connected between the current input terminal of the current mirror portion and a ground terminal, generates a strobe current while a strobe control signal is provided from the outside, to supply the strobe current to the current input terminal.

The constant voltage circuit, which is connected to the current output terminal of the current mirror portion, is provided with a function for detecting the voltage value of an input voltage supplied via the common terminal and the current output terminal of the current mirror portion and entering a continuous state to manifest constant voltage characteristics if the results of this detection indicate a value equal to or greater than a preset voltage value. The means for output communication, which is connected between the constant voltage circuit and a ground terminal, generates a high voltage detection signal based upon the output current from the current mirror portion that is input via the constant voltage circuit in a continuous state.

In a third aspect of the present invention, a high voltage detection circuit that is provided with a voltage input terminal generates a high voltage detection signal to output to an external circuit when an input voltage input to the voltage input terminal is equal to or greater than a preset voltage value, comprises a constant voltage circuit, a current mirror portion, a means for strobe input and a means for output communication as described below.

The constant voltage circuit, which is connected to the voltage input terminal, enters a continuous state to manifest constant voltage characteristics when the voltage value of the input voltage is equal to or greater than a preset voltage value. The current mirror portion is provided with a current input terminal through which an input strobe current runs, a current output terminal through which an output current runs and a common terminal, connected to the constant voltage circuit, through which a current constituted with the sum of the currents running through the current input terminal and the current output terminal runs. The current mirror portion generates an output current achieved by linearly amplifying the strobe current for output via the current output terminal.

The means for strobe input, which is connected between the current input terminal of the current mirror portion and a ground terminal, generates a strobe current to supply to the current input terminal of the current mirror portion while a strobe control signal is provided from the outside and the constant voltage circuit is in a continuous state. The means for output communication, which is connected between the current output terminal of the current mirror portion and a ground terminal, is provided with a function for generating a high voltage detection signal based upon the output current from the current mirror portion that has been input.

In a fifth aspect of the present invention, a high voltage detection circuit that is provided with a voltage input terminal generates a high voltage detection signal to output to an external circuit when an input voltage input to the voltage input terminal is equal to or greater than a preset voltage value, comprises a first constant voltage circuit, a current mirror portion, a means for strobe input, a second constant voltage circuit and a means for output communication as described below.

The first constant voltage circuit, which is connected to the voltage input terminal, enters a continuous state to manifest constant voltage characteristics when the voltage value of the input voltage is equal to or greater than a first voltage value. The current mirror portion, which is provided with a current input terminal through which an input strobe current runs, a current output terminal through which an output current runs and a common terminal connected to the first constant voltage circuit, through which a current constituted with the sum of the currents running through the current input terminal and the current output terminal runs. The current mirror portion generates an output current achieved by linearly amplifying the strobe current for output via the current output terminal.

The means for strobe input, which is connected between the current input terminal of the current mirror portion and a ground terminal, generates a strobe current to supply the strobe current to the current input terminal of the current mirror portion while a strobe control signal is provided from the outside and the first constant voltage circuit is in a continuous state. The second constant voltage circuit, which is connected to the current output terminal of the current mirror portion, detects the output voltage from the first constant voltage circuit supplied via the common terminal and the current output terminal of the current mirror portion and enters a continuous state to manifest constant voltage characteristics if the results of this detection indicate a value equal to or greater than a second voltage value. The means for output communication, which is connected between the second constant voltage circuit and a ground terminal generates a high voltage detection signal based upon the output current from the current mirror portion that is input via the second constant voltage circuit while it is in a continuous state. In addition, the preset voltage values for detecting a high voltage are set as a first voltage value and a second voltage value.

In second, fourth and sixth aspects of the present invention, a response speed limiting circuit that limits the speed with which the individual constant voltage circuits respond to an input voltage, is provided in the high voltage detection circuits of the first, third and fifth aspects of the present invention.

In a seventeenth aspect of the present invention, the bell signal detection circuit that is connected to a pair of telephone lines detects a high voltage bell signal provided after a polarity inversion in the telephone lines and generates a bell signal detection signal, comprises a polarity inversion detection circuit and a high voltage detection circuit as described below.

The polarity inversion detection circuit is provided with a full wave rectifier circuit that performs full wave rectification on the power feed from telephone lines, sets a source potential and a ground potential at a voltage with a constant polarity and supplies it to a polarity inversion edge detection portion which, upon receiving the source supplied by the full wave rectifier circuit, detects an edge of polarity inversion between the telephone lines, and a polarity inversion detection holding circuit that holds the polarity inversion edge detection information until a reset signal is provided from an external device or until the source supply from the full wave rectifier circuit is cut off before outputting a polarity inversion detection signal from an output terminal.

The high voltage detection circuit is constituted with the high voltage detection circuit in the first, third or fifth aspect of the present invention, which, with its voltage input terminal connected to the source potential output of the full wave rectifier circuit and a ground terminal connected to a ground potential, receives the polarity inversion detection signal from the polarity inversion detection holding circuit as a strobe control circuit and outputs the high voltage detection signal from the means for output communication as a bell signal detection signal.

In an eighteenth aspect of the present invention, the bell signal detection circuit that is connected to a pair of telephone lines detects a high voltage bell signal provided after a polarity inversion in the telephone lines and generates a bell signal detection signal, comprises a polarity inversion detection circuit and a high voltage detection circuit as described below.

The polarity inversion detection circuit is provided with a full wave rectifier circuit that performs full wave rectification on the power feed from telephone lines, sets a source potential and a ground potential at a voltage with a constant polarity and supplies it to a polarity inversion edge detection portion which, upon receiving the source supplied by the full wave rectifier circuit, detects an edge of polarity inversion between the telephone lines, and a polarity inversion detection holding circuit that holds the polarity inversion edge detection information until a reset signal is provided from an external device or until the source supply from the full wave rectifier circuit is cut off before outputting a polarity inversion detection signal from an output terminal.

The high voltage detection circuit is constituted with the high voltage detection circuit in the second, fourth or sixth aspect of the present invention, which, with its voltage input terminal connected to the source potential output of the full wave rectifier circuit and a ground terminal connected to a ground potential, receives the polarity inversion detection signal from the polarity inversion detection holding circuit as a strobe control circuit and outputs the high voltage detection signal from the means for output communication as a bell signal detection signal.

In a twenty-third aspect of the present invention, a non-ringing reception detection circuit, which is connected to a pair of telephone lines, outputs polarity inversion information by detecting a polarity inversion in the telephone lines that indicates a call reception and, using an external device to identify the format of the polarity inversion information output signal, i.e., whether the signal has a return-to-zero portion (reception of a normal call) or constitutes a direct current signal with no return-to-zero portion (reception of non-ringing call), detects a non-ringing call reception within a detection attention area (anticipated bell signal reception time range), comprises a polarity inversion detection circuit, a means for polarity inversion detection output communication, a high voltage detection circuit, a means for reset input and a means for OR, as described below.

The polarity inversion detection circuit is provided with a full wave rectifier circuit that performs full wave rectification on the power feed from telephone lines, sets a source potential and a ground potential at a voltage with a constant polarity and supplies it to a polarity inversion edge detection portion which, upon receiving the source supplied by the full wave rectifier circuit, detects an edge of polarity inversion between the telephone lines, and a polarity inversion detection holding circuit that holds the polarity inversion edge detection information until a reset signal is provided from an external device or until the source supply from the full wave rectifier circuit is cut off before outputting a polarity inversion detection signal from an output terminal.

The means for polarity inversion detection output communication outputs polarity inversion information to an external device when a polarity inversion detection signal is provided by the polarity inversion detection holding circuit. The high voltage detection circuit is constituted with the high voltage detection circuit in the first, third or fifth aspect of the present invention, which, with its voltage input terminal connected to the source potential output of the full wave rectifier circuit and a ground terminal connected to a ground potential, receives the polarity inversion detection signal from the polarity inversion detection holding circuit as a strobe control circuit and outputs the high voltage detection signal from the means for output communication as a bell signal detection signal. The means for reset input receives a reset input signal provided from the outside. The means for OR determines the OR logic constituted with the reset input signal provided via the means for reset input and a high voltage detection signal output by the high voltage detection circuit and provides the polarity inversion detection holding circuit with the results of the OR logic calculation as a reset signal.

In a twenty-fourth aspect of the present invention, a non-ringing reception detection circuit which, connected to a pair of telephone lines, outputs polarity inversion information by detecting a polarity inversion in the telephone lines that indicates a call reception and indicates to an external device that a non-ringing call has been received in correspondence to the state of the polarity inversion information, comprises a polarity inversion detection circuit, a means for polarity inversion detection output communication, a high voltage detection circuit, a means for reset input and a means for OR as described below.

The polarity inversion detection circuit is provided with a full wave rectifier circuit that performs full wave rectification on the power feed from telephone lines, sets a source potential and a ground potential at a voltage with a constant polarity and supplies it to a polarity inversion edge detection portion which, upon receiving the source supplied by the full wave rectifier circuit, detects an edge of polarity inversion between the telephone lines, and a polarity inversion detection holding circuit that holds the polarity inversion edge detection information until a reset signal is provided from an external device or until the source supply from the full wave rectifier circuit is cut off before outputting a polarity inversion detection signal from an output terminal.

The means for polarity inversion detection output communication outputs polarity inversion information to an external device when a polarity inversion detection signal is provided by the polarity inversion detection holding circuit. The high voltage detection circuit is constituted with the high voltage detection circuit in the second, fourth or sixth aspect of the present invention, which, with its voltage input terminal connected to the source potential output of the full wave rectifier circuit and a ground terminal connected to a ground potential, receives the polarity inversion detection signal from the polarity inversion detection holding circuit as a strobe control signal and outputs the high voltage detection signal from the means for output communication as a bell signal detection signal. The means for reset input receives a reset input signal provided from the outside. The means for OR determines the OR logic constituted with the reset input signal provided via the means for reset input and a high voltage detection signal output by the high voltage detection circuit and provides the polarity inversion detection holding circuit with the results of the OR logic calculation as a reset signal.

In the first aspect of the present invention, the means for strobe input outputs a strobe current while a strobe control signal is being provided. The voltage value of the input voltage is detected at the constant voltage circuit in this state, and only when the detected value is equal to or greater than a preset voltage value, the constant voltage circuit enters a continuous state. The output current from the current mirror portion that is input via the constant voltage circuit in the continuous state is supplied to the means for output communication, and a high voltage detection signal is thereby output.

In the third aspect of the present invention, the constant voltage circuit enters a continuous state while a strobe control signal being provided, the voltage value of the input voltage is equal to or greater than a preset voltage value. At this point, the current mirror portion becomes activated, and the current from the current mirror portion is supplied to the means for output communication. The means for output communication generates a high voltage detection signal and outputs this to an external circuit.

In the fifth aspect of the present invention, the first constant voltage circuit enters the continuous state when, with a strobe control signal being provided, the voltage value of the input voltage is equal to or greater than the first voltage value. At this point, the current mirror portion becomes activated. When the input voltage further rises to reach the second voltage value, the second constant voltage circuit enters a continuous state, and the output current from the current mirror portion is supplied to the means for output communication. The means for output communication generates a high voltage detection signal and outputs this to a external circuit.

In the second, fourth and sixth aspects of the present invention, the response speed limiting circuit provided in the constant voltage circuit in the first, third or fifth aspect of the present invention outputs the results of high voltage detection without errors caused by noise.

In the seventeenth and eighteenth aspects of the present invention, when a polarity inversion occurs in the telephone lines, the polarity inversion is detected at the polarity inversion edge detection portion and is held at the polarity inversion detection holding circuit. The polarity inversion detection signal output by the polarity inversion detection holding circuit constitutes a strobe control signal for the voltage detection circuit.

While the signal is being provided, a high voltage detection circuit detects a high voltage that corresponds to a bell signal, and outputs a high voltage detection signal that constitutes a bell signal detection signal.

In the twenty-third and twenty-fourth aspects of the present invention, when a polarity inversion occurs in the telephone lines, the polarity inversion is detected at the polarity inversion edge detection portion and held at the polarity inversion detection holding circuit. A polarity inversion detection signal is output by the polarity inversion detection holding circuit and polarity inversion information is output by the means for polarity inversion detection output communication to the outside. If the bell signal does not arrive after a polarity inversion, the polarity inversion detection holding is sustained, whereas if a bell signal is provided, the high voltage detection circuit outputs a high voltage detection signal. This high voltage detection signal resets the polarity inversion detection holding circuit and the polarity inversion information output by the means for polarity inversion detection output communication is reset to 0. Since the bell signal alternates, while the bell signal is provided, the polarity inversion information alternately repeats detection holding and the return-to-zero implemented by a reset. It is possible to verify non-ringing reception by observing the presence/absence of a return-to-zero in the polarity inversion information by employing an external device. Thus, the problems discussed earlier are solved.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate preferred embodiments.

In the drawings:

FIG. 10A–10H shows circuit diagrams illustrating structural examples of the means for output communication 30 in FIG. 1;

DETAILED DESCRIPTION OF THE PREFERRED EMBODIMENTS

First Embodiment

Figure 1:
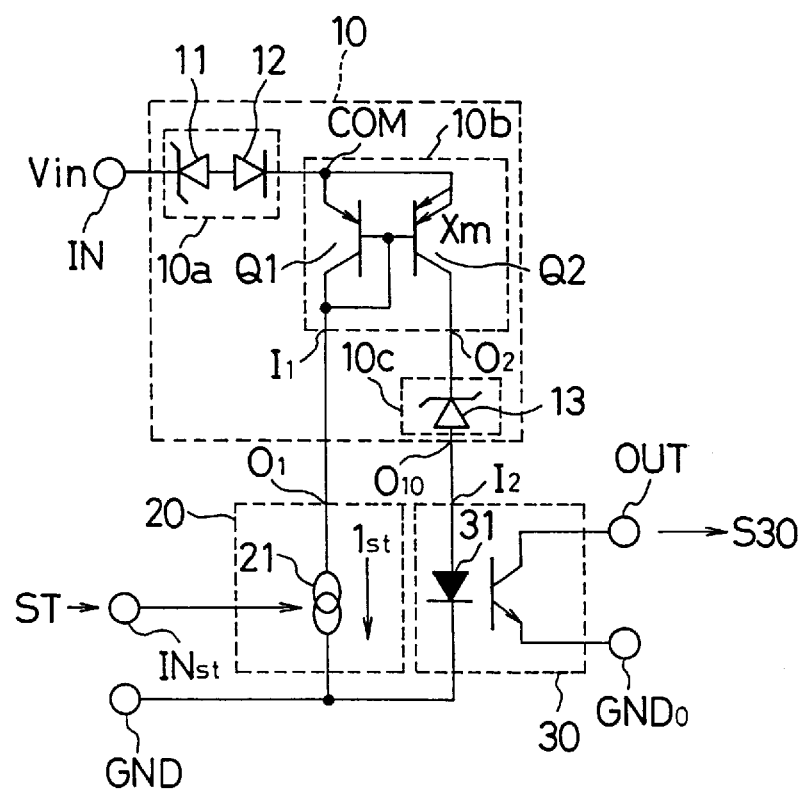
FIG. 1 is a circuit diagram of the high voltage detection circuit in the first embodiment according to the present invention.

FIG. 1 is a circuit diagram of the high voltage detection circuit in the first embodiment according to the present invention.

This high voltage detection circuit, which detects a high voltage supplied to a voltage input terminal IN1 and outputs a high voltage detection signal while a strobe control signal ST is provided, comprises a high voltage detection portion 10 provided between the voltage input terminal IN1 and a ground terminal GND, a means for strobe input 20 and a means for output communication 30.

The high voltage detection portion 10 is provided with a first constant voltage circuit 10a connected to the voltage input terminal IN1, a current mirror portion 10b constituted of a linear current amplifier circuit and a second constant voltage circuit 10c connected to an output terminal of the current mirror portion 10b. The constant voltage circuit 10a is constituted with a zener diode 11 whose cathode is connected to the voltage input terminal IN1 and a diode 12 whose anode is connected to the anode of the zener diode 11. The current mirror portion 10b is provided with pnp transistors Q1 and Q2 whose emitters are connected to each other at a common terminal COM. The collector of the transistor Q1 is connected to the bases of the transistors Q1 and Q2. The collector of the transistor Q1 constitutes an input terminal I1 of the current mirror portion 10b and the collector of the transistor Q2 constitutes an output terminal 02 of the current mirror portion 10b. The current mirror portion 10b is provided with a function for supplying a current that is in proportion to the current supplied to the input terminal I1, to the output terminal 02, and a current constituted with the sum of the currents running through the input terminal I1 and the output terminal 02 runs through the common terminal COM. The common terminal COM is connected to the cathode of the diode 12 in the constant voltage circuit 10a. The constant voltage circuit 10c is constituted with a zener diode 13. The cathode of the zener diode 13 is connected to the output terminal 02 of the current mirror portion 10b, whereas the anode of the zener diode 13 constitutes an output terminal 010 of the high voltage detection portion 10.

The means for strobe input 20 is constituted with, for instance, a constant current circuit 21 connected between the ground GND terminal and an output terminal 01 of the means for strobe input 20. The constant current circuit 21, which is an on/off controlling constant current circuit, is turned on when the strobe control signal ST is provided via a strobe terminal INst and enters an off state when the strobe control signal ST is not provided. The constant current circuit 21 is provided with a function for outputting a constant strobe current ist when it enters the on state. The constant strobe current ist runs through the output terminal 01. The output terminal 01 is connected to the input terminal I1 of the current mirror portion 10b.

The means for output communication 30 is constituted with a photocoupler 31 whose input side is connected between an input terminal I2 of the means for output communication 30 and the ground terminal GND. A high voltage detection signal S30 is output from the output side of the photocoupler 31. The input terminal I2 is connected to the output terminal 010 of the high voltage detection portion 10.

The following is an explanation of the operation of the high voltage detection circuit shown in FIG. 1.

Let us contemplate a state in which the first and second constant voltage circuits 10a and 10c are shorted. When an input voltage of several volts is applied to the voltage input terminal IN1 of the high voltage detection circuit and the strobe control signal ST is input from the strobe terminal INst in this state, the constant current circuit 21 in the means for strobe input 20 supplies the strobe current ist to the output terminal 01. This current ist travels through the voltage input terminal IN1, the shorted constant voltage circuit 10a, the common terminal COM and the input terminal I1 of the current mirror portion 10b in the high voltage detection portion 10b before reaching the ground terminal GND. At this point, a current that corresponds to the strobe current ist is output from the output terminal 02 of the current mirror portion 10b, to travel through the shorted constant voltage circuit 10c before running through the input terminal I2 of the means for output communication 30. The photocoupler 31 outputs the high voltage detection signal S30, which is based upon the current input through the input terminal I2, to an external circuit through an output terminal OUT.

The operation is performed as explained below in a state in which the constant voltage circuits 10a and 10c are not shorted.

Let us contemplate a situation in which, a strobe control signal ST is input to the strobe terminal INst before applying a voltage Vin to the voltage input terminal IN1, or the reverse case, in which the voltage Vin is applied to the voltage input terminal IN1 before inputting the strobe control signal ST to the strobe terminal INst (either order is permissible). If the constant current circuit 21 with the on/off function in the means for strobe input 20 is not a mathematically ideal constant current circuit but is, instead, a constant current circuit constituted with a transistor and a resistor, the strobe current ist does not run to the voltage input terminal IN1, the common terminal COM and the input terminal I1 of the current mirror portion 10b in the high voltage detection portion 10b in a state in which the input voltage Vin at the voltage input terminal IN1 is low with the constant voltage circuit 10a in a non continuous state. As a result, current does not run to all of the nodes.

As the input voltage Vin rises and exceeds the voltage level that allows the constant voltage circuit 10a to enter a continuous state (the breakdown voltage level of the zener diode 11), the strobe current ist runs from the voltage input terminal IN1 to the constant voltage circuit 10a, the common terminal COM and the input terminal I1 of the current mirror portion, the output terminal 01 of the means for strobe input 20 and the ground terminal GND. A diode for level shift 12 is connected to the zener diode 11 of the constant voltage circuit 10a and at this point, the constant voltage circuit 10c has not yet entered a continuous state. Consequently, no current runs through the path extending from the output terminal 02 of the current mirror portion 10b through the constant voltage circuit 10c to reach the photocoupler 31 of the means for output communication 30.

When the input voltage Vin further rises and the voltage applied to the constant voltage circuit 10c exceeds the breakdown voltage level of the zener diode 13 inside the constant voltage circuit 10c, a current runs through a path that extends from the voltage input terminal IN1 through the constant voltage circuit 10a, the common terminal COM of the current mirror portion, the input terminal I1 of the current mirror portion 10b and the means for strobe input 20, reaching the ground terminal GND and a path extending from the common terminal COM of the current mirror portion through the output terminal 02 of the current mirror portion 10b, the constant voltage circuit 10c, the output terminal 010 of the high voltage detection portion 10 and the means for output communication 30, reaching the ground terminal GND. Then, the high voltage detection signal S30 is output from the output side of the photocoupler 31 of the means for output 30 to an external circuit.

When the input voltage Vin is lowered from the state in which the means for output communication 30 is outputting the high voltage detection signal S30, the continuity of the constant voltage circuit 10c becomes disabled, no input current runs through the means for output communication 30 and the high voltage detection signal is set to 0, in the reverse order from that followed when the voltage is rising. As the input voltage Vin further decreases, the continuity of the constant voltage circuit 10a is disabled and the current throughout the entire high voltage detection circuit is set to 0. When the strobe control signal ST is reset to 0, the operation returns to a standby state.

When the strobe control signal ST is set to 0 in the state in which a high voltage at the input terminal IN1 is detected and the high voltage detection signal S30 is output from the photocoupler 31 of the means for output communication 30, the input current ist at the current mirror portion 10b of the high voltage detection portion 10 is set to 0, resulting in the current running throughout the entire high voltage detection circuit being set to 0, which in turn sets the high voltage detection signal S30 to 0.

In other words, when the strobe control signal ST is input to the strobe terminal INst of the high voltage detection circuit and the input voltage Vin at the voltage input terminal IN1 exceeds the voltage value set at the first and second constant voltage circuits 10a and 10c, a current that corresponds to the strobe current ist is output from the output terminal 010 of the high voltage detection portion 10. When the strobe control signal ST is at 0 or when the input voltage Vin does not exceed the preset voltage, the output current at the output terminal 010 is at 0. In correspondence to the presence/absence of an output current from the output terminal 010, the means for output communication 30 outputs the high voltage detection signal S30 to the external circuit.

While the structure and the operation of the high voltage detection circuit shown in FIG. 1 are explained above, the structure of a high voltage detection circuit with a strobe that outputs a high voltage detection signal S30 by detecting a high voltage while a strobe control signal ST is provided is not limited to that shown in FIG. 1. Variations of the high voltage detection circuit (I) and advantages of the high voltage detection circuit (II) are separately explained below.

(I) Variations of the high voltage detection circuit

Variations of the individual portions of the high voltage detection circuit are explained in (I) (1) through (I) (4) below.

(I) (1) Current mirror portion 10b

FIGS. 2(a) through (d) are circuit diagrams illustrating structural examples of the current mirror portion 10b shown in FIG. 1.

Figure 2A:
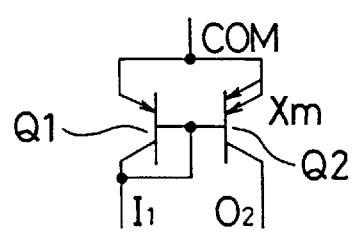
FIG. 2A–2D shows circuit diagrams illustrating structural examples of the current mirror portion 10b in FIG. 1.

While FIG. 2(a) shows the transistors Q1 and Q2 constituting the current mirror portion 10b in FIG. 1, the current mirror portion 10b, with the directions of the input current and the output current (inflow and outflow) matching, the relationship between the input current and the output current is linear and a current constituted with the sum of the input current and the output current running through the common terminal COM, is only required to ensure that if the output current is forcibly set to 0 when an input current is present, a state in which the output terminal 02 and the common terminal COM can be considered to be shorted is entered. Thus, the current mirror portion 10b may be constituted with one of the circuits shown in FIGS. 2(b) through (d).

Figure 2B:
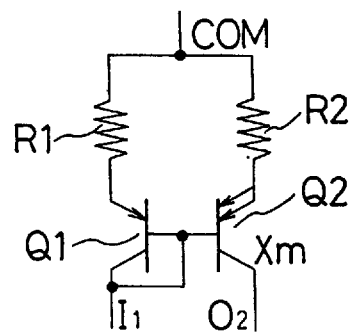
Figure 2C:
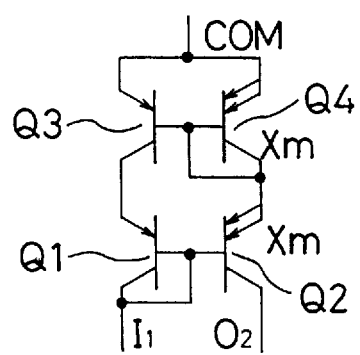
Figure 2D:
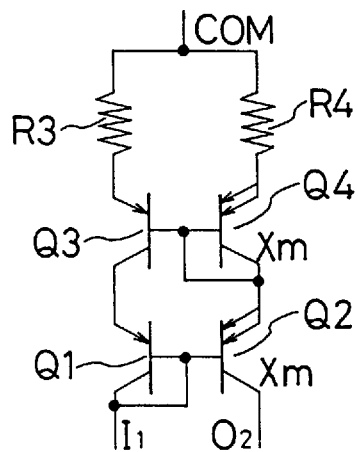

The circuit shown in FIG. 2(b) is provided with emitter resistors R1 and R2, respectively positioned between the emitter of the transistor Q1 and the common terminal COM and between the emitter of the transistor Q2 and the common terminal COM. The circuit shown in FIG. 2(c) is constituted by providing pnp transistors Q3 and Q4 in the circuit shown in FIG. 2(a). The emitter of the transistor Q3 is connected to the common terminal COM, whereas the collector of the transistor Q3 is connected to the emitter of the transistor Q1. The emitter of the transistor Q4 is connected to the common terminal COM, whereas the collector of the transistor Q4 is connected to the emitter of the transistor Q2. The bases of the transistors Q3 and Q4 are connected to the collector of the transistor Q4. The circuit shown in FIG. 2(d) is constituted by providing emitter resistors R3 and R4 respectively positioned between the emitter of the transistor Q3 and the common terminal COM and between the emitter of the transistor Q4 and the common terminal COM.

While pnp transistors are employed in the circuits shown in FIGS. 2(a) through (d), polarity inversion can be achieved by employing npn transistors.

(I) (2) Constant voltage circuits 10a and 10c

The first and second constant voltage circuits 10a and 10c may be utilized together but either of them is capable of operating alone. When both of them are utilized, the constant voltage circuit 10a first enters a continuous state and then the second constant voltage circuit 10c enters a continuous state. Since the effective voltage values at the first and second constant voltage circuits 10a and 10c are the values achieved in a state in which a current determined in correspondence to the strobe current ist is running, the forward bias diode 12 can also be utilized as a constant voltage element whose preset voltage does not become unstable, and the detection threshold of the voltage can be set by stepping the voltage level at the forward bias diode 12 employed in combination with the zener diode 11.

In FIG. 1, the current mirror portion 10b is constituted with pnp transistors, the constant voltage circuit 10a is structured in such a manner that it manifests constant voltage characteristics when the potential at the voltage input terminal IN1 is at high and the constant voltage circuit 10c is structured in such a manner that it manifests constant voltage characteristics when the potential at the output terminal 010 of the high voltage detection portion 10 is at low. The high voltage detection circuit is structured so that the strobe current ist and the output current from the output terminal 010 run toward the ground terminal GND and a voltage that is higher than the voltage at the ground terminal GND is detected. This circuit may be constituted as a circuit that detects a high voltage that is low relative to the voltage at the ground terminal GND by replacing the transistors Q1 and Q2 of the current mirror portion 10b with npn transistors as mentioned earlier and inverting the polarities of the constant voltage circuits 10a and 10c to achieve a structure in which the strobe current ist and the output current run to the high voltage detection portion 10 from the ground terminal GND.

By adding a response speed limiting circuit to the first constant voltage circuit 10a or the second constant voltage circuit 10c, the high frequency component in the input noise can be eliminated, resulting in a reduction in erroneous operation caused by noise.

Figure 3:
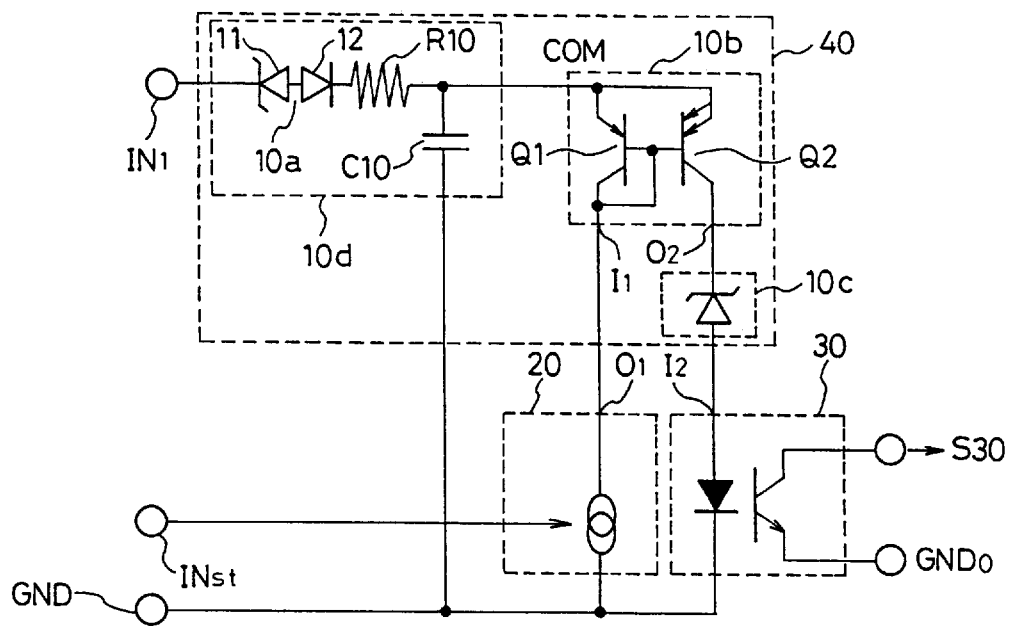
FIG. 3 is a circuit diagram showing a high voltage detection circuit achieved by adding a response speed limiting circuit to the constant voltage circuit 10a in FIG. 1.

FIG. 3 is a circuit diagram of a high voltage detection circuit with a response speed limiting circuit added to the constant voltage circuit 10a shown in FIG. 1, with the same reference numbers assigned to elements that are identical to those in FIG. 1.

The high voltage detection circuit shown in FIG. 3 is provided with the means for strobe input 20 and the means for output communication 30 that are both identical to those in FIG. 1 and a high voltage detection portion 40 which is structured differently from that in FIG. 1. The feature that differentiates the high voltage detection portion 40 from the high voltage detection portion 10 is its first constant voltage circuit 10d. Its other features, i.e., the current mirror portion 10b and the second constant voltage circuit 10c are identical to those in the high voltage detection portion 10 shown in FIG. 1.

The constant voltage circuit 10d is provided with a zener diode 11 whose cathode is connected to the voltage input terminal IN1 and a diode 12 whose anode is connected to the anode of the zener diode 11. It is further provided with a resistor R10, one end of which is connected to the cathode of the diode 12 and a capacitor C10, which is connected between the other end of the resistor R10 and the ground terminal GND. The connection point of the resistor R10 and the capacitor C10 is connected to the common terminal COM of the current mirror portion 10b. The resistor R10 and the capacitor C10 constitute a response speed limiting circuit employing a low pass filter system to eliminate the high frequency component of the noise in the input voltage Vin.

Figure 4A:
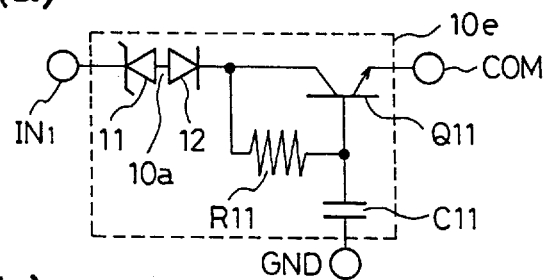
FIG 4A–4B shows circuit diagrams illustrating other structural examples of the first constant voltage circuit in FIG. 3.

FIGS. 4(a) and (b) are circuit diagrams illustrating other structural examples of the first constant voltage circuit shown in FIG. 3.

The structure of the first constant voltage circuit with the response speed limiting circuit additionally provided is not limited to that shown in FIG. 3, and the first constant voltage circuit may be replaced with the constant voltage circuit 10e or 10f shown in FIGS. 4(a) or (b).

The constant voltage circuit 10e shown in FIG. 4(a) is provided with a zener diode 11 and a diode 12 which are connected in a manner similar to that shown in FIG. 3. The cathode of the diode 12 is connected to one end of a resistor R11 and also connected to the collector of an npn transistor Q11. The other end of the resistor R11 is connected to one of the electrodes of a capacitor C11 and also connected to the base of the transistor Q11. The other electrode of the capacitor C11 is connected to the ground terminal GND. The emitter of the transistor Q11 is connected to the common terminal COM of the current mirror portion 10b (not shown). The capacitor C11 and the resistor R11 constitute a response speed limiting circuit.

The constant voltage circuit 10d shown in FIG. 3 requires a large capacitor C10 in order to assure a specific time constant, since the main current runs through the resistor R10, generating a large voltage drop and, therefore, the resistance at the resistor R10 cannot be high. However, in the constant voltage circuit 10e shown in FIG. 4(a), the main current runs through the transistor Q11 and does not run to the resistor R11, making it possible to set a high resistance value at the resistor R11, thereby allowing the capacitance of the capacitor C11 to be reduced. In addition, in the structure shown in FIG. 4(a), since the difference in the potential is small between the collector and the base of the transistor Q11 in a steady operating state, if a large-amplitude change in input occurs with in the direction in which the input voltage Vin decreases from a steady state, a forward bias between the collector and the base of the transistor Q11 arises and, consequently, the transistor stops operation. As a result, the rising side performs a response speed limiting operation based upon the CR time constant in response to a change in the input with a large amplitude, whereas at the falling side, the capacitor C11 is directly discharged with the output constant current ist of the means for strobe input 20. Consequently, a response operation in which the voltage drops linearly at a high speed is performed.

Figure 4B:
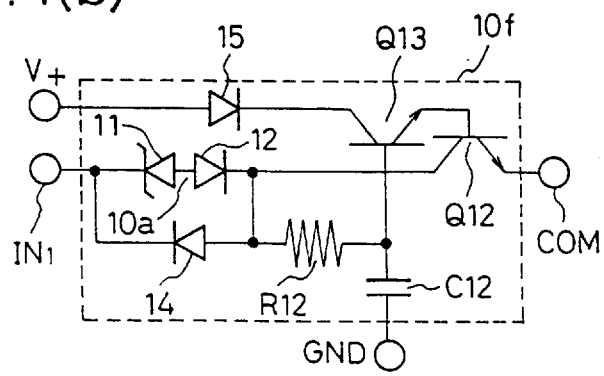

The constant voltage circuit 10f in FIG. 4(b) is provided with a zener diode 11 and a diode 12 which are connected in a manner similar to that shown in FIGS. 1 and 3. The cathode of the diode 12 is connected to one end of a resistor R12 and is also connected to the collector of an npn transistor Q12 and the anode of a diode 14. The other end of the resistor R12 is connected to one of the electrodes of a capacitor C12 and also connected to the base of a transistor Q13. The other electrode of the capacitor C12 is connected to the ground terminal GND. The cathode of the diode 14 is connected to the voltage input terminal IN1. The emitter of the transistor Q12 is connected to the common terminal COM of the current mirror portion 10b (not shown). The cathode of a diode for reverse current prevention 15 is connected to the collector of the transistor Q13 with the anode of the diode 15 connected to a positive source potential V+. The emitter of the transistor Q13 is connected to the base of the transistor Q12.

In the circuit shown in FIG. 4(b), it becomes possible for the transistor Q13, whose base is connected to the connection point of the resistor R12 and the capacitor C12, to operate in an active state at all times. As for the transistor Q12, since it becomes active when the input voltage Vin rises, the constant voltage circuit 10f performs an operation which is almost identical to that performed by the constant voltage circuit 10e shown in FIG. 4(a). However, during a fall of the input voltage Vin, when the circuit constituted with the zener diode 11 and the diode 12, which corresponds to the constant voltage circuit 10a in FIG. 1, enters anon continuous state, the transistor Q12 operates in saturation, resulting in an output current based upon the means for strobe input 20 running through the transistor Q13 and the discharge current of the capacitor C12 constituting a current that is determined by the difference in the potential at the base of the transistor Q13 and at the emitter of the transistor Q12 (approximately the value of the voltage applied at the resistor R12 when the diode 14 is not provided) and the resistor R12. Thus, with this constant voltage circuit 10f, response speed limiting is also possible at the following side. The diode 14 prevents current running in the reverse direction at the constant voltage circuit 10a during its falling operation and may be omitted.

The diode for reverse current prevention 15 may be omitted if there is no likelihood of a reverse current occurring, with the potential of a DC source potential V+supplied to the collector of the transistor Q13 being sufficiently high. In addition, the collector of the transistor Q13 may be connected to the voltage input terminal IN1 via the diode 15. In this case, the transistor Q13 can perform active operation within a range of potential change which corresponds to the voltage drops at the zener diode 11 and the diode 12.

Figure 5:
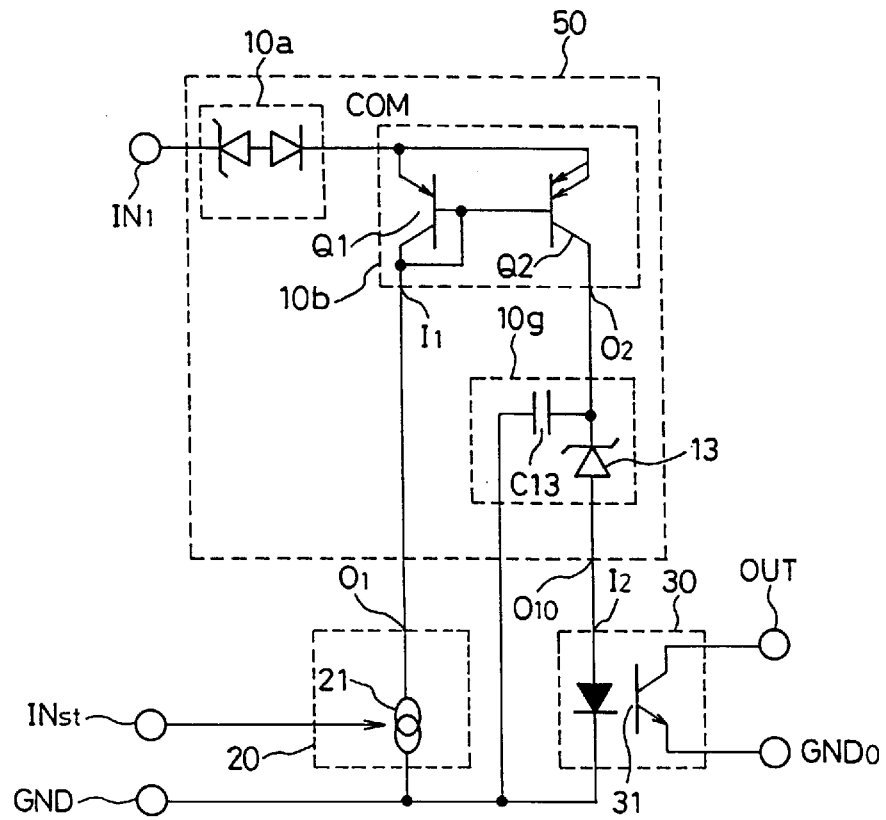
FIG. 5 is a circuit diagram showing a high voltage detection circuit achieved by adding a response speed limiting circuit to the constant voltage circuit 10c in FIG. 1.

FIG. 5 is a circuit diagram illustrating a high voltage detection circuit with a response speed limiting circuit added to the constant voltage circuit 10c shown in FIG. 1, with the same reference numbers assigned to components that are identical to those shown in FIG. 1.

The high voltage detection circuit shown in FIG. 5 is provided with the means for strobe input 20 and the means for output communication 30, which are identical to those in FIG. 1, and a high voltage detection portion 50 that is structured differently from that shown in FIG. 1. The feature that differentiates the high voltage detection portion 50 from the high voltage detection portion 10 shown in FIG. 1 is a second constant voltage circuit 10g. Its other features, i. e., the current mirror portion 10b and the first constant voltage circuit 10a are identical to those in the high voltage detection portion 10.

The constant voltage circuit 10g is provided with a zener diode 13 whose cathode is connected to the output terminal 02 of the current mirror portion 10b and a capacitor C13 one of whose electrodes is connected to the output terminal 02. The anode of the zener diode 13 is connected to the means for output communication 30 in a manner identical to the one shown in FIG. 1. The other diode of the capacitor C13 is connected to the ground terminal GND. The capacitor C13 delays the point in time at which the zener diode 13 enters a continuous state after the current mirror portion 10b starts to output an output current in response to a rising voltage determined by the output current from the current mirror portion 10b and the capacitor C13. This delay in time is an effective means for response speed limiting. As for falling response, since the zener diode 13 enters a non continuous state within a short time, very little response speed limiting effect is observed and is not significant in practice. When the input voltage Vin decreases and the collector connection in the output transistor of the current mirror portion 10b produces a forward bias, the accumulated charge in the capacitor C13 is discharged by the current that runs from the output terminal 02 of the current mirror portion 10*b* to the input terminal I1 and to the means for strobe input 20, to await the next rise response.

Figure 6:
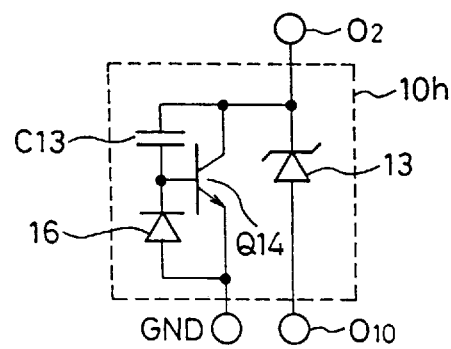
FIG. 6 is a circuit diagram illustrating another structural example of the second constant voltage circuit in FIG. 3.

FIG. 6 is a circuit diagram illustrating another structural example of the second constant voltage circuit shown in FIG. 5.

The constant voltage circuit 10*h* in FIG. 6 is constituted by adding a transistor Q14 and a diode 16 to the constant voltage circuit shown in FIG. 5. In other words, it is provided with a zener diode 13 whose cathode is connected to the output terminal 02 of the current mirror portion 10*b*, a capacitor C13, one of whose electrodes is connected to the output terminal 02 and a transistor Q14 whose collector is connected to the output terminal 02. The anode of the zener diode 13 is connected to the means for output communication 30 in a manner similar to that shown in FIG. 1. The other electrode of the capacitor C13 is connected to the cathode of the diode 16 and the base of the transistor Q14, with the anode of the diode and the emitter of the transistor Q14 connected to the ground terminal GND. The capacitor C13 and the transistor Q14 constitute a mirror capacitor to achieve a reduction in the capacitance of the capacitor C13. In addition, since it is not engaged in an operation as a mirror capacitor during a discharge, a quick recovery is achieved. The diode 16 constitutes a discharge path for the capacitor C13.

While the structure of the response limiting circuit is not limited to those in the circuit examples explained above, since the input has a large amplitude and the zener diodes 11 and 13 and the diode 12, which constitute the first and second constant voltage circuits, operate in a non-linear manner, the response speed will normally differ at the rising side and the falling side. A suitable circuit should be employed depending upon at which side noise is to be eliminated.

(I) (3) Means for strobe input 20

FIGS. 7(*a*) through (*f*) are circuit diagrams illustrating structural examples of the means for strobe input 20 in FIG. 1.

The means for strobe input 20 may be constituted with a circuit other than the on/off controlling constant current circuit which supplies a constant strobe current Ist when the strobe control signal ST is provided as shown in FIG. 1. FIGS. 7(*a*) through (*f*) show structural examples of the means for strobe input 20.

For instance, the means for strobe input shown in FIG. 7(*a*) is constituted with a current mirror employing npn transistors Q21 and Q22. The strobe control signal ST is input to the collector and the base of the transistor Q21 and the base of the transistor Q22. The emitter of the transistor Q21 is connected to the ground terminal GND. The collector of the transistor Q22 is connected to the output terminal 01 of the means for strobe input 20, whereas the emitter of the transistor Q22 is connected to the ground terminal GND. The size of the transistor Q22 is set to be, for instance, an n multiple of that of transistor Q21.

FIG. 7(*b*) shows a circuit that converts a voltage to a current, provided with an npn transistor Q23 with its base connected to the strobe terminal INst and its collector connected to the output terminal 01 of the means for strobe input 20. The emitter of the transistor Q23 is connected to the ground terminal GND via an emitter resistor R21. This circuit shown in FIG. 7(*b*) is provided with a function for performing current conversion on the voltage level of the strobe control signal ST.

The circuit shown in FIG. 7(*c*) is constituted of a photocoupler that is connected between the strobe terminal INst and a ground terminal GNDi at the input side and connected between the output terminal 01 of the means for strobe input 20 and the ground terminal GND at the output side. The level of the potential at the ground terminal GNDi may differ from the level of the potential at the ground terminal GND. In other words, the ground levels may vary.

The circuit shown in FIG. 7(*d*) represents an example of a constant current circuit that supplies a constant current on and off. This constant current circuit is provided with pnp transistors Q24 and Q25 whose emitters are connected to the output terminal 01 of the means for strobe input 20. The bases of the transistors Q24 and Q25 are connected to the collectors of the transistor Q25 and an npn transistor Q27. The collector and the base of the npn transistor Q26 and the base of the npn transistor Q27 are connected to the collector of the transistor Q24. An emitter resistor R22 is connected to the emitter of the transistor Q27. The transistor Q26 and the other end of the resistor R22 are connected to the collector of an npn transistor Q28. The connection is achieved so that the strobe control signal ST is input to the base of the transistor Q28 via a resistor R23. The emitter of the transistor Q28 is connected to the ground terminal GND. The pnp transistors Q24 and Q25 constitute a current mirror circuit that performs linear amplification, whereas the transistors Q26 and Q27 and the resistor R22 constitute a non-linear current amplifier in which a maximum current amplification factor is achieved when the input current is in the vicinity of 0 and the current amplification factor becomes reduced as the current increases, and with these elements, a circuit that outputs a constant current when the transistor Q28 is in an on state is achieved.

The circuit shown in FIG. 7(*e*) is constituted with a constant current circuit 22 and a photocoupler 23 which turns the constant current circuit 22 on/off. The circuit shown in FIG. 7(*f*) is a flip-flop 24 provide with a set terminal S and a reset terminal R, which outputs a constant current from the output terminal 01 in a set state. The set terminal S is connected to the strobe terminal INst.

While the structure of the means for strobe input 20 is not limited to those illustrated in FIGS. 7(*a*) through (*f*), it is required to have a function for supplying a constant strobe current ist to the input terminal I1 of the current mirror portion 10*b* of the high voltage detection portion 10 at least when the input voltage Vin at the high voltage detection portion 10 is within a voltage range over which high voltage detection takes place in a state in which the strobe control signal ST is input. In addition, a suitable circuit should be selected depending upon the format of the strobe control signal ST and the ground level at the side where the strobe control signal ST is generated.

FIGS. 8(*a*) through (*d*) are circuit diagrams illustrating non-linear current amplifiers which may constitute either of the constant current circuits shown in FIG. 7(*d*) and (*e*).

Each of the circuits shown in FIGS. 8(*a*) through (*d*) is a non-linear current amplifier in which a maximum current amplification factor is achieved when the input current is in the vicinity of 0 and the current amplification factor becomes reduced as the current increases, and when combined with one of the current mirror circuits shown in FIGS. 2(*a*) through (*d*), it constitutes a constant current circuit. Hereafter, the current amplifiers shown in FIGS. 8(*a*) through (*d*) are referred to as constant current source-type current amplifiers.

The constant current source-type current amplifier shown in FIG. 8(*a*) is provided with a transistor Q31 whose emitter is connected to the common terminal COM and a transistor Q32 whose emitter is connected to the common terminal COM via an emitter resistor R31. The size of the transistor Q32 is set at an n multiple of the size of the transistor Q31. The collector of the transistor Q31 is connected to the base of the transistor Q31 and the base of the transistor Q32. The collector of the transistor Q31 constitutes an input terminal I of the constant current source-type current amplifier whereas the collector of the transistor Q32 constitutes an output terminal 0 of the constant current source-type current amplifier.

Figure 8A:
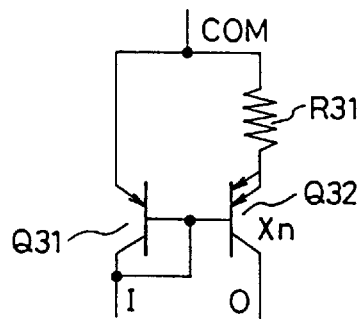
FIG. 8A–8D shows circuit diagrams of non-linear current amplifiers that may constitute the constant current circuit in FIG. 7(d) and (e)
Figure 8B:
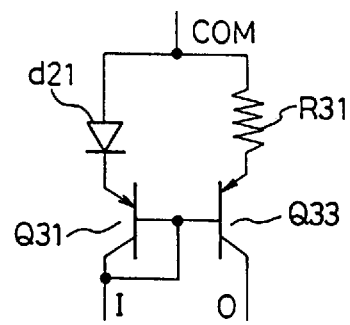

The constant current source-type current amplifier in FIG. 8(b) is provided with a transistor Q31 which is identical to the one shown in FIG. 8(a) with its emitter connected to the common terminal COM via a diode d21 and a transistor Q33 whose emitter is connected to the common terminal COM via an emitter resistor R31. The size of the transistor Q33 is set to be the same as that of the transistor Q31. The collector of the transistor Q31 is connected to the base of the transistor Q31 and the base of the transistor Q33. The collector of the transistor Q31 constitutes an input terminal I of the constant current source-type current amplifier and the collector of the transistor Q33 constitutes an output terminal 0 of the constant current source-type current amplifier.

Figure 8C:
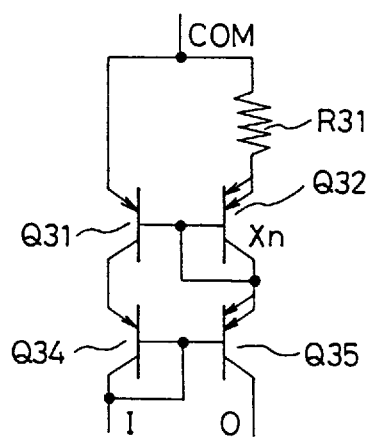

The constant current source-type current amplifier shown in FIG. 8(c) is provided with a transistor Q31 which is connected to the common terminal COM, a resistor R31 and a transistor Q32 in a manner similar to the shown in FIG. 8(a). The collector of the transistor Q32 is connected to the bases of the transistors Q31 and Q32. The emitter of a transistor Q34 is connected to the collector of the transistor Q31 and the collector of the transistor Q32 is further connected to the emitter of a transistor Q35. The collector of the transistor Q34 is connected to the bases of the transistors Q34 and Q35. In this constant current source-type current amplifier, the collector of the transistor Q34 constitutes an input terminal I and the collector of the transistor Q35 constitutes an output terminal 0.

Figure 8D:
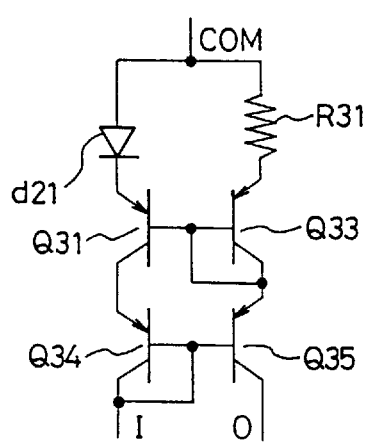

In the constant current source-type current amplifier shown in FIG. 8(d), which is achieved by incorporating the circuit shown in FIG. 8(b) with the circuit shown in FIG. 8(c), the emitter of the transistor Q31 is connected to the common terminal COM via a diode d21 and the emitter of the transistor Q33 is connected to the common terminal COM via the resistor R31. The collector of the transistor Q33 is connected to the bases of the transistors Q31 and Q33. The emitter of the transistor Q34 is connected to the collector of the transistor Q31 and the collector of the transistor Q33 is further connected to the emitter of the transistor Q35. The collector of the transistor Q34 is connected to the bases of the transistor Q34 and the transistor Q35. In this constant current source-type current amplifier, the collector of the transistor Q34 constitutes an input terminal I and the collector of the transistor Q35 constitutes an output terminal 0.

The transistors Q31 through Q35 in FIGS. 8(a) through (d) may be pnp transistors or npn transistors. The polarity is reversed in an npn transistor from that in a pnp transistor. When structuring a constant current circuit in combination with a current mirror in which one of the circuit structures shown in FIGS. 2(a) through (d) is employed, a constant current circuit which utilizes the area between the two remote control terminals for a current path can be achieved by replacing one of the circuits with an npn transistor, connecting the input terminal I of the current mirror circuit with the output terminal 0 of the constant current source-type current amplifier and connecting the output terminal 0 of the current mirror circuit with the input terminal I of the constant current source-type current amplifier.

Figure 7A:
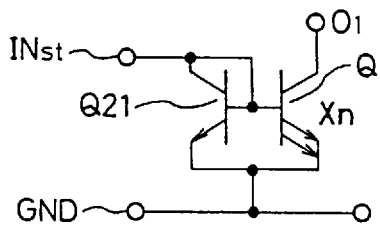
FIG. 7A–7F shows circuit diagrams illustrating structural examples of the means for strobe input 20 in FIG. 1.
Figure 7B:
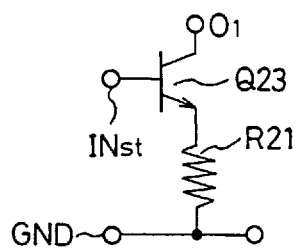
Figure 7C:
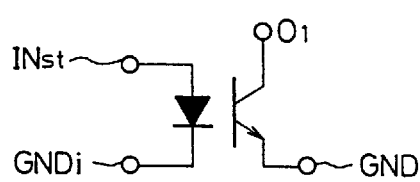
Figure 7D:
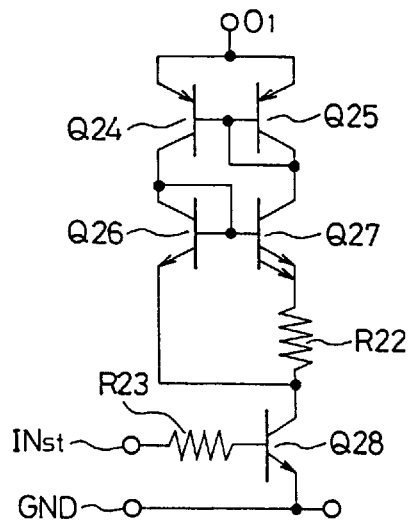
Figure 7E:
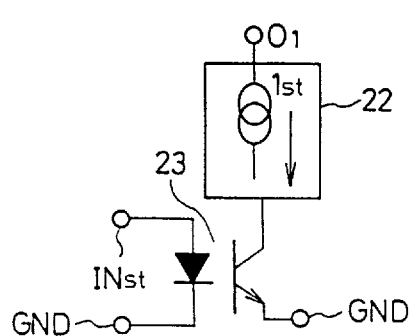
Figure 7F:
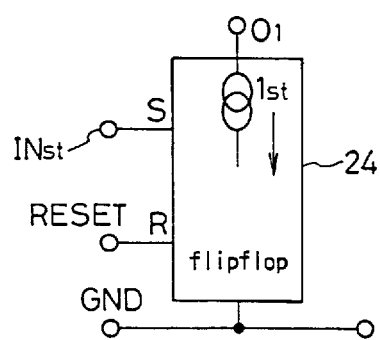

FIGS. 9(a) through (e) illustrate circuit examples of the flip-flop shown in FIG. 7(f).

Figure 9A:
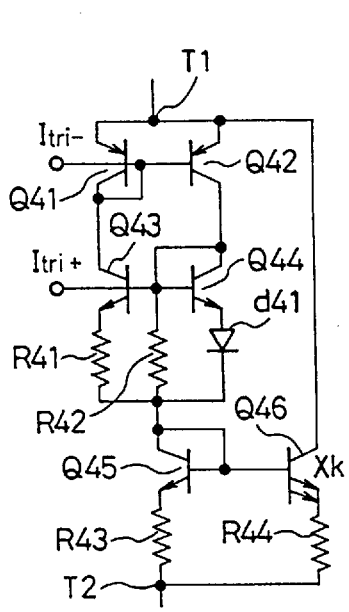
FIG. 9A–9E shows circuit examples of the flip-flop in FIG. 7(f)

The flip-flop in FIG. 9(a) is provided with transistors Q41 and Q42 whose emitters are connected to each other at a current output terminal T1. The collector of the transistor Q41 is connected to the base of the transistor Q41 and is also connected to the base of the transistor Q42. The collectors of transistors Q43 and Q44 are respectively connected to the collectors of the transistors Q41 and Q42. The collector of the transistor Q44 is connected to the base of the transistor Q44 and also to the base of the transistor Q43. One end of an emitter resistor R41 is connected to the emitter of the transistor Q43, whereas the anode of a diode d41 is connected to the emitter of the transistor Q44. The bases of the transistors Q43 and Q44 are each connected to one end of a resistor R42. The other ends of the resistors R41 and R42 and the cathode of the diode d41 are connected to the collector and the base of a transistor Q45 and the base of a transistor Q46. An emitter resistor R43 is connected to the emitter of the transistor Q45, whereas an emitter resistor R44 is connected to the emitter of the transistor Q46. The other end of each of the emitter resistors R43 and R44 is connected to a current output terminal T2. The size of the transistor Q46 is set at a k multiple of the size of the transistor Q45. The collector of the transistor Q46 is connected to the current output terminal T1. A terminal Itri− is connected to the bases of the transistors Q41 and Q42 and a terminal Itri+ is connected to the bases of the transistors Q43 and Q44.

Figure 9B:
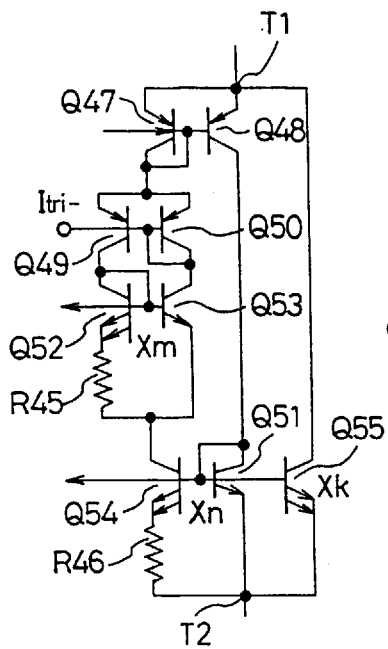

The flip-flop shown in FIG. 9(b) is provided with transistors Q47 and Q48 whose emitters are connected to each other at a current output terminal TI. The collector of the transistor Q47 is connected to the base of the transistor Q47 and is also connected to the base of the transistor Q48. The collector of the transistor Q47 is further connected to the emitters of transistors Q49 and Q50. The collector of the transistor Q48, on the other hand, is connected to the collector of a transistor Q51.

The collector of the transistor Q50 is connected to the bases of the transistors Q49 and Q50. The collectors of the transistors Q49 and Q50 are respectively connected to the collectors of transistors Q52 and Q53 with the collector of the transistor Q52 connected to the bases of the transistors Q52 and Q53. The size of the transistor Q52 is set at an m multiple of that of the transistor Q53. The emitter of the transistor Q52 is connected to the collector of a transistor Q54 via an emitter resistor R45. The emitter of the transistor Q53, too, is connected to the collector of the transistor Q54. In this flip-flop, a transistor Q55 whose collector is connected to the current output terminal T1 is provided, with the collector of the transistor Q51 connected to the base of the transistor Q51 and also connected to the bases of the transistors Q54 and Q55.

The size of the transistor Q54 is set at an n multiple of that of the transistor Q51 and the size of the transistor Q55 is set at a k multiple of that of the transistor Q51. One end of an emitter resistor R46 is connected to the emitter of the transistor Q54. The other end of the resistor R46 and the emitters of the transistors Q51 and Q55 are commonly connected to the current output terminal T2. The bases of the transistors Q49 and Q50 are connected to the terminal Itri−.

Figure 9C:
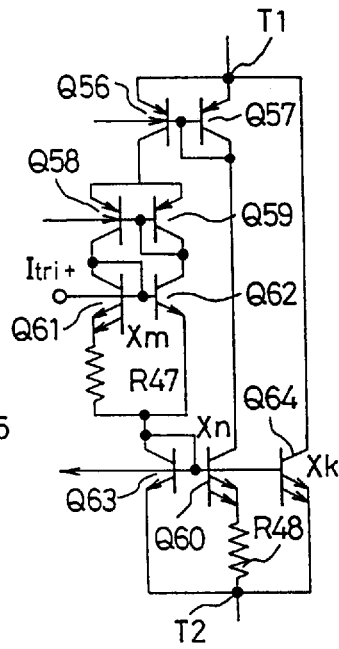

The flip-flop shown in FIG. 9(c) is provided with transistors Q56 and Q57 whose emitters are connected to each other at the current output terminal TI. The collector of the transistor Q57 is connected to the base of the transistor Q57 and is also connected to the base of the transistor Q56. The collector of the transistor Q56 is connected to the emitter of transistors Q58 and (Q59. The collector of the transistor Q57, on the other hand, is connected to the collector of a transistor Q60.

The collector of the transistor Q59 is connected to the bases of the transistors Q58 and Q59. The collectors of the transistors Q58 and Q59 are respectively connected to the collectors of transistors Q61 and Q62 with the collector of the transistor Q61 connected to the bases of the transistors Q61 and Q62. The size of the transistor Q61 is set at an m multiple of that of the transistor Q62. The emitter of the transistor Q61 is connected to the collector of a transistor Q63 via an emitter resistor R47. The emitter of the transistor Q62, too, is connected to the collector of the transistor Q63.

In this flip-flop, a transistor Q64 whose collector is connected to the current output terminal T1 is provided, with the collector of the transistor Q63 connected to the base of the transistor Q63 and also connected to the bases of the transistors Q60 and Q64. The size of the transistor Q60 is set at an n multiple of that of the transistor Q63 and the size of the transistor Q64 is set at a k multiple of that of the transistor Q63. One end of an emitter resistor R48 is connected to the emitter of the transistor Q60. The other end of the resistor R48 and the emitters of the transistors Q63 and Q64 are commonly connected to the current output terminal T2. The bases of the transistors Q61 and Q62 are connected to a terminal Itri+.

Figure 9D:
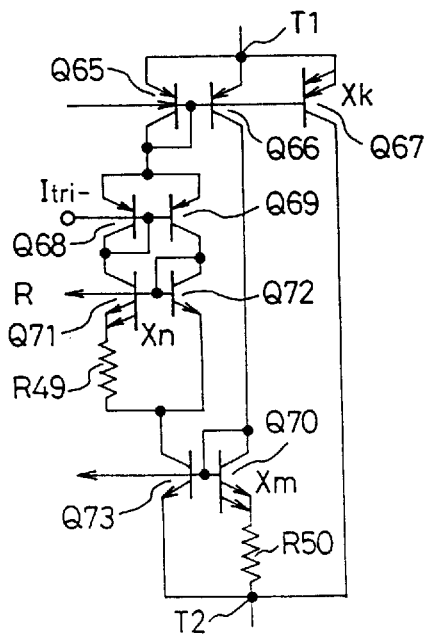

The flip-flop shown in FIG. 9(d) is provided with three transistors Q65 through 67 whose emitters are connected to the current output terminal T1. The collector of the transistor Q65 is connected to the base of the transistor Q65 and is also connected to the bases of the transistors Q66 and Q67.

The emitters of transistors Q68 and Q69 are connected to the collector of the transistor Q65. The collector of the transistor Q68 is connected to the bases of the transistors Q68 and Q69. The collector of the transistor Q66, on the other hand, is connected to the collector of a transistor Q70.

The collectors of transistors Q71 and Q72 are respectively connected to the collectors of the transistors Q68 and Q69. The collector of the transistor Q72 is connected to the base of the transistor Q72 and is also connected to the base of the transistor Q71. The size of the transistor Q71 is set at an n multiple of that of the transistor Q72. One end of an emitter resistor R49 is connected to the emitter of the transistor Q71. The other end of the resistor R49 and the emitter of the transistor Q72 are connected to the collector of the transistor Q73. The collector of the transistor Q70 is connected to the base of the transistor Q70 and is also connected to the base of a transistor Q73. The size of the transistor Q70 is set at an m multiple of that of the transistor Q73. The size of the transistor Q67, on the other hand, is set at a k multiple of that of the transistor Q65.

The emitter of the transistor Q70 is connected to one end of an emitter resistor R50 and the other end of the resistor R50, the emitter of the transistor Q73 and the collector of the transistor Q67 are commonly connected to the current output terminal T2. The bases of the transistors Q68 and Q69 are connected to the terminal Itri+.

Figure 9E:
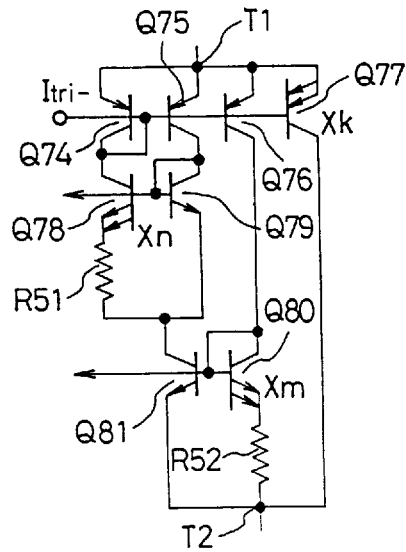

The flip-flop shown in FIG. 9(e) is provided with four transistors Q74 through Q77 whose emitters are connected to each other at the current output terminal T1. The collector of the transistor Q74 is connected to the base of the transistor Q74 and is also connected to the bases of the transistors Q75 through Q77. The collectors of the transistors Q74 and Q75 are respectively connected to the collectors of transistors Q78 and Q79. The collector of the transistor Q76, on the other hand, is connected to the collector of the transistor Q80.

The collector of the transistor Q79 is connected to the bases of the transistors Q78 and Q79. One end of an emitter resistor R51 is connected to the emitter of the transistor Q78. The other end of the resistor R51 and the emitter of the transistor Q79 are connected to the collector of a transistor Q81. The collector of the transistor Q80 is connected to the base of the transistor Q81 and the base of the transistor Q80. The size of the transistor Q80 is set at an m multiple of that of the transistor Q81. In addition, the size of the transistor Q77 is set at a k multiple of that of the transistor Q74.

An emitter resistor R52 is connected to the emitter of the transistor Q80 and the other end of the resistor R52, the emitter of the transistor Q81 and the collector of the transistor Q77 are commonly connected to the current output terminal T2. The bases of the transistors Q74 through Q77 are connected to the terminal Itri−.

The terminal Itri− in each of the flip-flops shown in FIG. 9(a) through (e) is constituted such that when a trigger current is caused to run out through it, the flip-flop is set and when the trigger current is caused to run in through it, the flip-flop is reset. In contrast, the terminal Itri+ is constituted such that when a trigger current is caused to run in through it, the flip-flop is set and when the trigger current is caused to run out through it, the flip-flop is reset. In addition, at the nodes indicated with the arrows in FIGS. 9(a) through (e), the flip-flops can be reset by supplying a current in the direction indicated with the arrows. By utilizing these terminals Itri−, Itri+ and selected nodes as a set terminal S and a reset terminal R, connecting the current output terminal T1 to the output terminal 0l of the means for strobe input 20 and connecting the current output terminal T2 to the ground, the flip-flop shown in FIG. 7(f) is achieved. When the flip-flop is set, a constant current is output. It is to be noted that in the circuit shown in FIGS. 9(a) through (e), the transistors Q46, Q55, Q64, Q67 and Q77 whose sizes are merely set at k multiples, perform current amplification of the flip-flops and may be, therefore, omitted.

(I) (4) Means for output communication 30

FIGS. 10(a) through (h) are circuit diagrams illustrating structural examples of the means for output communication 30 shown in FIG. 1.

Various structures may be adopted to constitute the means for output communication 30. For instance, the circuit shown in FIG. 10(a) is a current mirror circuit 32 which is constituted with an npn transistor Q90 whose collector and base are connected to the input terminal I2 of the means for output communication 30 and an npn transistor Q91 whose collector is connected to the output terminal OUT. The size of the transistor Q91 is set at a k multiple of that of the transistor Q90. The emitter of the transistor Q90 is connected to the ground terminal GND. The base of the transistor Q91 is connected to the collector of the transistor Q90, whereas the emitter of the transistor Q91 is connected to the ground terminal GND.

FIG. 10(b) shows the photocoupler 31 shown in FIG. 1. FIG. 10(c) shows a circuit achieved by combining the current mirror circuit 32 shown in FIG. 10(a) and the photocoupler 31 shown in FIG. 10(b), and is structured so that the output current of the current mirror circuit 32, which is connected to the input terminal I2 of the means for output communication 30, is supplied to the input side of the photocoupler 31 for drive.

FIG. 10(d), too, shows a circuit achieved by combining the current mirror circuit 32 and the photocoupler 31. In the means for output communication shown in FIG. 10(d), the input side of the photocoupler 31 is connected between the emitters of the transistors Q90 and Q91 of the current mirror circuit 32 and the ground terminal GND so that a high voltage detection signal can be output both from the photocoupler 31 and the current mirror circuit 32.

FIG. 10(e) shows an example of a non-linear current amplifier 33 in which a minimum current amplification factor is achieved when the input current from the input terminal I2 is in the vicinity of 0 and the current amplification factor increases as the current goes up. This non-linear current amplifier 33 is provided with an npn transistor Q92 whose collector and base are connected to the input terminal I2 and an npn transistor Q93 whose collector is connected to the output terminal OUT and whose base is connected to the collector of the transistor Q92. The size of the transistor Q92 is set at a k multiple of that of the transistor Q93. The emitter of the transistor Q92 is connected to the ground terminal GND via a resistor R91. The emitter of the transistor Q93 is directly connected to the ground terminal GND. This non-linear current amplifier 33 is constituted so that it performs a non-linear switching operation in correspondence to an input signal that utilizes the threshold value set at the resistor R91.

FIG. 10(f) shows an example of a TTL conversion circuit 34. This TTL conversion circuit 34 is provided with three npn transistors Q94, Q95 and Q96. The transistors Q94, Q95 and Q96 are each constituted as a Schottky transistor with a Schottky diode inserted between its collector and its base. The size of the transistor Q96 is set at a k multiple of that of the other transistors Q94 and Q95.

The base of the transistor Q94 is connected to the input terminal I2 of the means for output communication 30. The collector of the transistor Q94 is connected to a source potential V+ via a resistor R92 whereas the emitter of the transistor Q94 is connected to the ground terminal GND via a resistor R93. The base of the transistor Q95 is connected to the collector of the transistor Q94 whereas the collector of the transistor Q95 is connected to the source potential V+ via a resistor R94.

The anode of a diode d91 is connected to the emitter of the transistor Q95, with the cathode of the diode d91 connected to the output terminal OUT and the collector of a transistor Q96. The emitter of the transistor Q96 is connected to the ground terminal GND. Thus, in the TTL conversion circuit 34, an output of the TTL logic level can be obtained in correspondence to the presence/absence of an input current.

FIG. 10(g) shows an example of a flip-flop 35 provided with a set terminal S and a reset terminal R, with the set terminal S connected to the input terminal I2 of the means for output communication 30. The flip-flop 35 may be structured as shown in any one of FIGS. 9(a) through (e), for instance, with the current input terminal T1 connected to the source V+, and is set or reset by an input current to output a corresponding voltage or current.

FIG. 10(h) shows an example of a switching circuit 36. This switching circuit 36 is provided with a set terminal S and a reset terminal R, with the set terminal S connected to the input terminal I2 of the means for output communication 30. The switching circuit 36 operates in correspondence to the current running via the set terminal S and the reset terminal R, and outputs a high voltage detection signal which becomes turned on/off, from the output terminal OUT.

The switching circuit 36 may be achieved by combining a current mirror circuit with a circuit structure similar to that shown in FIG. 2 constituted with npn transistors or pnp transistors, and a non-linear current amplifier constituted with pnp transistors or npn transistors in which a minimum current amplification factor is achieved when the input current is in the vicinity of 0 and the current amplification factor increases as the current increases. Hereafter, such a non-linear current amplifier is referred to as a switching-type current amplifier.

FIGS. 11(a) through (d) are circuit diagrams of switching-type current amplifiers.

Figure 11A:
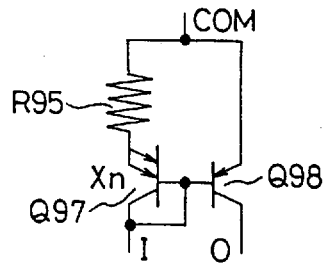
FIG. 11A–11D shows circuit diagrams of switching current amplifiers.

The switching-type current amplifier shown in FIG. 11(a) is provided with a transistor Q97 whose emitter is connected to the common terminal COM via an emitter resistor R95 and a transistor Q98 whose emitter is connected to the common terminal COM. The size of the transistor Q97 is set at an n multiple of that of the transistor Q98. The bases of the transistors Q97 and Q98 are connected to the collector of the transistor Q97. The collector of the transistor Q97 constitutes an input terminal I of the switching-type current amplifier, whereas the collector of the transistor Q98 constitutes an output terminal 0.

Figure 11B:
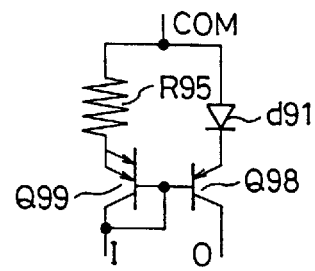

The switching-type current amplifier shown in FIG. 11(b) is provided with a transistor Q98 which is similar to that shown FIG. 11(a) with its emitter connected to the common terminal COM via a diode d91 and a transistor Q99 whose emitter is connected to the common terminal COM via an emitter resistor R95. The size of the transistor Q99 is set to be the same as that of the transistor Q98. The collector of the transistor Q99 is connected to the base of the transistor Q99 and the base of the transistor Q98. The collector of the transistor Q99 constitutes an input terminal I of the switching-type current amplifier, whereas the collector of the transistor Q98 constitutes an output terminal 0.

Figure 11C:
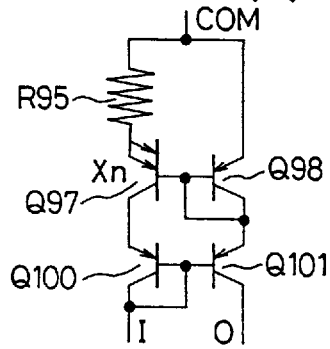

The switching-type current amplifier shown in FIG. 11(c) is provided with a transistor Q98 which is connected to the common terminal COM, a resistor R95 and a transistor Q97 in a manner similar to that shown in FIG. 11(a). The collector of the transistor Q98 is connected to the bases of the transistors Q97 and Q98. The emitter of a transistor Q100 is connected to the collector of the transistor Q97, whereas the collector of the transistor Q98 is further connected to the emitter of a transistor Q101. The collector of the transistor Q100 is connected to the bases of the transistor Q100 and the transistor Q101. In this switching-type current amplifier, the collector of the transistor Q100 constitutes an input terminal I, whereas the collector of the transistor Q101 constitutes an output terminal 0.

Figure 11D:
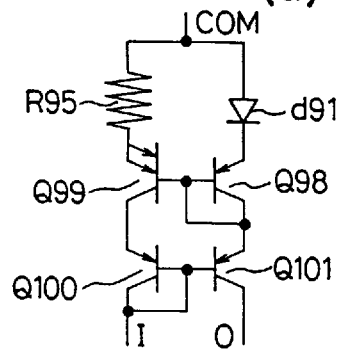

In the switching-type current amplifier shown in FIG. 11(d), the emitter of the transistor Q98 is connected to the common terminal COM via a diode d91 and the emitter of the transistor Q99 is connected to the common terminal COM via a resistor R95. The collector of the transistor Q98 is connected to the bases of the transistors Q98 and Q99. The emitter of the transistor Q100 is connected to the collector of the transistor Q99, whereas the collector of the transistor Q98 is further connected to the emitter of the transistor Q101. The collector of the transistor 100 is connected to the bases of the transistor Q100 and the transistor Q101. In this switching-type current amplifier, the collector of the transistor Q100 constitutes an input terminal I, whereas the collector of the transistor Q101 constitutes an output terminal 0.

Each of the transistors Q97 through Q101 shown in FIG. 11(a) through (d) may be either a pnp transistor or an npn transistor and in a pnp transistor the polarity is reversed from that in an npn transistor. The switching circuit 36 may be achieved in combination with one of the current mirrors shown in FIGS. 10(a) through (d), by constituting one of them with pnp transistors and the other with npn transistors, connecting the input terminal I of the current mirror with the output terminal 0 of the switching-type current amplifier and connecting the output terminal 0 of the current mirror with the input terminal I of the switching-type current amplifier.

Figure 12:
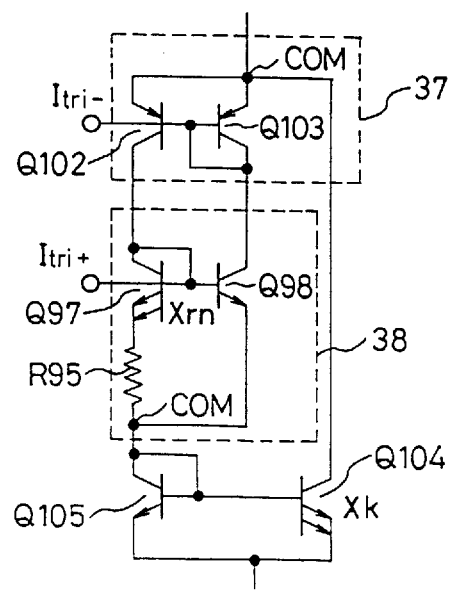
FIG. 12 is a circuit diagram illustrating a structural example of a switching circuit 36 in FIG. 10(h)

FIG. 12 is a circuit diagram illustrating a structural example of the switching circuit 36 shown in FIG. 10(h).

The switching circuit 36 shown in FIG. 12 is provided with a current mirror circuit 37 with a circuit structure similar to that shown in FIG. 10(a) and the switching-type current amplifier 38 shown in FIG. 11(a).

The current mirror circuit 37 is provided with pnp transistors Q102 and Q103 whose emitters are connected to the common terminal COM of the current mirror circuit 37. The bases of the transistor Q102 and the transistor Q103 are connected to the collector of the transistor Q103 and are also connected to a terminal Itri– which constitutes a set terminal S. The collectors of the npn transistors Q97 and Q98 of the switching-type current amplifier 38 are respectively connected to the collectors of the transistors Q102 and Q103 in the current mirror circuit 37. The bases of the transistors Q97 and Q98 are connected to the collector of the transistor Q97 and the emitter of the transistor Q97 and the emitter of the transistor Q98 which are positioned across a resistor R95 are connected to the common terminal COM of the switching-type current amplifier 38.

The collector of an npn transistor Q105 is connected to the common terminal COM of the switching-type current amplifier 38, whereas the collector of an npn transistor Q104 is connected to the common terminal COM of the current mirror circuit 37. The bases of the transistors Q105 and Q104 are connected to the collector of the transistor Q105 and the emitters of the transistors Q105 and Q104 are both connected to the ground terminal GND. The size of the transistor Q104 is set at a k multiple of that of the transistor Q105. The transistors Q105 and Q104 are provided simply to amplify the current in the switching circuit 36 and, therefore, may be omitted.

Although the structure of the means for output communication 30 is not limited to the structural examples shown in FIGS. 10(a) through (h), it is always required to have an interface function for converting the output current from the output terminal 010 of the high voltage detection portion 10 to a signal that can be easily utilized by an external circuit (not shown). The structure of the means for output communication should be selected and determined depending upon the format of the signal required by the external circuit and the state of the ground. For instance, by employing a circuit that includes a photocoupler as shown in FIGS. 10(b) through (d) to constitute the means for output communication 30, the high voltage detection signal S30 can be output to circuits at varying ground levels.

As explained above, in the first embodiment, the high voltage detection circuit is constituted with the high voltage detection portion 10, the means for strobe input 20 and the means for output communication 30. Thus, a high voltage detection circuit having the following advantages (a1) through (a8) is achieved.

(a1) It is possible to control whether or not high voltage detection is to be performed with the strobe control signal ST.

(a2) When high voltage detection is to be performed by employing both the first and second constant voltage circuits 10a and 10c, the preset voltage for performing high voltage detection can be set in voltage steps at the forward bias diode 12.

(a3) When high voltage detection is to be performed by employing both the first and second constant voltage circuits 10a and 10c, the voltage applied to other circuit elements is dispersed, thereby reducing the high voltage applied to the circuit elements.

(a4) By employing a circuit that performs linear operation on the input current, such as the current mirror 32, the photocoupler 31, a circuit achieved by the combination thereof or the like, as shown in FIGS. 10(a) through (d) to constitute the means for output communication 30, the size of the high voltage detection signal S30 can be controlled with the value of the strobe current ist.

(a5) By employing a circuit that performs a non-linear operation on the input current, such as the non-linear amplifier 33, the TTL conversion circuit 34, a relay circuit or the like, as shown in FIGS. 10(e) and (f) to constitute the means for output communication 30, a 2-value high voltage detection signal S30, which is turned on/off through a switching operation can be achieved.

(a6) By constituting the means for output communication 30 with the flip-flop 35 or the switching circuit 36, provided with the set terminal S and the reset terminal R, as shown in FIGS. 10(g) and (h), a high voltage detection circuit is achieved that, upon being set, holds high voltage detection information and outputs a high voltage detection signal S30 and when the high voltage detection signal S30 is no longer required can be reset.

(a7) When circuits with a DC separation function such as photocouplers, relays and the like are employed to constitute the means for strobe input 20 and the means for output communication 30, detected voltages at varying ground levels can be handled as well.

(a8) When a response speed limiting circuit is provided in the constant voltage circuit 10a or 10c, as shown in FIGS. 3, 4(a) and (b), a high voltage detection circuit with a high degree of noise withstand can be achieved.

Second Embodiment

Figure 13:
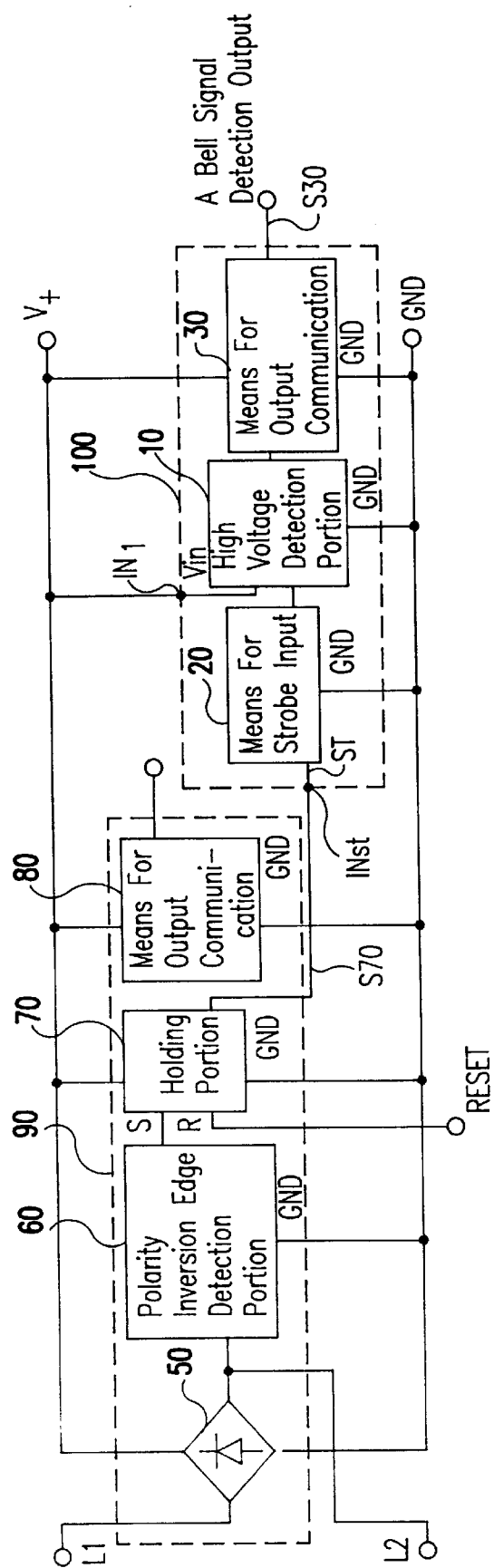
FIG. 13 is a schematic circuit diagram of the bell signal detection circuit in the second embodiment according to the present invention.

FIG. 13 is a schematic circuit diagram of the bell signal detection circuit in the second embodiment according to the present invention.

At a bell signal non-ringing terminal such as a telemeter or the like, it is required that a decision be made as to whether or not an incoming call is a normal call or a non-ringing call. In the case of a normal call, a polarity inversion that indicates a call reception occurs from a standby state at telephone lines L1 and L2, and then a high voltage bell signal is provided. In the case of a non-ringing call, the high voltage bell signal is not provided. The bell signal detection circuit shown in FIG. 13 detects the presence/absence of a bell signal which is provided to the telephone lines L1 and L2 following a polarity inversion.

This bell signal detection circuit is provided with a full wave rectifier circuit 50 that performs full wave rectification on the power supplied via the pair of telephone lines L1 and L2 to supply a voltage with a constant polarity. The full wave rectifier circuit 50 is connected to a polarity inversion edge detection portion 60 which, upon receiving source supply from the full wave rectifier circuit 50, detects the polarity inversion edge between the lines L1 and L2, and a polarity inversion detection holding circuit 70 that holds edge detection information output by the polarity inversion edge detection portion 60 until a reset input (RESET) is performed from the outside or until the source supply is cut off, and outputs this as a polarity inversion detection signal S70. A means for output 80 may be provided if necessary on the output side of the polarity inversion detection holding circuit 70 to output the polarity inversion detection information to the outside. The full wave rectifier circuit 50, the polarity inversion edge detection portion 60 and the polarity inversion detection holding circuit 70 constitute a polarity inversion detection circuit 90 that generates polarity inversion detection information.

A high voltage detection circuit 100, which is constituted with the high voltage detection portion 10, the means for strobe input 20 and the means for output communication 30 explained in reference to the first embodiment, is connected to the output side of the polarity inversion detection circuit 90. The voltage input terminal IN1 shown in FIG. 1 is connected to a source V+ output from the full wave rectifier circuit 50, the ground terminal GND is connected to a ground potential set at the full wave rectifier circuit 50 and a polarity inversion detection signal S70 output by the polarity inversion detection holding circuit 70 of the polarity inversion detection circuit 90 is input to the strobe terminal INst.

Figure 14:
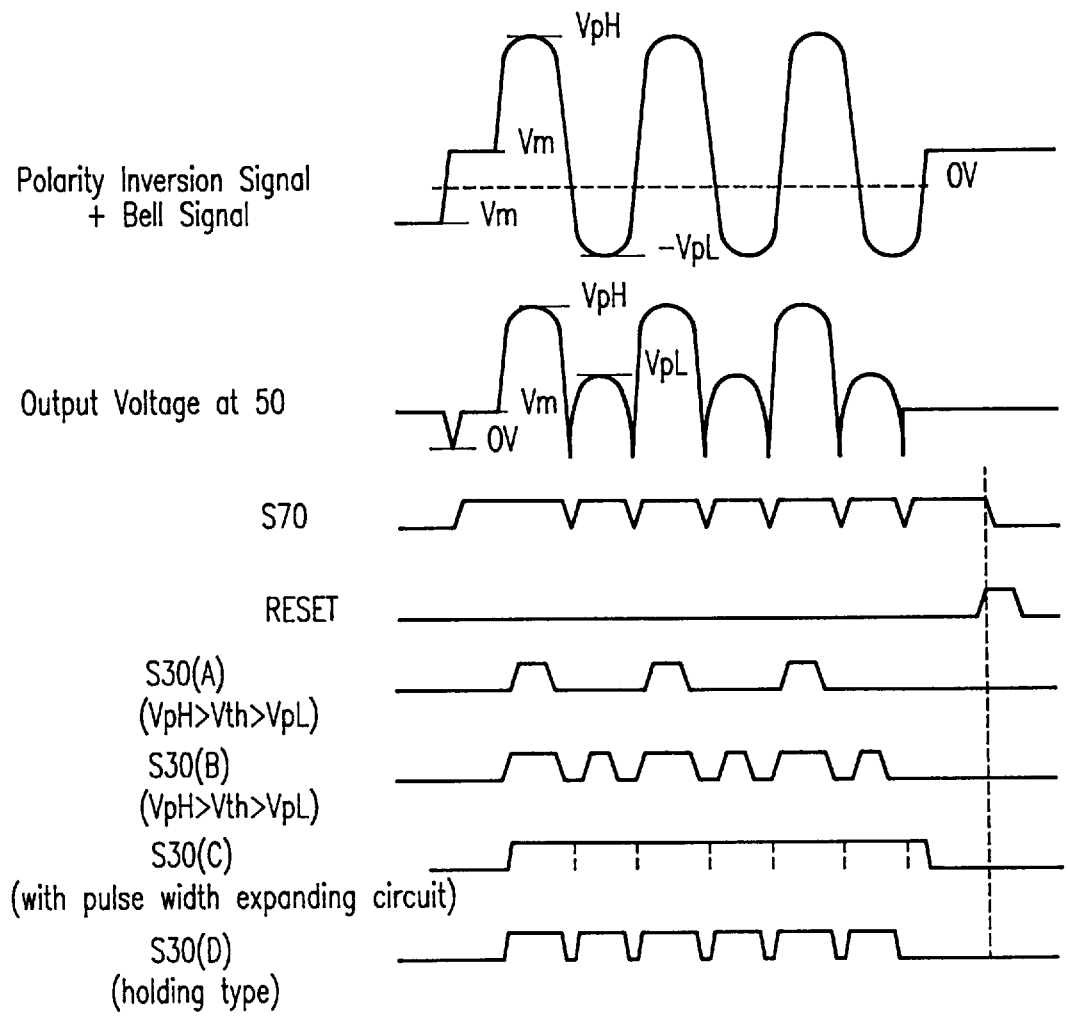
FIG. 14 shows waveform diagrams (part 1) illustrating the operation of the bell signal detection circuit in FIG. 13.
Figure 15:
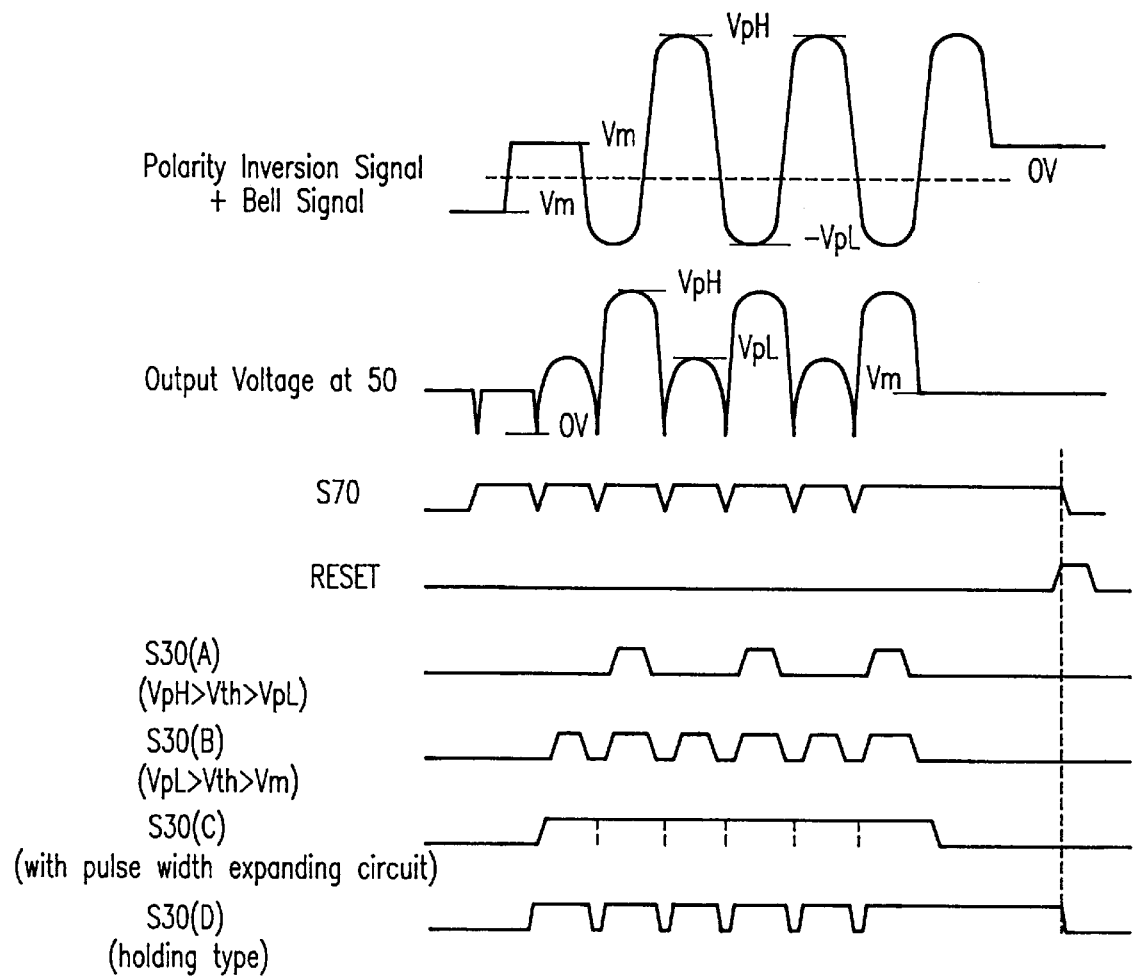
FIG. 15 shows waveform diagrams (part 2) illustrating the operation of the bell signal detection circuit in FIG. 13.

FIGS. 14 and 15 are a waveform diagram (part 1 and part 2) illustrating the operation performed by the circuit shown in FIG. 13, and the explanation is given on the operation of the bell signal detection circuit in reference to FIGS. 14 and 15.

When a bell signal is input, a bell AC signal with a larger amplitude than that of the power feed DC voltage in the telephone lines L1 and L2 is superimposed on the power feed DC voltage. This causes a polarity inversion to occur effect every half wave of the bell signal at the telephone lines L1 and L2 and, as a result, the voltage output by the full wave rectifier circuit 50 becomes a pulsating signal whose level is set to high or to low every half wave. The bell signal may start in a positive phase, as shown in FIG. 14 or may start in a negative phase, as shown in FIG. 15. The maximum peak value VpH and the minimum peak value VpL of the output voltage from the full wave rectifier circuit 50 are both higher compared to the voltage value between the lines in a standby state.

The high voltage detection circuit 100 in the first embodiment utilizes the polarity inversion detection signal S70 output by the polarity inversion detection circuit 90 as its strobe control signal ST, detects the voltage achieved by performing full wave rectification on the voltage between the telephone lines L1 and L2 becomes higher than the voltage Vm between the lines during a standby state when a bell signal is being input and outputs the high voltage detection signal S30 as a bell signal detection signal. In this circuit, a voltage detection threshold level Vth set at the constant voltage circuits within the high voltage detection portion 10 of the high voltage detection circuit 100 is set within a range that is equal to or greater than the voltage Vm between the lines in a standby state and is equal to or less than the high voltage peak value VpH at the time of bell signal input. In a standby state, the polarity inversion detection signal S70 output by the polarity inversion detection holding circuit 70 in the polarity inversion detection circuit 90 is set to 0, thereby setting the strobe control signal ST at the high voltage detection circuit 100 to 0. Thus, the high voltage detection circuit 100, too, outputs 0.

When a polarity inversion, which indicates the reception of a call, takes place in the telephone lines L1 and L2, a valid polarity inversion detection signal S70 is first output from the polarity inversion detection holding circuit 70 in the polarity inversion detection circuit 90. This signal S70 is provided to the high voltage detection circuit 100 as a strobe control signal ST. With the strobe control signal ST input, the high voltage detection circuit 100 enters high voltage detection operation, but the voltage between the telephone lines L1 and L2 at this point is at the same level as the voltage between the lines in a standby state and is yet to reach the high voltage detection level at the high voltage detection circuit 100. Because of this, the high voltage detection signal S30, which corresponds to the bell signal detection signal, output from the high voltage detection circuit 100, too, remains at 0.

When a bell signal is input via the telephone lines L1 and L2, the bell signal causes a polarity inversion, thereby causing the high voltage detection circuit 100 to enter high voltage detection operation. The input voltage Vin at the high voltage detection circuit 100 rises and when it exceeds the voltage threshold level Vth determined at the constant voltage circuits within the high voltage detection portion 10, a valid high voltage detection signal S30 is output by the means for output communication 30 in the high voltage detection circuit 100. This constitutes the bell signal detection signal indicated with S30(A) or S30(B) in FIG. 14 or FIG. 15, and is sent to an external device or the like. S30(A) represents a case in which the preset voltage threshold level Vth at the high voltage detection portion 10 is set to satisfy (VpH>Vth>VpL), whereas S30(B) represents a bell signal detection signal with the preset voltage threshold level Vth set to satisfy (VpL>Vth>Vm).

When the pulsating current value of the output voltage from the full wave rectifier circuit 50 achieved by the bell signal falls to or below the detection threshold level Vth at the high voltage detection circuit 100, the bell signal detection signal is reset to 0. When the pulsating current value of the output voltage from the full wave rectifier circuit 50 further decreases until the holding output at the polarity inversion detection circuit 90 reaches 0, the strobe control signal ST, too, is set to 0. The operation described above is repeated for every rectified pulsating current of the bell signal.

When the bell signal stops, the polarity inversion detection circuit 90 is reset from the outside and the output signal from the polarity inversion detection holding circuit 70 is reset to 0, the strobe control signal ST, too, is set to 0 and the operation returns to a standby state.

Situations in which the output voltage from the full wave rectifier circuit 50 becomes higher than the voltage between the lines in a standby state include an insulation test performed between the lines. Since, in such an insulation test, high voltage is supplied without any polarity inversion occurring at the telephone lines L1 and L2, the polarity inversion detection signal S70, i.e., the strobe control signal ST is not output from the polarity inversion detection circuit 90 and, therefore, the high voltage detection circuit 100 does not perform a high voltage detection operation. In other words, the high voltage detection signal S30 constituting the bell signal detection signal maintains a zero state.

Now, several structural examples of the bell signal detection circuit are explained.

Figure 16:
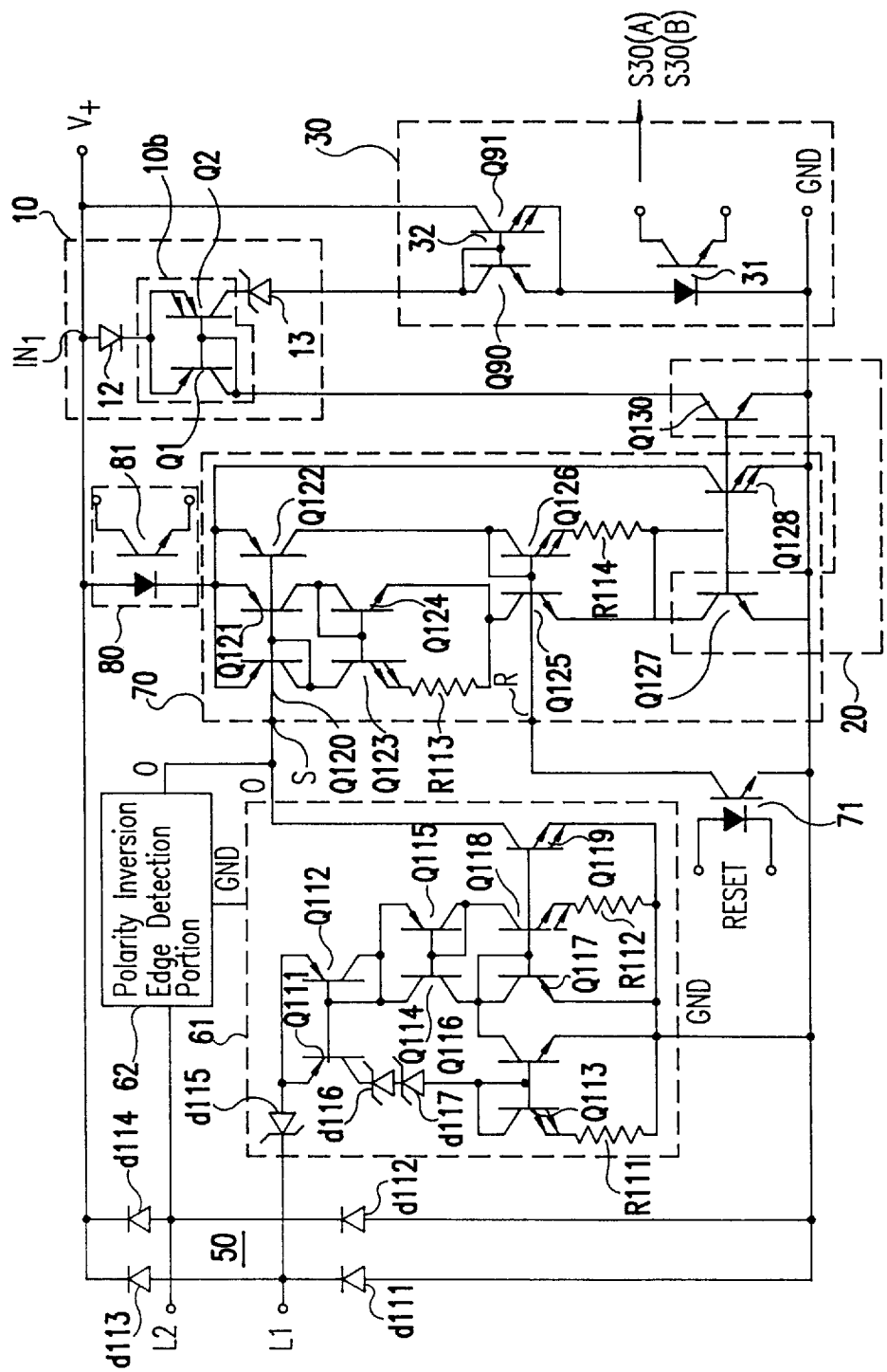
FIG. 16 is a circuit diagram illustrating a structural example (example 1) of the bell signal detection circuit.

FIG. 16 is a circuit diagram illustrating a structural example (example 1) of the bell signal detection circuit.

This bell signal detection circuit is provided with four diodes d111 through d114. The diodes d111 through d114 constitute the full wave rectifier circuit 50 shown in FIG. 13. The polarity inversion edge detection portion 60 shown in FIG. 13 is constituted with a first polarity inversion edge detection portion 61 that detects a polarity inversion whereby the line L1 shown in FIG. 16 shifts to "H," and a second polarity inversion edge detection portion 62 that detects a polarity inversion whereby the line L2 shifts to "H".

The first polarity inversion edge detection portion 61 is provided with a zener diode d115 whose cathode is connected to the line L1. The emitters of two transistors Q111 and Q112 are connected to the anode of the zener diode d115. The bases of the transistors Q111 and Q112 are connected to the collector of the transistor Q112. The collector of a transistor Q113 is connected to the collector of the transistor Q111 via two stage zener diodes d116 and d117. The base of the transistor Q113 is connected to the collector of the transistor Q113 and the emitter of the transistor Q113 is connected to the GND set by the full wave rectifier circuit 50 via a resistor R111.

The collector of the transistor Q112 is connected to the emitters of two transistors Q114 and Q115. The bases of the transistors Q114 and Q115 are connected to the collector of the transistor Q115. The collectors of two transistors Q116 and Q117 are connected to the collector of the transistor Q114. The emitters of the transistors Q116 and Q117 are connected to the ground GND. The base of the transistor Q116 is connected to the collector of the transistor Q113.

The collector of a transistor Q118 is connected to the collector of the transistor Q115. The emitter of the transistor Q118 is connected to the ground GND via a resistor R112. The collector of the transistor Q117 is connected to the bases of the transistors Q117 and Q118 and is also connected to the base of a transistor Q119. The emitter of the transistor Q119 is connected to the ground GND. The collector of the transistor Q119 constitutes an output terminal 0 of the first polarity inversion edge detection portion 61.

The second polarity inversion edge detection portion 62, which serves the line L2, is constituted identically to the first polarity inversion edge detection portion 61. The output terminals 0 of the polarity inversion edge detection portions 61 and 62 are connected to each other to constitute a wired OR circuit. The output terminals 0 of the polarity inversion edge detection portions 61 and 62 thus connected are connected to the set terminal S of the polarity inversion detection holding circuit 70. The polarity inversion detection holding circuit 70 is constituted with a circuit which employs a system whereby a constant current is turned on/off for output. A reset signal RESET is provided to the polarity inversion detection holding circuit 70 via a photocoupler 71. The means for output 80 is constituted with a photocoupler 81.

The polarity inversion detection holding circuit 70 is provided with three transistors Q120 through 122 whose bases are connected to the set terminal S. The emitters of the transistors Q120 through 122 are connected to a source V+ set by the full wave rectifier circuit 50 via the input side of the photocoupler 81 constituting the means for output 80. The collector and the base of the transistor Q120 are connected to the collector of a transistor Q123 and the collector of the transistor Q121 is connected to the base of the transistor Q123 and also connected to the base and the collector of a transistor Q124. The emitter of the transistor Q123 is connected to the collector of a transistor Q125 via a resistor R113, whereas the emitter of the transistor Q124 is directly connected to the collector of the transistor Q125.

The collector of the transistor Q122, on the other hand, is connected to the collector and the base of a transistor Q126. The collector of the transistor Q126 is also connected to the base of the transistor Q125. The emitter of the transistor Q125 is directly connected to the collector and the base of a transistor Q127. The emitter of the transistor Q126 is connected to the collector and the base of the transistor Q127 via a resistor R114. A transistor Q128 is provided in the polarity inversion detection holding circuit 70. The collector of the transistor Q128, too, is connected to the source V+ via the input side of the photocoupler 81. The base of the transistor Q128 is connected to the base and the collector of the transistor Q127 and the emitter of the transistor Q128 and the emitter of the transistor Q127 are connected to the ground GND.

The means for strobe input 20 in the high voltage detection circuit 100 is constituted with the transistor Q127 within the polarity inversion detection holding circuit 70 and a transistor Q130. The base of the transistor Q130 is connected to the base and the collector of the transistor Q127 and the emitter of the transistor Q130 is connected to the ground GND, to constitute the current mirror circuit shown in FIG. 7(a).

The high voltage detection portion 10 is structured similarly to that shown in FIG. 1 except for the fact that the zener diode 11 is omitted. The common terminal (the emitters of the transistors Q1 and Q2) of the current mirror portion 10b constituted with the transistors Q1 and Q2 is connected to the diode 12 whose anode is directly connected to the source V+. The zener diode 13 in the constant voltage circuit is connected to the collector of the transistor Q2 constituting the output of the current mirror portion 10b. The collector of the transistor Q130 in the means for strobe input 20 is connected to the collector of the transistor Q1, which constitutes the input of the current mirror portion 10b. The circuit shown in FIG. 10(d) is employed to constitute the means for output communication 30.

In the bell signal detection circuit structured as described above, when a bell signal is provided, a bell signal detection signal with a waveform indicated as S30(A) or S30(B) in FIG. 14 and FIG. 15 is output.

Figure 17:
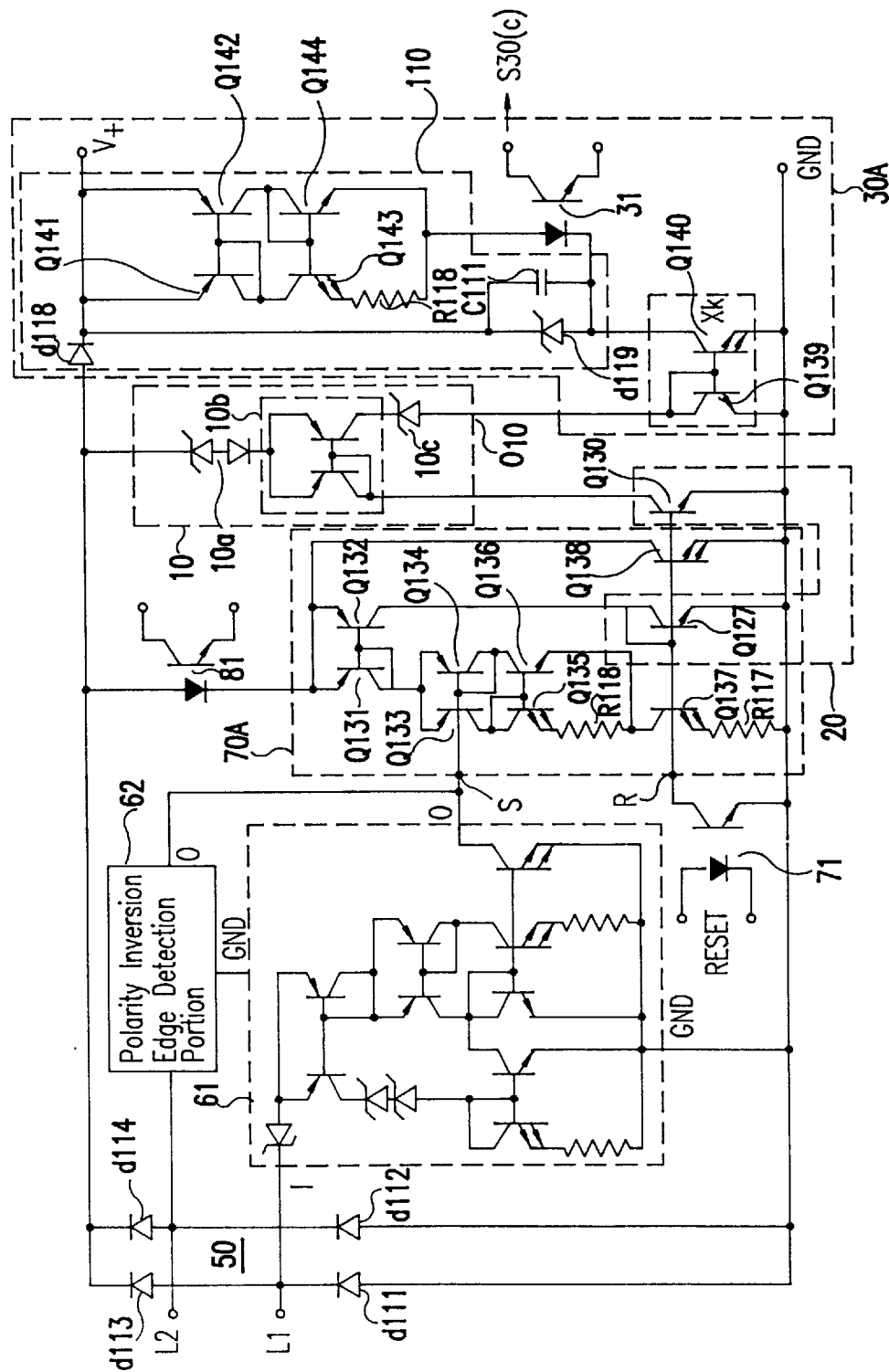
FIG. 17 is a circuit diagram illustrating a structural example (example 2) of the bell signal detection circuit.

FIG. 17 is a circuit diagram illustrating a structural example (example 2) of the bell signal detection circuit.

This bell signal detection circuit is provided with a polarity inversion detection circuit 90 that is constituted with a first polarity inversion edge detection portion 61, a second polarity inversion edge detection portion 62, photocouplers 71 and 81 that are identical to those shown in FIG. 16 and a polarity inversion detection holding circuit 70A that is structured differently from that shown in FIG. 16. It is further provided with a means for strobe input 20 that is constituted with a current mirror circuit that utilizes a transistor within the holding circuit 70A in the polarity inversion detection circuit 90 as an input transistor, a high voltage detection portion 10 that is constituted with the current mirror portion 10b, the first constant voltage circuit 10a and the second constant voltage circuit 10c shown in FIG. 1, and a means for output communication 30A that is different from the one shown in FIG. 16.

The polarity inversion detection holding circuit 70A is provided with two transistors Q131 and Q132 whose emitters are connected to the source V+ via the input side of the photocoupler 81. The bases of the transistors Q131 and Q132 are connected to the collector of the transistor Q131. The collector the transistor Q131 is connected to the emitters of transistors Q133 and Q134. The bases of the transistors Q133 and Q134 are connected to the collector of the transistor Q134 and are also connected to the set terminal S. The collector of a transistor Q135 is connected to the collector of the transistor Q133 and the collector of a transistor Q136 is connected to the collector of the transistor Q134. The bases of the transistors Q135 and Q136 are connected to the collector of the transistor Q135. The collector of a transistor Q137 is connected to the emitter of the transistor Q135 via a resistor R116. The emitter of the transistor Q136 is directly connected to the collector of the transistor Q137. The emitter of the transistor Q137 is connected to the ground GND via a resistor R117.

The collector of the transistor Q132, on the other hand, is connected to the collector of the transistor Q127 which constitutes a portion of the means for strobe input 20 as in FIG. 16. In addition, the collector of a transistor Q138 is connected to the input side of the photocoupler 81. The emitters of the transistors Q127 and Q138 are connected to the ground GND. The bases of the transistors Q127, Q137 and Q138 together with the base of the transistor Q130 in the means for strobe input 20, are connected to the collector of the transistor Q138 and the reset terminal R The emitter of the transistor Q130 is connected to the ground GND.

The means for output communication 30A is provided with a current mirror circuit that is constituted with a transistor Q139 and a transistor Q140. The collector of the transistor Q139 is connected to the output terminal 010 of the high voltage detection portion 10, with the bases of the transistors Q139 and Q140 connected to the collector of the transistor Q139 and the emitters of the transistors Q139 and Q140 connected to the ground GND. The collector of the transistor Q140 is connected to one end of the input side of the photocoupler 31. The photocoupler 31 outputs a bell signal detection signal S30(C).

This means for output communication 30A is provided with a pulse width expanding circuit 110 that expands the pulse width of the bell signal detection signal S30(C) output by the photocoupler 31. The pulse width expanding circuit 110 is provided with a diode d118 whose anode is connected to the source V+. The cathode of the diode d118 is connected to the cathode of a zener diode d119, one of the electrodes of a capacitor C111 and the emitters of two transistors Q141 and Q142.

The anode of the zener diode d119 and the other electrode of the capacitor C111 are connected to the connection point of the collector of the transistor Q140 and the photocoupler 31. The bases of the transistors Q141 and Q142 are connected to the collector of the transistor Q141. The collector of a transistor Q143 is connected to the collector of the transistor Q141, whereas the collector of a transistor Q144 is connected to the collector of the transistor Q142. The bases of the transistors Q143 and Q144 are connected to the collector of the transistor Q144.

The emitter of the transistor Q143 is connected to the other end of the input side of the photocoupler 31 via a resistor R118. The emitter of the transistor Q144 is directly connected to the other end of the input side of the photocoupler 31. These transistors Q141 through Q144 and the resistor R118 constitute a constant current source for the photocoupler 31.

When a bell signal is provided, a current which corresponds to the pulsating current in the bell signal is output from the high voltage detection portion 10. This output current is input to the current mirror circuit, which is constituted with the transistor Q139 and the transistor Q140. If the voltage value of the source V+ is high, the constant current source constituted with the transistors Q141 through Q144 and the resistor R118 outputs a constant current that runs through the photocoupler 31 and then to the ground GND via the transistor Q140. If the collector current at the transistor Q140 which constitutes the output of the current mirror circuit is set higher than the constant current at the constant current source constituted with the transistors Q141 through Q144 and the resistor R118, the excess current occurring at this point charges the capacitor C111. The zener diode d119 functions to ensure that overcharge of the capacitor C111 does not occur. Even if the output current from the high voltage detection portion 10 is momentarily cut off in a state in which the capacitor C111 has been charged, the constant current source supplies a current to the photocoupler 31 using the charge at the capacitor C111 as a source. Thus, the pulse width is expanded.

In the circuit shown in FIG. 16, which does not employ the pulse width expanding circuit 110, a pulse train signal which synchronizes with a bell signal at 16 Hz or 32 Hz as indicated with the output signal S30(A) or S30(B), is generated, whereas in the circuit example shown in FIG. 17, the pulse width of the bell signal detection signal is expanded by the pulse width circuit 110 added to the means for output communication 30A in the high voltage detection circuit 100, thereby setting the interval at which the output voltage from the full wave rectifier circuit 50 pulsates.

Figure 18:
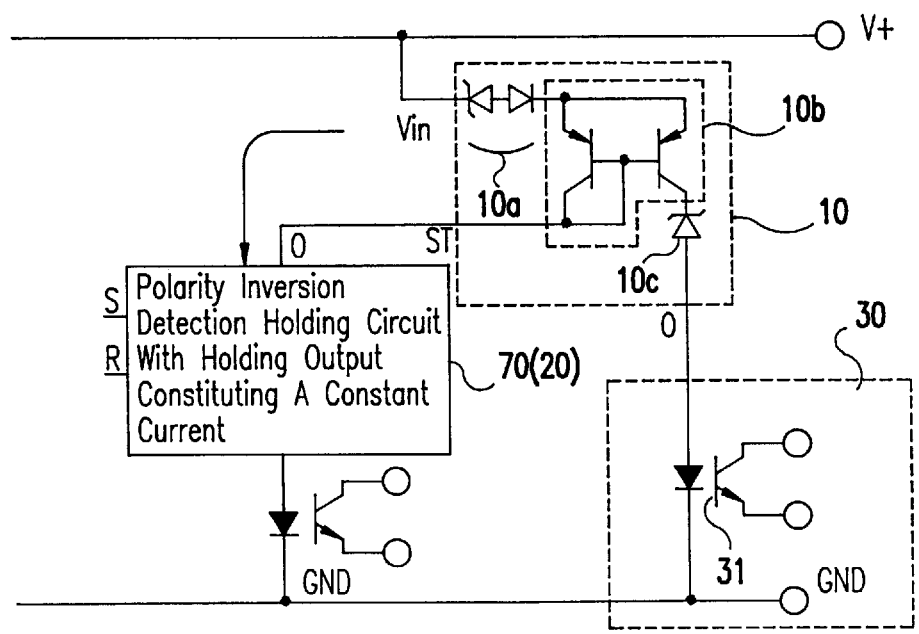
FIG. 18 is a circuit diagram illustrating the essential portion of a structural example (example 3) of the bell signal detection circuit.
Figure 19:
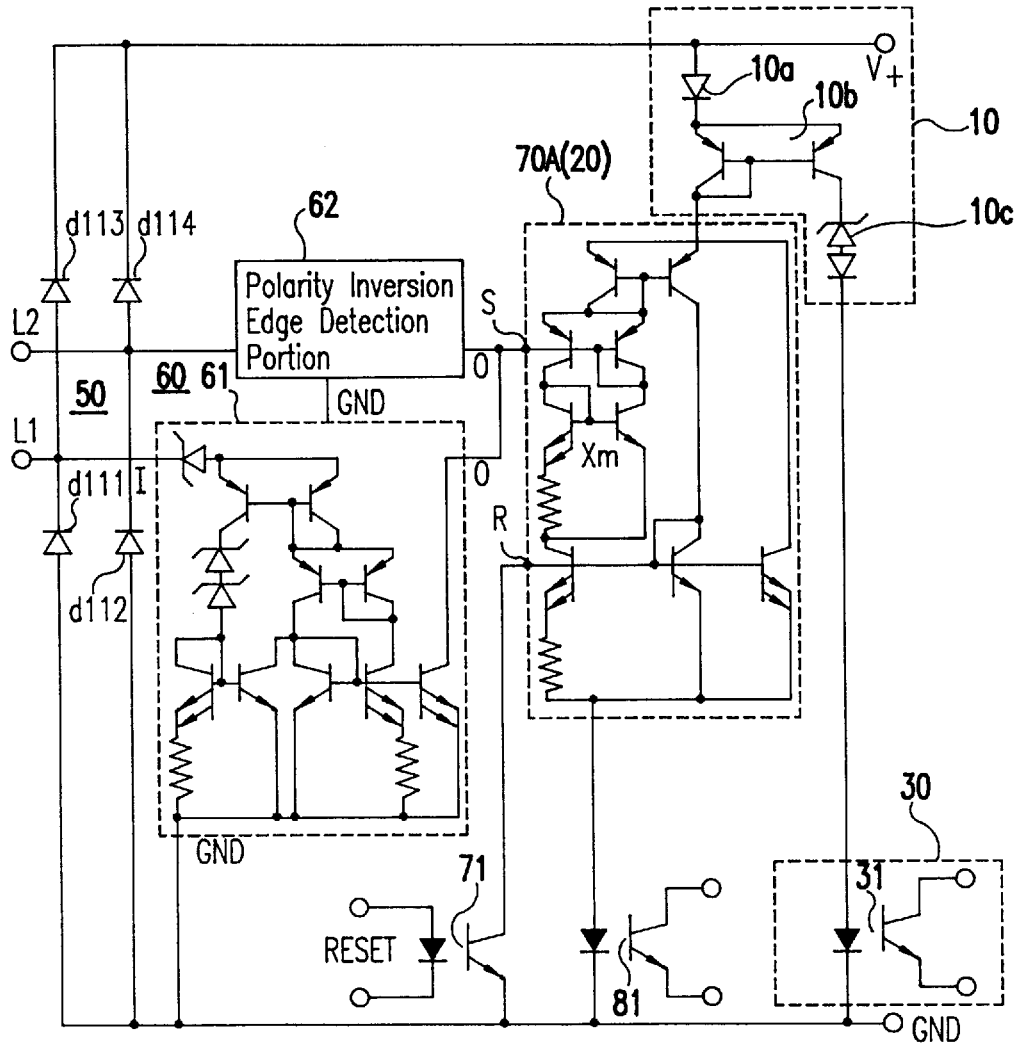
FIG. 19 is a specific circuit example of the bell signal detection circuit in FIG. 18.

FIG. 18 is a circuit diagram illustrating the essential portion of a structural example (example 3) of the bell signal detection circuit, and FIG. 19 shows a specific example of the circuit shown in FIG. 18, with the same reference numbers assigned to elements identical to those shown in FIGS. 16 and 17.

In this bell signal detection circuit, the polarity inversion detection holding circuit 70, in which the signal that is held and output there from is a constant current, is utilized directly to constitute the means for strobe input 20 of the high voltage detection circuit 100. The bell signal detection circuit is constituted by employing the current mirror portion 10b, the first constant voltage circuit 10a and the second constant voltage circuit 10c to constitute the high voltage detection portion 10 of its high voltage detection circuit 100 and employing the photocoupler 31 to constitute the means for output communication 30 of the high voltage detection circuit 100.

The specific example of the circuit shown in FIG. 19 is provided with a full wave rectifier circuit 50, first and second polarity inversion edge detection portions 61 and 62 and photocouplers 71 and 81, which are identical to those shown in FIGS. 16 and 17, a polarity inversion detection holding circuit 70A identical to the one shown in FIG. 17, a high voltage detection portion 10 identical to the one shown in FIG. 16 and a means for output communication 30 constituted with the photocoupler 31 shown in FIG. 10(b).

When the polarity inversion detection holding circuit 70 is utilized directly to constitute the means for strobe input 20 in this manner, while there is a restriction that applies in that the constant voltage at the first constant voltage circuit 10a of the high voltage detection portion 10 must be set low to ensure that the polarity inversion detection holding circuit 70 can be turned on when the polarity inversion edge detection portion 60 outputs a polarity inversion edge detection trigger, a highest degree of simplicity is achieved in its structure.

Figure 20:
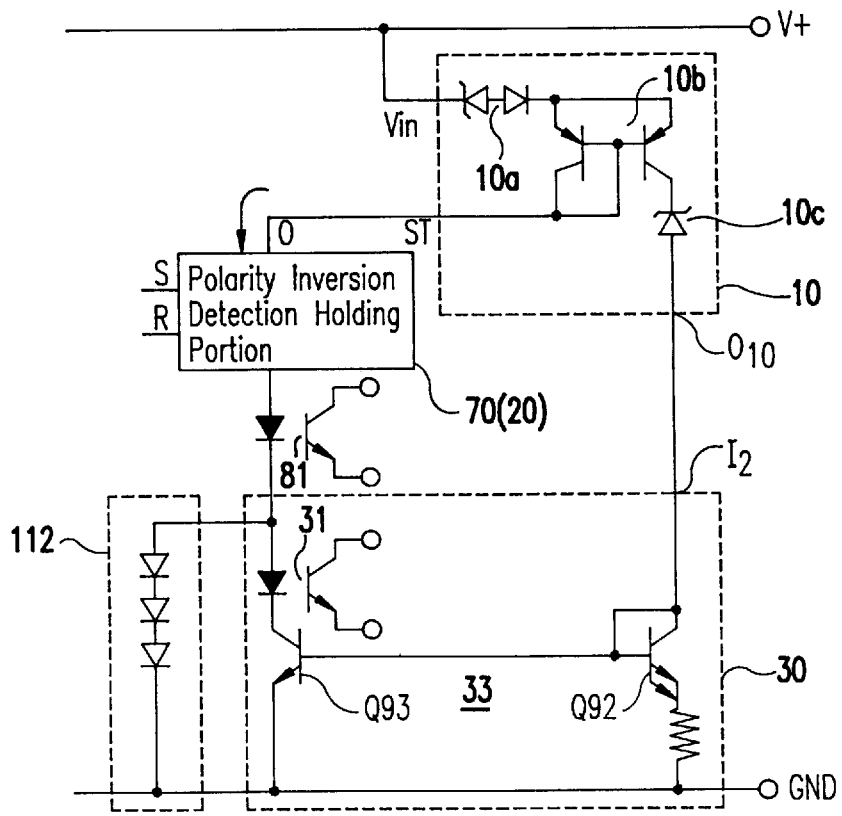
FIG. 20 is a circuit diagram illustrating the essential portion of a structural example (example 4) of the bell signal detection circuit.
Figure 21A:
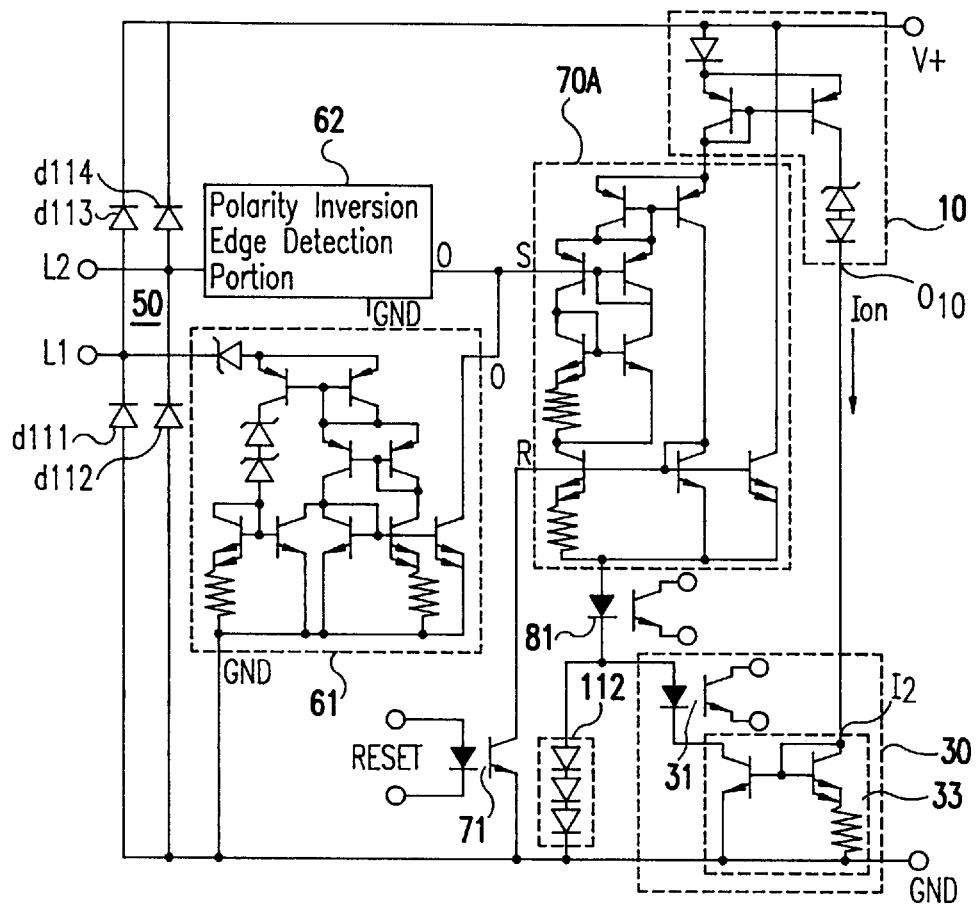
FIG. 21A–21B shows a specific circuit example of the bell signal detection circuit in FIG. 20.

FIG. 20 is a circuit diagram illustrating the essential portion of a structural example (example 4) of the bell signal detection circuit and FIGS. 21(a) and (b) show specific examples of the bell signal detection circuit shown in FIG. 20, with the same reference numbers assigned to elements identical to those shown in FIGS. 16 and 17.

In this bell signal detection circuit, the polarity inversion detection holding circuit 70, which is constituted as a circuit that outputs a constant current that can be turned on/off, is employed as the means for strobe input 20 in the high voltage detection circuit 100 and the current mirror portion 10b, the first constant voltage circuit 10a and the second constant voltage element 10c constitutes the high voltage detection portion 10 in the high voltage detection circuit 100, with the output terminal 010 of the high voltage detection portion 10 connected to the input terminal 12 of the non-linear current amplifier 33 shown in FIG. 10(e) which is a component of the means for output communication 30. The common terminal COM of the non-linear current amplifier 33 is connected to the ground GND. The output current at the output terminal at the side with the reverse polarity in the polarity inversion detection holding circuit 70 is supplied to the photocoupler 81 constituting the means for output and, furthermore, the current running through the photocoupler 81 is then supplied to a voltage clamping circuit 112 constituted with diodes to create a clamped voltage. One end on the input side of the photocoupler 31 which is another component of the means for output communication 30 is connected to the voltage clamping circuit 112 and the other end of the input side of the photocoupler 31 is connected to the output terminal of the non-linear current amplifier 33.

The value of the input current at the non-linear current amplifier 33 (the output current from the high voltage detection portion 10) is set to ensure that the non-linear current amplifier 33 is engaged in a switching operation. The clamped voltage generated at the voltage clamping circuit 112 is set sufficiently larger than the input voltage achieved when the photocoupler 31 is on, to ensure that when the photocoupler 31 is on, most of the current that has been running through the diodes of the voltage clamping circuit 112 (the output current from the polarity inversion detection holding circuit 70) runs through the input portion of the photocoupler 31.

Figure 21B:
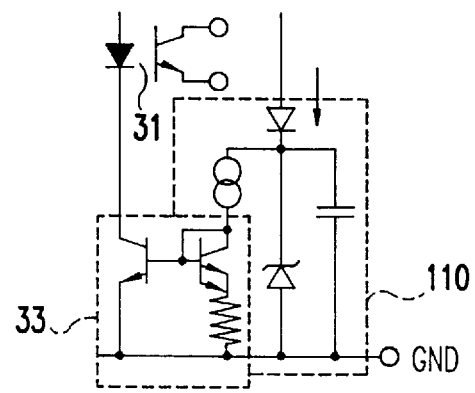

In addition, by adding a pulse width expanding circuit 110 between the output terminal of the high voltage detection portion 10 in the high voltage detection circuit 100 and the input terminal of the non-linear current amplifier 33, as shown in FIG. 21(b), the output pulse waveform of the bell signal detection signal S30 can be further improved (with only a momentary cut-off when the polarity inverts).

In the bell signal detection circuit shown in FIGS. 20 and 21 (a) and (b), the current running through the photocoupler 81 constituting the means for output 80 of the polarity inversion detection circuit 90 is also utilized to drive the photocoupler 31 which outputs the bell signal detection signal S30(C), achieving effective utilization of the current. In addition, the number of elements to which the high voltage is applied can be reduced (since the high voltage is not applied to the non-linear current amplifier 33 that drives the photocoupler 31).

Figure 22:
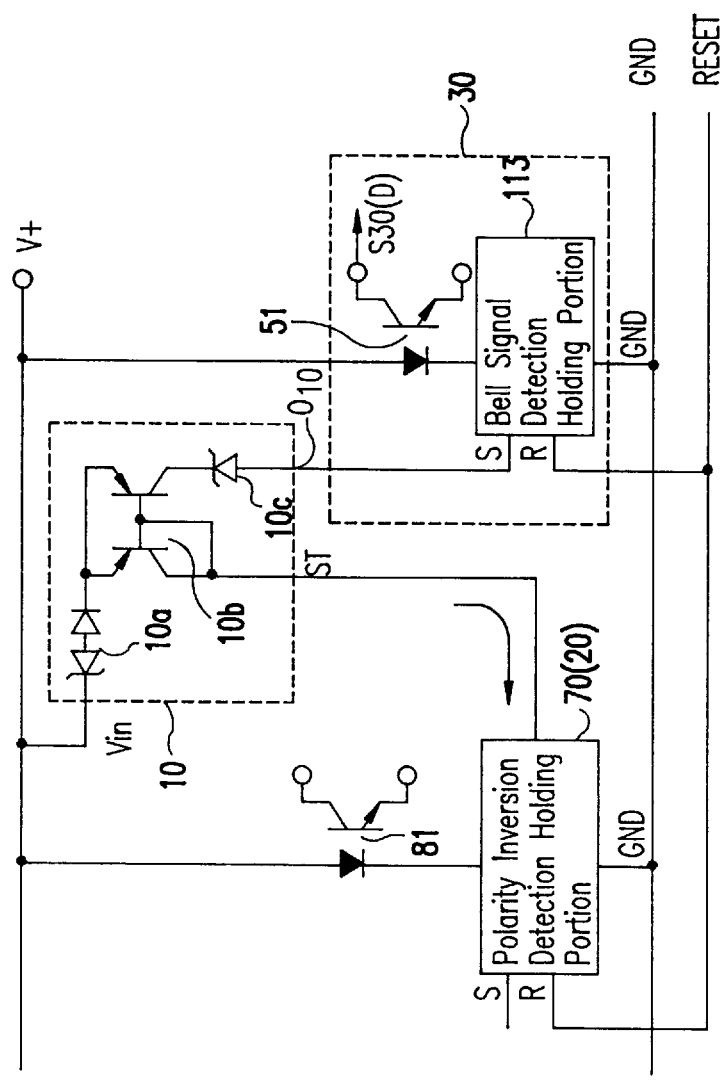
FIG. 22 is a circuit diagram illustrating the essential portion of a structural example (example 5) of the bell signal detection circuit.
Figure 23:
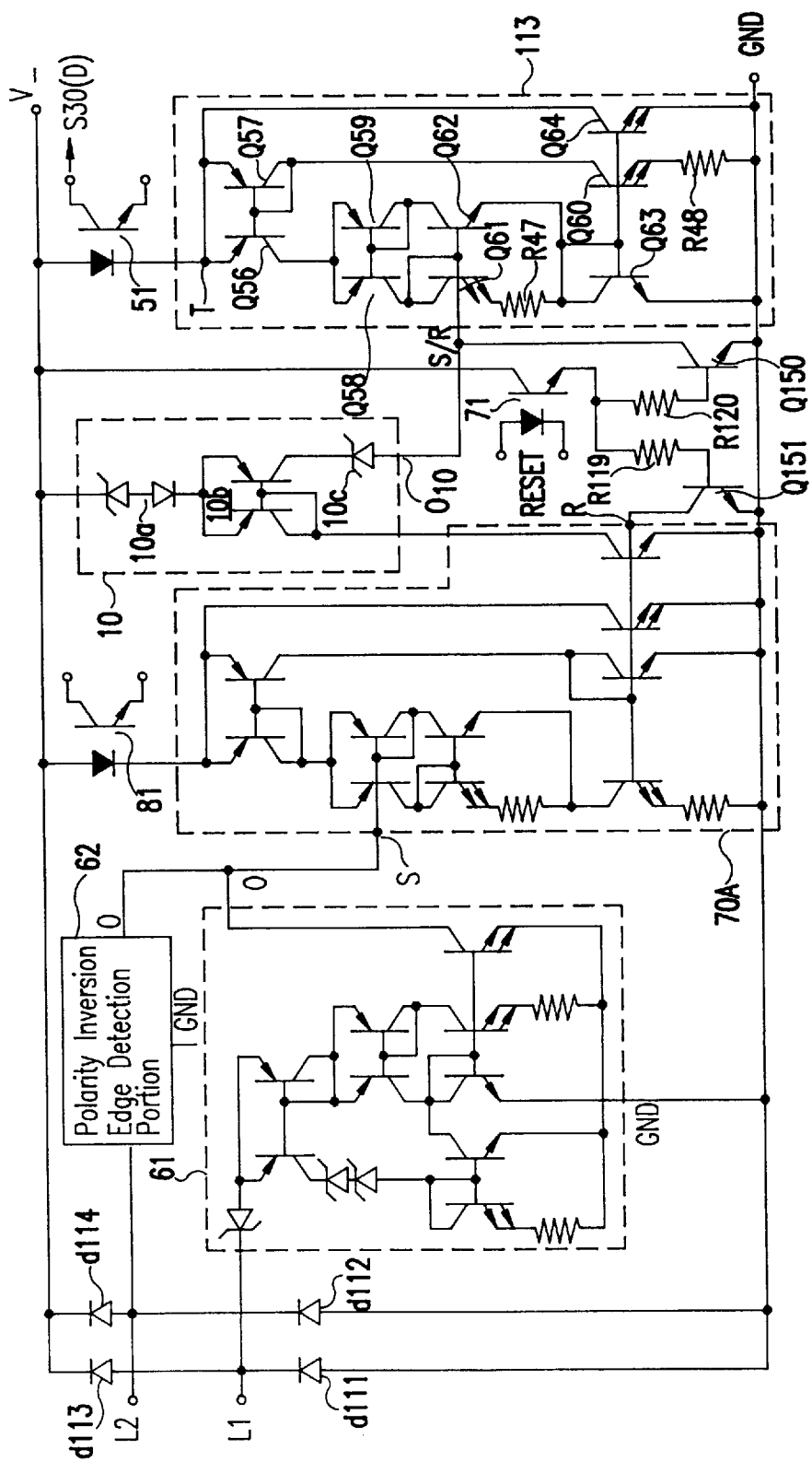
FIG. 23 shows a specific circuit example of the bell signal detection circuit in FIG. 22.

FIG. 22 is a circuit diagram illustrating the essential portion of a structural example (example 5) of the bell signal detection circuit and FIG. 23 shows a specific example of the bell signal detection circuit shown in FIG. 22. In FIGS. 22 and 23, the same reference numbers are assigned to elements that are identical to those shown in FIGS. 16 and 17.

In this bell signal detection circuit, the polarity inversion detection holding circuit 70, which outputs a constant current, constitutes the means for strobe input 20 of the high voltage detection circuit 100, and the current mirror portion 10b, the first constant voltage circuit 10a and the second constant voltage circuit 10c constitute the high voltage detection portion 10 in the high voltage detection circuit 100. The means for output communication 30 is connected to the output terminal 010 of the high voltage detection portion 10. The means for output communication 30 is constituted with a bell signal detection holding portion 113 that supplies a constant current by turning it on/off with a set/reset input signal, with its set input terminal S connected with the output terminal 010 of the high voltage detection portion 10 and a reset signal from the outside input to its reset input terminal R. The bell signal detection signal with a constant current output from this bell signal detection holding portion 113, drives a photocoupler 51.

In the specific structural example shown in FIG. 23, the polarity inversion detection holding circuit 70A shown in FIG. 17 is employed to constitute the polarity inversion detection holding circuit that constitutes the means for strobe input 20, with its reset terminal R connected to the collector of a transistor Q151 whose emitter is, in turn, connected to the ground GND and whose base is connected to the output side of the photocoupler 71, at the input side of which a reset signal RESET is input via a resistor R119. The flip-flop shown in FIG. 9(c) with its terminal T connected to the input side of the photocoupler 51 and its terminal Itri+ constituting a set and reset terminal S/R, is employed to constitute the bell signal detection holding portion 113. The set/reset terminal S/R of the bell signal detection holding portion 113 is connected to the output terminal 010 of the high voltage detection portion 10 and are also connected to the collector of the transistor Q150. The emitter of the transistor Q150 is connected to the ground GND, and the output side of the photocoupler 71 is connected to the base of the transistor Q150 via a resistor R120.

By constituting the means for output communication 30 with the bell signal detection holding portion 113 which, in turn, is constituted with the flip-flop that holds a detection signal from the high voltage detection portion 10, the pulse width can be expanded as indicated with the bell signal detection signal S30(D) to the voltage cross point due to the polarity inversion without having to employ a capacitor. This facilitates identification of the bell signal detection signal by an external device or the like. However, if the bell signal ends in a positive phase, the bell signal detection signal S30(D) is held and, therefore, it is necessary to reset it by providing a reset signal with appropriate timing.

While examples of the bell signal detection circuit employing the high voltage detection circuit in the first embodiment are shown in FIGS. 16 through 23, it is to be noted that if the detection threshold voltage Vth at the high voltage detection circuit is set high relative to the voltage Vm between the lines in a standby state, a large noise margin results. However, when the detection threshold voltage Vth is set relatively high, the range of time during which the rectified pulsating current exceeds the detection threshold voltage Vth becomes narrower, resulting in a thinner pulse train in the bell signal detection signal S30. In contrast, if the voltage Vth is set relatively low, close to the voltage Vm between the lines in a standby state, the pulse train in the bell signal detection signal S30 becomes thicker, which makes it easier to identify the signal with an external circuit but which also results in a smaller noise margin. Although the structural example shown in FIGS. 16 through 23 do not include a response speed limiting circuit in the high voltage detection portion 10 of the high voltage detection circuit, by adding one of the response speed limiting circuits shown in FIGS. 3, 4(a), (b), 5 and 6, a sufficient noise margin is assured while making it possible, at the same time, to set the detection threshold voltage Vth closer to the line voltage Vm in a standby state.

In addition, while noise constituting a rising input may cause erroneous operation in a case in which high voltage detection is essentially utilized as an edge trigger, as in FIGS. 22 and 23, or in a case in which the pulse width expanding circuit 110 is employed, as shown in FIGS. 17 and 21(b), a momentary cut-off of input due to noise constituting a falling input does not present any problem. Consequently, an advantage is obtained by adding one of the response speed limiting circuits shown in FIGS. 4(a), 5 and 6.

As has been explained, since the various bell signal detection circuits in the second embodiment employ the high voltage circuit with a strobe explained in reference to the first embodiment, the following advantages are achieved.

(b1) Since the bell signal detection circuit is structured so that AND processing is performed on the results of the polarity inversion detection that are held and output by the polarity inversion detection holding circuit 70 or 70A and the detection of the high voltage, a high voltage noise during standby and a high voltage during an insulation test that is not accompanied by polarity inversion can be disregarded and, therefore, erroneous operation is prevented.

(b2) By adding the pulse width expanding circuit 110, for instance, to the means for output communication 30 of the high voltage detection circuit 100, a bell signal detection signal S30(C) in which a bell signal rectified pulsating current input period constitutes one pulse is achieved.

(b3) By employing a flip-flop in which a constant current is turned on/off by set/reset signals for the bell signal holding portion 113 to constitute the means for output communication 30 of the high voltage detection circuit 100, the pulse waveform of the bell signal detection signal can be improved without having to employ a capacitor.

(b4) By adding a response speed limiting circuit to the high voltage detection portion 10 of the high voltage detection circuit 100, erroneous operation caused by noise is reduced.

(b5) By employing the holding circuit of the polarity inversion detection circuit directly as the means for strobe input 20 of the high voltage detection circuit 100, the number of circuit elements can be reduced.

(b6) By utilizing a common current for driving the photocoupler 81 which performs output in the means for output 80 of the polarity inversion detection circuit 90 and for driving the photocoupler 31 for outputting the bell signal detection signal S30, efficient utilization of the line current running through the lines L1 and L2 or doubling of the photocoupler current is achieved and, at the same time, it becomes possible to reduce the number of circuits to which a high voltage is applied.

Third Embodiment

Figure 24:
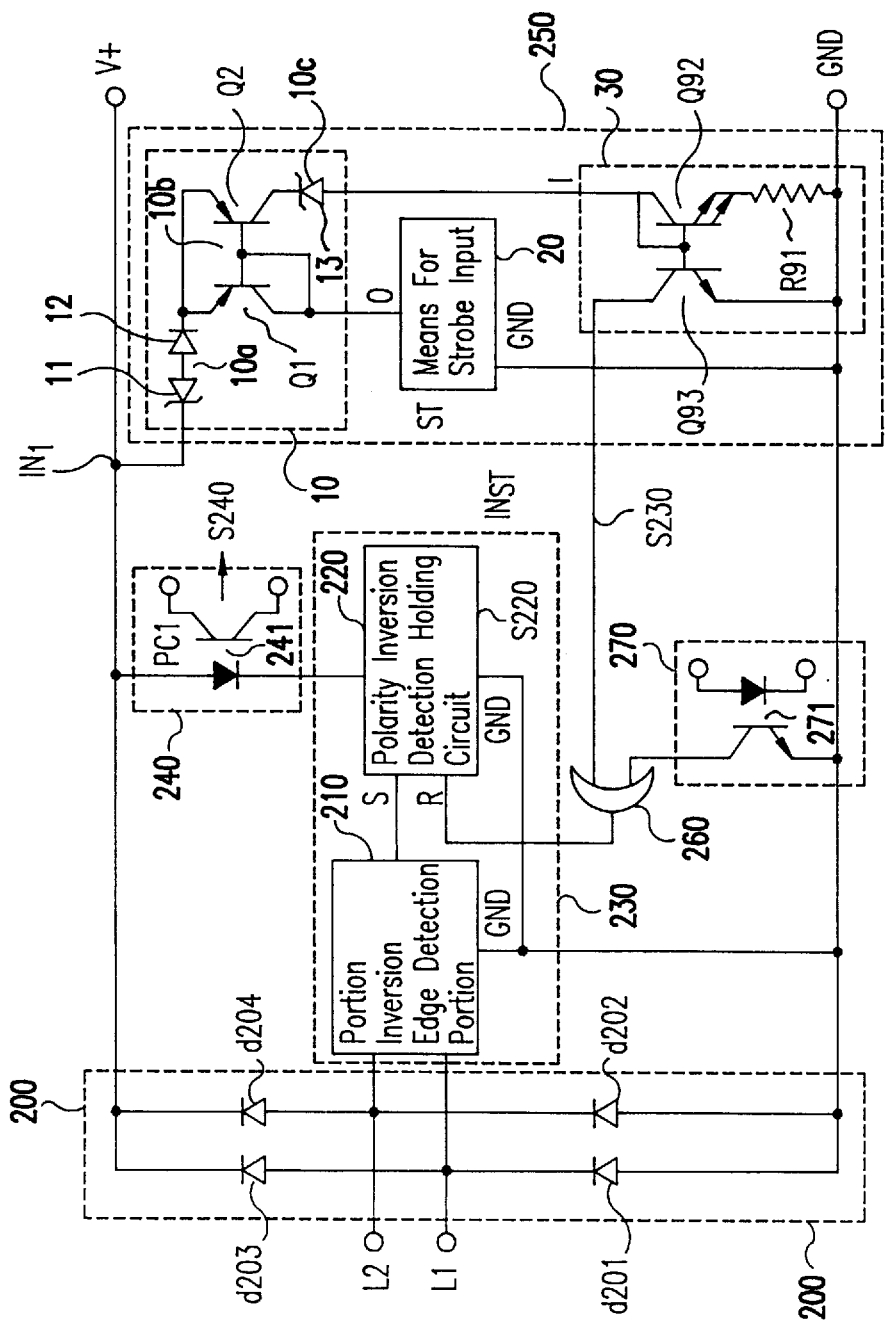
FIG. 24 is a schematic circuit diagram of the non-ringing reception detection circuit in the third embodiment according to the present invention.

FIG. 24 is a schematic diagram of a non-ringing reception detection circuit in the third embodiment according to the present invention.

In the telephone lines L1 and L2, when a normal call arrives, a polarity inversion from a standby state occurs, indicating a call reception and then a high voltage bell signal is provided. In the case of non-ringing call, the high voltage bell signal is not provided. The non-ringing reception detection circuit shown in FIG. 24 creates polarity inversion information by detecting a polarity inversion in the lines L1 and L2, detects a bell signal which is provided immediately afterwards and clears (resets) the polarity inversion information to set the polarity inversion information in the form of a bearded pulse or in a zero state (at least during input of a bell AC signal). Since a bell signal does not arrive following a polarity inversion in the case of a non-ringing call, i.e., in the case of a non-ringing reception, the polarity inversion information is continuously held until it is reset from the outside.

As a result, following detection of a polarity inversion, which indicates a call reception, by performing another check on the polarity inversion information in order to ascertain whether it is in a bearded pulse form (or in a zero state) or in the form of a DC signal after allowing a specific length of time over which the bell signal will have arrived if the incoming call is a normal call, it is possible to identify whether a normal call or a non-ringing call has arrived.

The non- ringing reception detection circuit shown in FIG. 24 comprises four diodes d201 through d204, and is provided with a full wave rectifier circuit 200 which performs full wave rectification on the feed from a pair of telephone lines L1 and L2 to supply a voltage with a constant polarity A polarity inversion edge detection portion 210 which, upon receiving a source supply from the full wave rectifier circuit 200, detects a polarity inversion edge between the lines L1 and L2, is connected to the full wave rectifier circuit 200. A polarity inversion detection holding circuit 220 that holds edge detection information output by the polarity inversion edge detection portion 210 until there is a reset input from the outside or until the source supply is cut off and outputs the information as a polarity inversions detection signal S220 is connected to the polarity inversion edge detection portion 210. The full wave rectifier circuit 200, the polarity inversion edge detection portion 210 and the polarity inversion detection holding circuit 220 constitute a polarity inversion detection circuit 230.

The polarity inversion detection holding circuit 220 is provided with two output terminals. A means for polarity inversion detection output communication 240 that outputs the polarity inversion information to the outside is connected to one of the output terminals. The means for polarity inversion detection output communication 240 may be constituted by employing, for instance, a photocoupler 241, with one end of the input of the photocoupler 241 connected to the polarity inversion detection holding circuit 220 and the other end connected to the source V+ set by the full wave rectifier circuit 200. The other output terminal of the polarity inversion detection holding circuit 220 is connected to a high voltage detection circuit 250. The high voltage detection circuit 250 is constituted with a circuit selected from the high voltage detection circuits explained in reference to the first embodiment and is provided with the high voltage detection portion 10, the means for strobe input 20 and the means for output communication 30. FIG. 24 shows an example in which the means for output communication 30 is constituted with the circuit shown in FIG. 10(*e*). The voltage input terminal IN1 of the high voltage detection circuit 250 is connected to the source V+, the strobe terminal INst is connected to an output terminal of the polarity inversion detection holding circuit 220 and a ground terminal GND is connected to the ground GND set by the full wave rectifier circuit 200.

The output side of the means for output communication 30 in the high voltage detect ion circuit 250 is connected to one of the inputs of a two-input OR circuit 260 which constitutes a means for OR. The output side of a means for reset input 270 that communicates a reset signal RESET provided from the outside to the OR circuit 260 is connected to the other input side of the OR circuit 260 The means for reset input 270 may be constituted with, for instance, a photocoupler 271. The output terminal of the OR circuit 260 is connected to a reset terminal R of the polarity inversion detection holding circuit 220.

Figure 25:
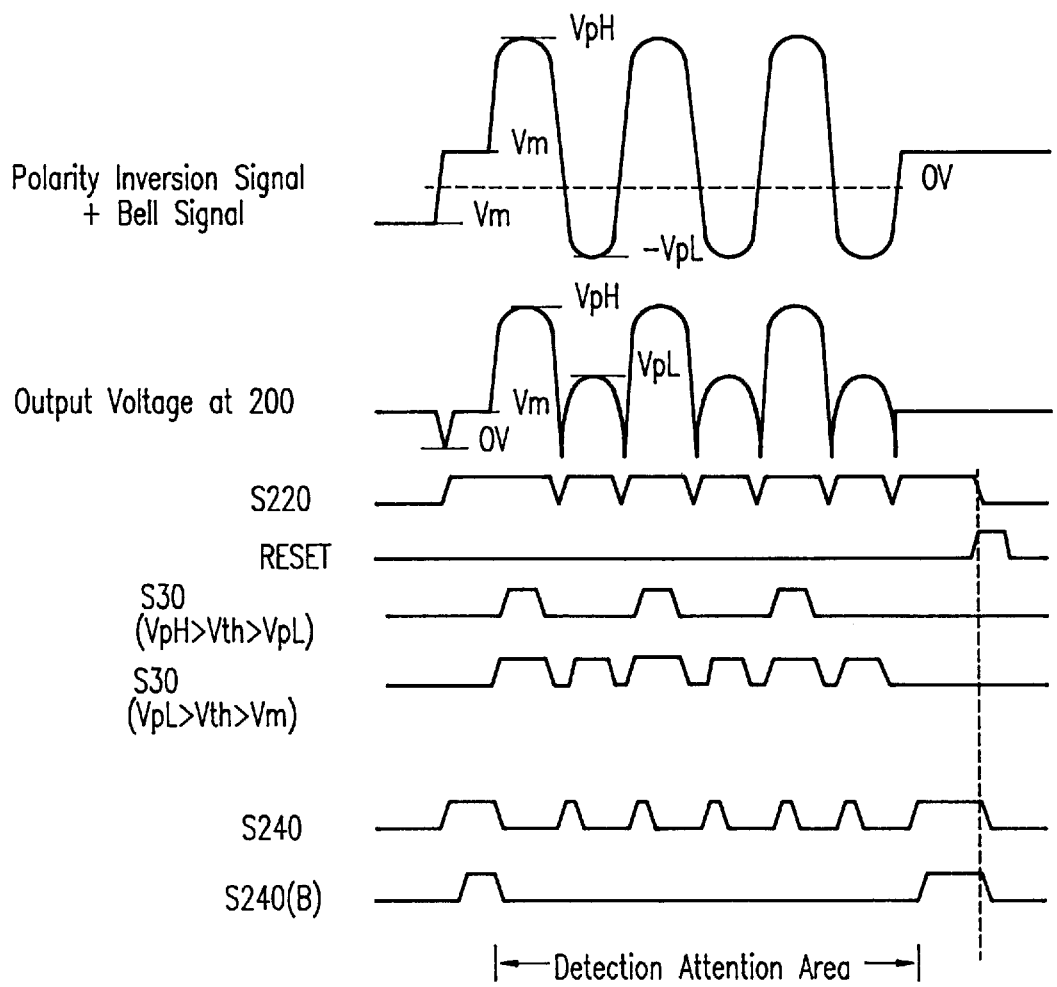
FIG. 25 is a waveform diagram (part 1) illustrating the operation of the non-ringing reception detection circuit in FIG. 24.
Figure 26:
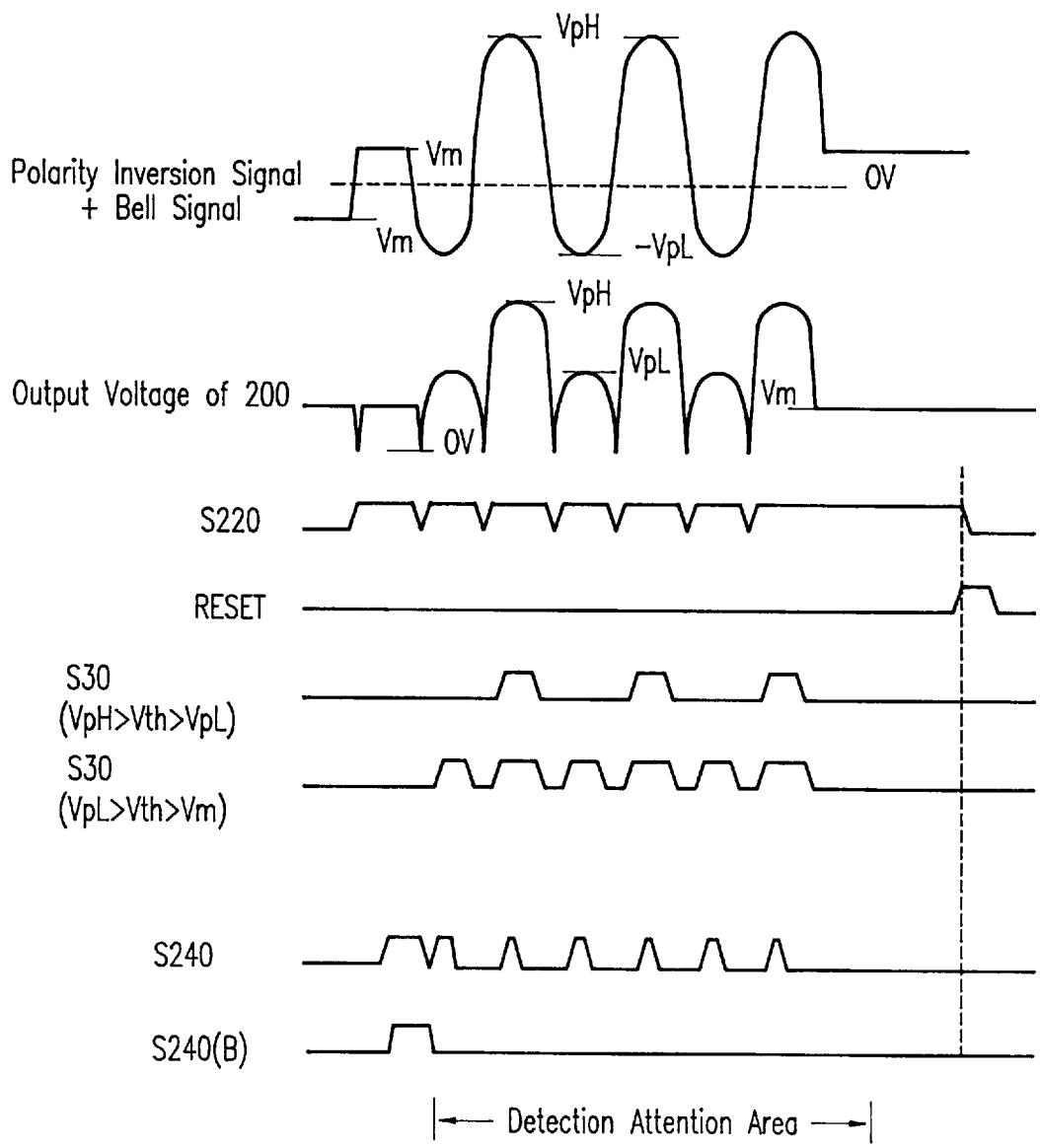
FIG. 26 is a waveform diagram (part 2) illustrating the operation of the non-ringing reception detection circuit in FIG. 24.

FIGS. 25 and 26 are a waveform diagram (part 1 and part 2) illustrating the operation performed by the non-ringing reception detection circuit shown in FIG. 24 and the operation of the circuit in FIG. 24 is explained in reference to FIGS. 25 and 26.

The detection threshold voltage Vth at the high voltage detection circuit 250 is set at a value that is equal to or greater than the voltage Vm between the lines in a standby state and is also equal to or lower than the minimum peak value VpL of the two peak values, i.e., the large and small peak values of the full wave rectified pulsating current in the bell signal.

In the standby state, with the polarity inversion detection holding circuit 220 of the polarity inversion detection circuit 230 having been reset by a reset signal RESET provided from the outside at the completion of the previous call, the polarity inversion detection signal S220 is in a zero state (no current). When a valid polarity inversion detection signal S220 is output, this signal S220 functions as the strobe control signal ST of the high voltage detection circuit 250, but when it is in a zero state, the high voltage detection circuit 250 does not perform a high voltage detection operation. In other words, a high voltage detection signal S30 is not output.

When a polarity inversion occurs between the lines L1 and L2 indicating a call reception, the polarity inversion detection circuit 230 detects the polarity inversion edge with the polarity inversion edge detection portion 210. This information is held at the polarity inversion detection holding circuit 220 and the output current S220 drives the means for polarity inversion detection output communication 240. By driving the means for polarity inversion detection output communication 240, the polarity inversion information S240 is sent to the outside. Furthermore, the polarity inversion detection holding circuit 220 provides the high voltage detection circuit 250 with a valid polarity inversion detection signal S220. The polarity version detection signal S220 becomes the strobe control signal ST and thus, the high voltage detection circuit 250 commences high voltage detection operation. At this point, the voltage between the lines L1 and L2 following the polarity inversion at the time of the call reception is the same as the voltage between the lines during standby and, since it is equal to or lower than the detection threshold Vth, a zero state is maintained in the output signal S30 from the high voltage detection circuit 250.

In the event of a non-ringing reception, since no bell signal is provided, a DC polarity inversion detection signal S240 is sent to the outside and this state is maintained. In the event of a normal call reception, on the other hand, a bell signal arrives following the polarity inversion signal. When the bell signal is input, since the amplitude of the bell signal is greater than that of the voltage between the lines in the standby state, a polarity inversion occurs every half wave of the bell signal and, as a result, the output voltage from the full wave rectifier circuit 200 becomes a pulsating current in which a large peak alternates with a small peak. The polarity inversion detection circuit 230 detects polarity inversion continuously with a temporary release at the time of potential crossover in the polarity inversion, and in a manner identical to that explained earlier, drives the means for polarity inversion detection output communication 240 to send polarity inversion information S240 to the outside. Concurrently with this, the polarity inversion detection circuit 230 provides the high voltage detection circuit 250 with the strobe control signal ST. Upon receiving the strobe control signal ST, the high voltage detection circuit 250 becomes active, and when the output voltage from the full wave rectifier circuit 200 exceeds the detection threshold Vth, it outputs a valid high voltage detection signal S30 through the means for output communication 30. The valid high voltage detection signal S30 output through the means for output communication 30 travels through the OR circuit 260 and is provided to the reset terminal R of the polarity inversion detection holding circuit 220. The polarity inversion detection holding circuit 220 releases the holding of the polarity inversion detection information to stop the supply of current to the means for polarity inversion detection output communication 240. With this, the polarity inversion information S240 output from the means for polarity inversion detection output communication 240 to the outside is set to 0.

While the bell signal is being input, the processing comprising polarity inversion edge detection→holding of the information→high voltage detection, and the release of the holding of polarity inversion detection information is repeated, the polarity inversion information S240 output by the means for polarity inversion detection output communication 240 achieves the form of a thin bearded pulse. Depending upon whether the phase of the bell signal when it stops is positive or negative, the polarity inversion detection signal S240 sustains a state in which the polarity inversion information is held (FIG. 25) or released (FIG. 26). Even when the state in which the polarity inversion information is held is sustained, a released state is achieved by a reset signal RESET provided from the outside.

By checking with an external device whether the polarity inversion detection signal S240 after the detection of the polarity inversion at the time of a call reception constitutes a bearded pulse train containing a pause (by detecting the presence of a zero state) or if it remains a DC signal, it is possible to identify whether the incoming call is a normal call or a non-ringing call.

After the reception of the call is verified and the call is identified by the external device, a reset signal RESET output by a circuit in the external device is provided to the means for reset input 240 at an appropriate point in time, which then travels through the OR circuit 260 to be input to the reset terminal R of the polarity inversion detection holding circuit 220. The polarity inversion detection holding circuit 220 then releases the polarity inversion detection information and returns to a standby state.

Figure 27:
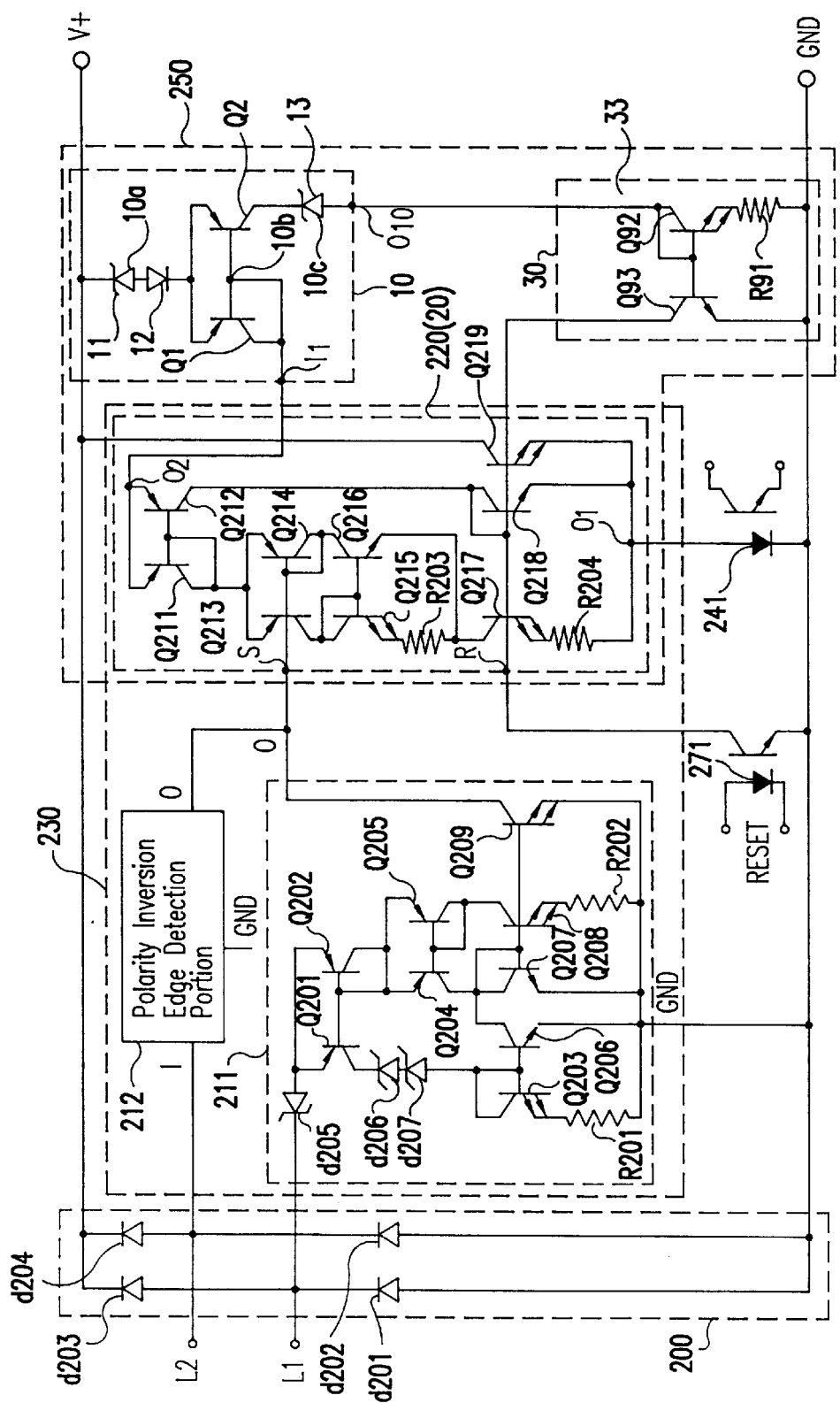
FIG. 27 is a circuit diagram illustrating a specific structural example of the non-ringing reception detection circuit in FIG. 24.

FIG. 27 is a circuit diagram illustrating a specific structural example of the circuit shown in FIG. 24.

The full wave rectifier circuit 200 in the non-ringing reception detection circuit in FIG. 27 is constituted with four diodes d201 through d204. The polarity inversion edge detection portion 210 is constituted with a first polarity inversion edge detection portion 211 which detects a polarity inversion whereby the line L1 shifts to "H" and a second polarity inversion edge detection portion 212, which detects a polarity inversion whereby the line L2 shifts to "H" both structured identically to the polarity inversion edge detection portions 61 and 62 shown in FIG. 16.

The output terminals 0 of the polarity inversion edge detection portions 211 and 212 are connected to each other to constitute a wired OR circuit. The output terminals 0 of the polarity inversion edge detection portions 211 and 212 thus connected are connected to a set terminal S of the polarity inversion detection holding circuit 220. The polarity inversion detection holding circuit 220 is constituted with a circuit that employs a system in which a constant current is turned on/off and output, and is also employed as the means for strobe input 20.

One output terminal 01 of the polarity inversion detection holding circuit 220 is connected to the input side of a photocoupler 241 of the means for polarity inversion detection output communication 240 and the other output terminal 02 is connected to the high voltage detection portion 10 in the high voltage detection circuit 250. The polarity inversion detection holding circuit 220 is provided with two transistors Q211 and Q212 whose emitters are connected to the output terminal 02. The bases of the transistors Q211 and Q212 are connected to the collector of the transistor Q211. The collector of the transistor Q211 is connected to the emitters of transistors Q213 and Q214. The bases of the transistors Q213 and Q214 are connected to the collector of the transistor Q214 and are also connected to the set terminal S. The collector of a transistor Q215 is connected to the collector of the transistor Q213 whereas the collector of a transistor Q216 is connected to the collector of the transistor Q214. The bases of the transistors Q215 and Q216 are connected to the collector of the transistor Q215. The emitter of the transistor Q215 is connected to the collector of the transistor Q217 via a resistor R203. The emitter of the transistor Q216 is directly connected to the collector of the transistor Q217. The emitter of the transistor Q217 is connected to the output terminal 01 via a resistor R204.

The collector of the transistor Q212 on the other hand, is connected to the collector and the base of a transistor Q218. The collector of the transistor Q218 is connected to the base of the transistor Q217. The emitter of the transistor Q218, too, is connected to the output terminal 01. The emitter and collector of a transistor Q219 are connected between the output terminal 01 and the source V+. The base of the transistor Q219 is connected to the collector of the transistor Q218.

The first constant voltage circuit 10*a* constituted with the zener diode 11 and the diode 12 and the transistors Q1 and Q2 which are connected to each other at the common terminal of the current mirror portion 10*b* in the high voltage detection portion 10 of the high voltage detection circuit 250. The zener diode 13 of the second constant voltage circuit 10*c* is connected to the collector of the output transistor Q2 of the current mirror 10*b*. The output terminal 02 of the polarity inversion detection holding circuit 220 is connected to the collector of the input transistor Q1 of the current mirror 10*b*. The means for output communication 30 is constituted by the non-linear amplifier 33 shown in FIG. 10(*e*). The collector of the output transistor Q93 in the non-linear current amplifier 33 is connected to the collector of the transistor Q218, which constitutes the reset terminal R of the polarity inversion detection holding circuit 220.

One end of the output side of the photocoupler 271 constituting the means for reset input 270 is connected to the ground GND and the other end is connected to the collector of the transistor Q218 (Wired OR of the collector of the transistor Q218 is formed). In other words, the OR circuit 260 is constituted, which performs OR processing of the output signal from the transistor Q93 and the output signal from the photocoupler 271.

The structure of the non-ringing reception detection circuit is not limited to those shown in FIGS. 24 and 27 and the non-linear current amplifier 33 constituting the means for output communication 30 in the high voltage detection circuit may, for instance, be replaced by a thyristor.

Figure 28:
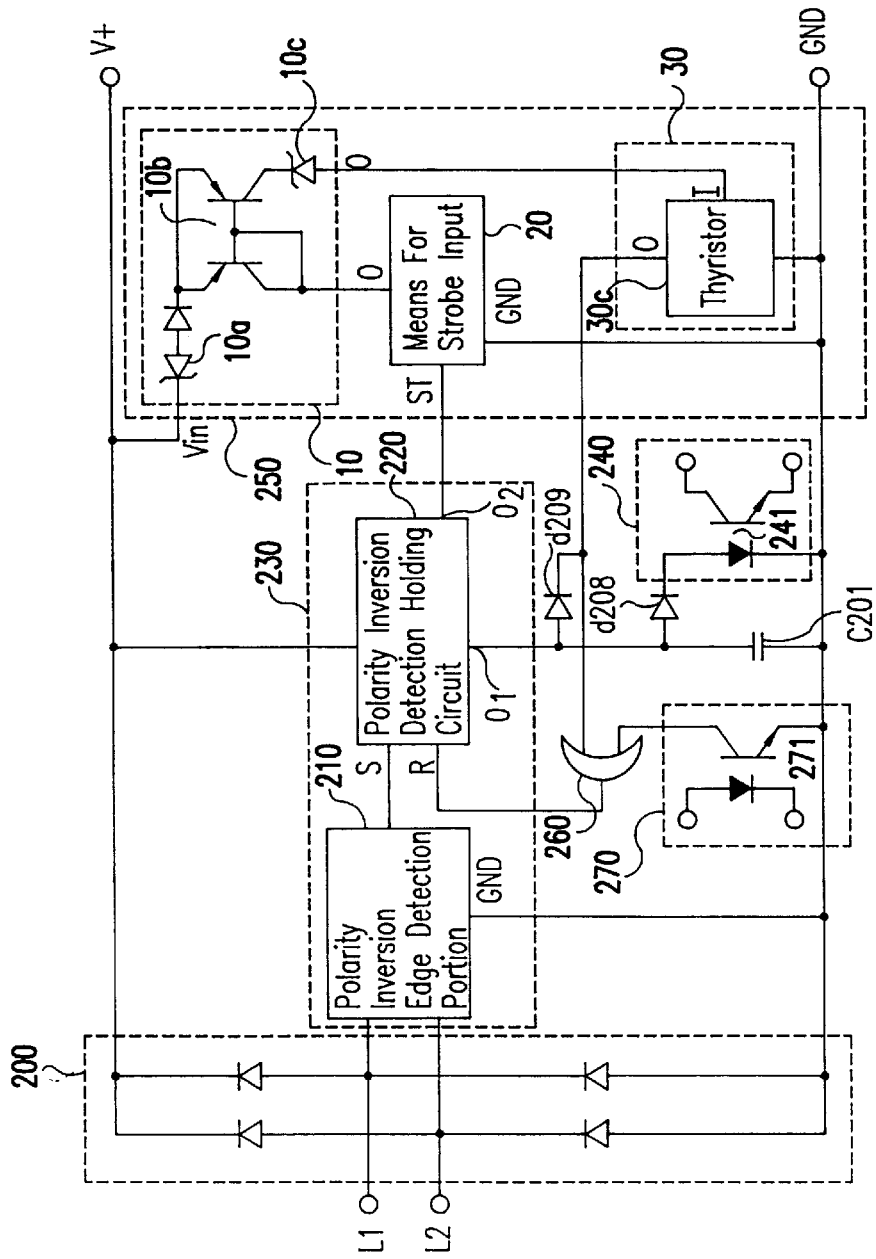
FIG. 28 is a circuit diagram illustrating a non-ringing reception detection circuit that employs a thyristor.

FIG. 28 is a circuit diagram of a non-ringing reception detection circuit employing a thyristor, with the same reference numbers assigned to elements identical to those shown in FIG. 24.

In this non-ringing reception detection circuit, the means for output communication 30 is constituted with a thyristor 30C. In addition, a level shift diode d208 is connected in series to the input terminal of the photocoupler 241 in the means for polarity inversion detection output communication 240 and, furthermore, a time constant capacitor C201 is connected in parallel between the outflow current output terminal 01 of the polarity inversion detection holding circuit 220, in which a constant current is turned on/off, and the ground GND. Moreover, in this non-ringing reception detection circuit, a diode 209 is connected between the connection point of the outflow current output terminal 01 of the polarity inversion detection holding circuit 220 and its capacitor C201 and the output terminal of the thyristor 30C to ensure that the charge at the capacitor C201 can be discharged when the output terminal voltage at the thyristor 30C of the high voltage detection circuit 250 decreases. Other structural features are identical to those shown in FIG. 24.

By setting the on delay time at the photocoupler 241, which is determined in accordance with the output constant current from the polarity inversion detection holding circuit 220, the capacitance of the capacitor C201, the input current at the photocoupler 241 and the on voltage in the circuit serially connected at the level shift diode d208, at a value sufficiently larger than $\frac{1}{32}$ (sec) which is the cycle of the bell signal, the polarity inversion information S240 (B) at the time of bell signal input can be prevented from becoming a bearded pulse with a cycle of $\frac{1}{32}$ (sec), to maintain a zero level at least while the bell signal is being input.

Figure 29:
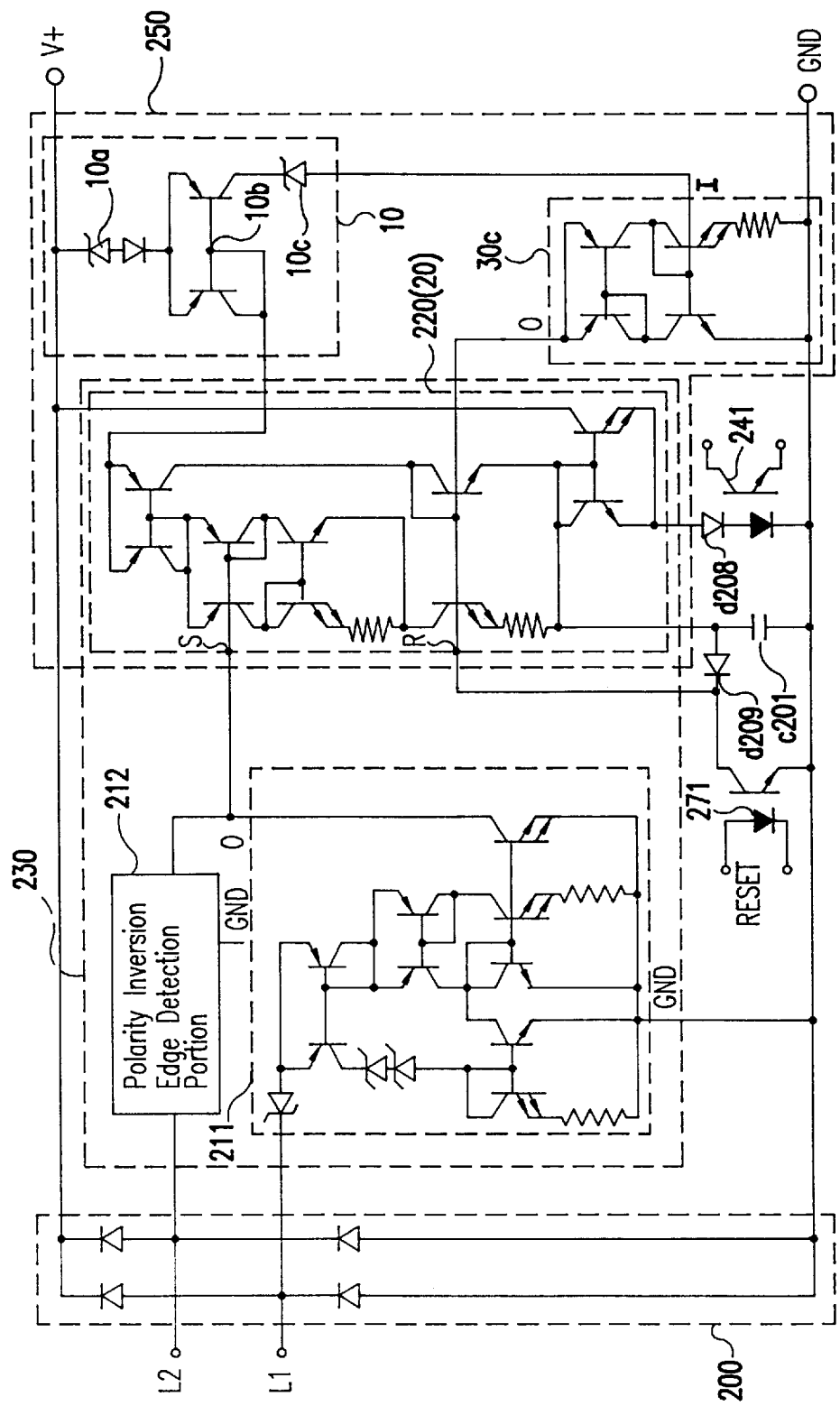
FIG. 29 is a specific circuit example of the non-ringing reception detection circuit in FIG. 28.

FIG. 29 shows a specific example of the circuit shown in FIG. 28 with the same reference numbers assigned to elements identical to those shown in FIG. 27.

When the thyristor 30C is employed as shown in FIG. 28 for the non-ringing reception detection circuit shown in FIG. 27, the circuit structure shown in FIG. 29 is achieved.

Although the structural examples of the circuit shown in FIGS. 24 and 27 through 29 do not include a response speed limiting circuit added to the high voltage detection portion 10 of the high voltage detection circuit 250, by adding one of the response speed limiting circuits shown in FIGS. 3, 4(*a*), 4(*b*), 5 and 6, a sufficient noise margin is assured while, at the same time, the detection threshold voltage Vth can be set close to the line voltage Vm in a standby state.

In addition, since the high voltage detection is essentially utilized as an edge trigger in the structural examples of the circuit shown in FIGS. 24, 27 through 29, noise constituting falling input does not cause erroneous operation. Consequently, it is advantageous to add the response speed limiting circuit shown in FIG. 5 or FIG. 6.

As has been explained, since, in the third embodiment, the non-ringing reception detection circuit is constituted by employing the high voltage detection circuit 250 provided with a strobe function which has been explained in reference to the first embodiment, the following advantages are achieved.

(c1) A non-ringing reception can be detected in a simpler structure compared to the method in the prior art in which the results of both polarity inversion detection and bell signal detection are output in the prior art and also compared to the method of slow polarity inversion detection.

(c2) While, in the method in the prior art in which the polarity inversion detection and the bell signal detection are performed independently of each other, two or more means for output communication such as photocouplers to output to an external circuit (means for output communication which separately output a polarity inversion detection signal and a bell signal detection signal) are required in the third embodiment, only means for outputting the polarity inversion information S240 or S240B is required.

(c3) While one or two capacitors are required in the slow polarity inversion detection method, presenting an obstacle to achieving higher integration. In the third embodiment, non-ringing receptions can be detected without employing a capacitor.

(c4) By achieving a structure in which a delay circuit employing a capacitor is added to the means for polarity inversion detection output communication 240 and the thyristor 30C is employed to constitute the means for output communication 30 in the high voltage detection circuit 250 to reset the polarity inversion detection holding circuit 220 and to cause the capacitor C201 in the delay circuit to discharge, the bearded pulse that would otherwise be generated at the time of bell signal input can be eliminated.

(c5) By adding a response speed limiting circuit to the high voltage detection portion 10 of the high voltage detection circuit 250, erroneous operation caused by noise can be reduced.

It is to be noted that the present invention is not limited to those presented in the embodiments described above and a number of variations are possible. For instance, as explained earlier in reference to the first embodiment, the high voltage detection circuit, which constitutes the bell signal detection circuit and the non-ringing reception detection circuit may be provided with only either one of the first constant voltage circuit 10a or the second constant voltage circuit 10c. In addition, other structures may be adopted for the polarity inversion edge detection portions 60, 210 and the like.

As has been explained in detail, in the first through sixteenth aspects of the present invention, since the current mirror portion, the means for strobe input, the means for output communication and the constant voltage circuit or the first and second constant voltage circuits are provided, a high voltage detection circuit that detects a high voltage and outputs a high voltage detection signal only while the strobe control signal is provided is achieved.

In the seventeenth through twenty-second aspects of the present invention, since the bell signal detection circuit is constituted by employing a high voltage detection circuit selected from the high voltage detection circuits in the first through sixth aspects of the present invention to ensure that a high voltage in the telephone lines is detected only after a polarity inversion occurs, a bell signal detection circuit, which does not detect high voltage noise that may be present during standby as a bell signal, is achieved. Furthermore, during an insulation test, since no high voltage detection is performed, it is possible to pass the insulation test detecting only a bell signal.

In the twenty-third through twenty-fifth aspects of the present invention, since the non-ringing reception detection circuit is constituted by employing the polarity inversion detection circuit, the means for polarity inversion detection output communication, a high voltage detection circuit selected from the high voltage detection circuits in the first through sixth aspects of the present invention, the means for reset input and the means for OR, it is possible to detect the reception of a non-ringing call with a simplified circuit that does not employ a capacitor that would present an obstacle to achieving, for instance, higher integration.

What is claimed is:

1. A high voltage detection circuit provided with a voltage input terminal, which generates a high voltage detection signal to output to an external circuit when an input voltage input to said voltage input terminal is equal to or greater than a preset voltage value, comprising:

a current mirror portion that is provided with a current input terminal through which a strobe current that has been input runs, a current output terminal through which an output current runs and a common terminal connected to said voltage input terminal, through which a current constituted of a sum of currents running through said current input terminal and said current output terminal runs, said current mirror portion generating said output current by linearly amplifying said strobe current to output from said current output terminal;

a strobe input connected between said current input terminal of said current mirror portion and a ground terminal, that generates said strobe current, supplying said strobe current to said current input terminal while receiving a strobe control signal;

a constant voltage circuit connected to said current output terminal of said current mirror portion, detecting a voltage value of said input voltage supplied via said common terminal and said current output terminal and entering a continuous state to manifest constant voltage characteristics when said input voltage is equal to or greater than said preset voltage value; and an output communication device connected between said constant voltage circuit and said ground terminal, that generates said high voltage detection signal based upon said output current from said current mirror portion input via said constant voltage circuit in said continuous state.

2. A high voltage detection circuit according to claim 1, further comprising a response speed limiting circuit that limits a response speed of said constant voltage circuit relative to a rise or a fall of said input voltage.

3. A high voltage detection circuit according to claim 1, wherein said output communication device comprises a circuit that generates said high voltage detection signal that is linear relative to said output current from said current mirror portion.

4. A high voltage detection circuit according to claim 3, wherein said circuit that generates said high voltage detection signal that is linear relative to said output current from said current mirror portion comprises a current mirror circuit that linearly amplifies said output current from said current mirror portion; or a photocoupler that converts said output current from said current mirror portion to an optical signal, communicates said optical signal to an output side, and generates from said output side said high voltage detection signal corresponding to said optical signal; or a circuit constituted by combining said current mirror circuit and said photocoupler.

5. A high voltage detection circuit according to claim 1, wherein said output communication device comprises a circuit that generates said high voltage detection signal that is non-linear relative to said output current from said current mirror portion.

6. A high voltage detection circuit according to claim 5, wherein said circuit that generates said high voltage detection signal that is non-linear relative to said output current from said current mirror portion comprises a non-linear current amplifier, a TTL conversion circuit or a relay that generates said high voltage detection signal with two values that is turned on/off in correspondence to said output current from said current mirror portion.

7. A high voltage detection circuit according to claims 1, wherein said output communication device comprises a circuit that is provided with a set terminal for inputting said output current from said current mirror portion and a reset terminal for inputting a reset current supplied said output communication device outputting said high voltage detection signal having two values and being set or reset by a current input through said set terminal or said reset terminal.

8. A high voltage detection circuit according to claim 7, wherein said circuit in said output communication device that outputs said high voltage detection signal with two values upon being set or reset comprises a flip-flop or a switching circuit.

9. A high voltage detection circuit according to claim 1, wherein said strobe input comprises a circuit provided with an input side for inputting said strobe control signal and an output side that does not DC-couple with said input side, which outputs from said output side said strobe current corresponding to said strobe control signal.

10. A high voltage detection circuit according to claim 9, wherein said circuit that outputs said strobe current comprises a photocoupler that inputs said strobe control signal to said input side whereupon said strobe control signal is converted to an optical signal to be communicated to said output side, and outputs from said output side said strobe current corresponding to said optical signal, or a relay that is turned on/off in correspondence to said strobe control signal input to said input side and supplies said strobe current output by a current source.

11. A high voltage detection circuit according to claim 1, wherein said output communication device comprises a circuit provided with an input side for inputting said output current from said current mirror portion and an output side that does not DC-couple with said input side, which outputs from said output side said high voltage detection signal corresponding to said output current of said current mirror portion.

12. A high voltage detection circuit according to claim 11, wherein said circuit that outputs said high voltage detection signal comprises a photocoupler that inputs said output current from said current mirror portion to said input side whereupon said output current is converted to an optical signal to be communicated to said output side, and outputs from said output side said high voltage detection signal corresponding to said optical signal, or a relay that is turned on/off in correspondence to said output current from said current mirror portion input to said input side to supply said output current from a current source in said high voltage detection circuit.

13. A high voltage detection circuit provided with a voltage input terminal, which generates a high voltage detection signal to output to an external circuit when an input voltage input to said voltage input terminal is equal to or greater than a preset voltage value, comprising:
  a constant voltage circuit connected to said voltage input terminal, that enters a continuous state to manifest constant voltage characteristics when said input voltage is equal to or greater than said preset voltage value;
  a current mirror portion provided with a current input terminal through which a strobe current that has been input runs, a current output terminal through which an output current runs and a common terminal connected to said constant voltage circuit, through which a current constituted with a sum of currents running through said current input terminal and said current output terminal runs, said current mirror portion generating said output current produced by linearly amplifying said strobe current to output from said current output terminal;
  a strobe input connected between said current input terminal of said current mirror portion and a ground terminal that generates said strobe current, supplying said strobe current to said current input terminal of said current mirror portion while receiving a strobe control signal and while said constant voltage circuit is in said continuous state; and
  an output communication device connected between said current output terminal of said current mirror portion and said ground terminal that is provided with a function for generating said high voltage detection signal based upon said output current from said current mirror portion.

14. A high voltage detection circuit according to claim 13, further comprising a response speed limiting circuit that limits a response speed of said constant voltage circuit relative to a rise or a fall of said input voltage.

15. A high voltage detection circuit according to claim 13, wherein said output communication device comprises a circuit that generates said high voltage detection signal that is linear relative to said output current from said current mirror portion.

16. A high voltage detection circuit according to claim 15, wherein said circuit that generates said high voltage detection signal that is linear relative to said output current from said current mirror portion comprises a current mirror circuit that linearly amplifies said output current from said current mirror portion, or a photocoupler that converts said output current from said current mirror portion to an optical signal, communicates said optical signal to an output side, and generates said high voltage detection signal corresponding to said optical signal from said output side, or a circuit constituted by combining said current mirror circuit and said photocoupler.

17. A high voltage detection circuit according to claim 13, wherein said output communication device comprises a circuit that generates said high voltage detection signal that is non-linear relative to said output current from said current mirror portion.

18. A high voltage detection circuit according to claim 17, wherein said circuit that generates said high voltage detection signal that is non-linear relative to said output current from said current mirror portion comprises a non-linear current amplifier, a TTL conversion circuit or a relay that generates said high voltage detection signal with two values that is turned on/off in correspondence to said output current from said current mirror portion.

19. A high voltage detection circuit according to claim 13, wherein said output communication device comprises a circuit that is provided with a set terminal for inputting said output current from said current mirror portion and a reset terminal for inputting a reset current, said output communication device outputting said high voltage detection signal having two values and being set or reset by a current input through said set terminal or said reset terminal.

20. A high voltage detection circuit according to claim 19, wherein said circuit in said output communication device that outputs said high voltage detection signal with two values upon being set or reset comprises a flip-flop or a switching circuit.

21. A high voltage detection circuit according to claim 13, wherein: said strobe input comprises a circuit provided with an input side for inputting said strobe control signal and an output side that does not DC-couple with said input side, which outputs from said output side said strobe current corresponding to said strobe control signal.

22. A high voltage detection circuit according to claim 21, wherein said circuit that outputs said strobe current comprises a photocoupler that inputs said strobe control signal to said input side whereupon said strobe control signal is converted to an optical signal to be communicated to said output side, and outputs from said output side said strobe current corresponding to said optical signal, or a relay that is turned on/off in correspondence to said strobe control signal input to said input side and supplies said strobe current output by a current source.

23. A high voltage detection circuit according to claim 13, wherein said output communication device comprises a circuit provided with an input side for inputting said output current from said current mirror portion and an output side that does not DC-couple with said input side, which outputs from said output side said high voltage detection signal corresponding to said output current of said current mirror portion.

24. A high voltage detection circuit according to claim 23, wherein said circuit that outputs said high voltage detection signal comprises a photocoupler that inputs said output current from said current mirror portion to said input side whereupon said output current converted to an optical signal to be communicated to said output side, and outputs from said output side said high voltage detection signal corresponding to said optical signal or a relay that is turned on/off in correspondence to said output current from said current mirror portion input to said input side to supply an output current from a current source at said high voltage detection circuit.

25. A high voltage detection circuit provided with a voltage input terminal, which generates a high voltage detection signal to output to an external circuit when an input voltage input to said voltage input terminal is equal to or greater than a preset voltage value, comprising:

a first constant voltage circuit connected to said voltage input terminal, that enters a continuous state to manifest constant voltage characteristics when said input voltage is equal to or greater than a first voltage value;

a current mirror portion provided with a current input terminal through which a strobe current that has been input runs, a current output terminal through which an output current runs and a common terminal connected to said constant voltage circuit, through which a current constituted with a sum of currents running through said current input terminal and said current output terminal runs, said current mirror portion generating said output current by linearly amplifying said strobe current to output from said current output terminal;

a strobe input connected between said current input terminal of said current mirror portion and a ground terminal that generates said strobe current, supplying said strobe current to said current input terminal while receiving a strobe control signal and while said constant voltage circuit is in a continuous state;

a second constant voltage circuit connected to said current output terminal of said current mirror portion that performs detection of an output voltage from said first constant voltage circuit supplied via said common terminal and said current output terminal and enters a continuous state to manifest constant voltage characteristics when said output voltage from said first constant voltage circuit is equal to or greater than a second voltage value; and an output communication device connected between said second constant voltage circuit and said ground terminal, that generates said high voltage detection signal based upon said output current from said current mirror portion that has been input via said second constant voltage circuit while said second constant voltage circuit is in said continuous state;

wherein, said preset voltage value is constituted of said first voltage value and said second voltage value.

26. A high voltage detection circuit according to claim 25, further comprising a response speed limiting circuit that limits a response speed relative to a fall or a rise of said input voltage at said first constant voltage circuit, at said second constant voltage circuit or at both said first constant voltage circuit and said second constant voltage circuit is provided.

27. A high voltage detection circuit according to claim 25, wherein said output communication device comprises a circuit that generates said high voltage detection signal that is linear relative to said output current from said current mirror portion.

28. A high voltage detection circuit according to claim 27, wherein said circuit that generates said high voltage detection signal that is linear relative to said output current from said current mirror portion comprises a current mirror circuit that linearly amplifies said output current from said current mirror portion, or a photocoupler that converts said output current from said current mirror portion to an optical signal, communicates said optical signal to an output side, and generates said high voltage detection signal corresponding to said optical signal from said output side, or a circuit constituted by combining said current mirror circuit and said photocoupler.

29. A high voltage detection circuit according to claim 25, wherein said output communication device comprises a circuit that generates said high voltage detection signal that is non-linear relative to said output current from said current mirror portion.

30. A high voltage detection circuit according to claim 29, wherein: said circuit that generates said high voltage detection signal that is non-linear relative to said output current from said current mirror portion comprises a non-linear current amplifier, a TTL conversion circuit or a relay that generates said high voltage detection signal with two values that is turned on/off in correspondence to said output current from said current mirror portion.

31. A high voltage detection circuit according to claim 25, wherein: said output communication device comprises a circuit that is provided with a set terminal for inputting said output current from said current mirror portion and a reset terminal for inputting a reset current, said circuit outputting said high voltage detection signal having two values and being set or reset by a current input through said set terminal or said reset terminal.

32. A high voltage detection circuit according to claim 31, wherein said circuit in said output communication device that outputs said high voltage detection signal with two values upon being set or reset comprises a flip-flop or a switching circuit.

33. A high voltage detection circuit according to claim 25, wherein said strobe input comprises a circuit provided with an input side for inputting said strobe control signal and an output side that does not DC-couple with said input side, which outputs from said output side said strobe current corresponding to said strobe control signal.

34. A high voltage detection circuit according to claim 33, wherein said circuit that outputs said strobe current comprises a photocoupler that inputs said strobe control signal to said input side whereupon said strobe control signal is converted to an optical signal to be communicated to said output side, and outputs from said output side said strobe current corresponding to said optical signal, or a relay that is turned on/off in correspondence to said strobe control signal input to said input side and supplies said strobe current output by a current source.

35. A high voltage detection circuit according to claim 25, wherein said output communication device comprises a circuit provided with an input side for inputting said output current from said current mirror portion and an output side that does not DC-couple with said input side, which outputs from said output side said high voltage detection signal corresponding to said output current of said current mirror portion.

36. A high voltage detection circuit according to claim 35, wherein said circuit that outputs said high voltage detection signal comprises a photocoupler that inputs said output current from said current mirror portion to said input side whereupon said output current is converted to an optical signal to be communicated to said output side, and outputs from said output side said high voltage detection signal corresponding to said optical signal, or a relay that is turned on/off in correspondence to said output current from said current mirror portion input to said input side to supply an output current from a current source in said high voltage detection circuit.

37. A bell signal detection circuit connected to a pair of telephone lines that detects a high voltage bell signal provided after a polarity inversion at said telephone lines to generate a bell signal detection signal, comprising:

a polarity inversion detection circuit provided with a full wave rectifier circuit that performs full wave rectification on a power feed from said telephone lines, sets a source potential and a ground potential at a voltage with a constant polarity to supply a polarity inversion edge detection portion which, upon receiving said source potential from said full wave rectifier circuit, detects an edge of a polarity inversion between said telephone lines, and a polarity inversion detection holding circuit that holds said polarity inversion edge detection information until a reset signal is provided from an external device or until said source potential supplied from said full wave rectifier circuit is cut off before outputting a polarity inversion detection signal from an output terminal: and a high voltage detection circuit with a voltage input terminal thereof connected to said source potential and a ground terminal, thereof connected to a ground potential, inputting said polarity inversion detection signal from said polarity inversion detection holding circuit as a strobe control signal and outputting a high voltage detection signal from an output communication device as said bell signal detection signal.

38. A bell signal detection circuit according to claim 37, wherein:

said high voltage detection circuit generates said high voltage detection signal to output to an external circuit when an input voltage input to said voltage input terminal is equal to or greater than a preset voltage value, and said high voltage detection circuit further comprises:

a current mirror portion that is provided with a current input terminal through which a strobe current that has been input runs, a current output terminal through which an output current runs and a common terminal connected to said voltage input terminal, through which a current constituted of a sum of currents running through said current input terminal and said current output terminal runs, said current mirror portion generating said output current by linearly amplifying said strobe current to output from said current output terminal;

a strobe input connected between said current input terminal of said current mirror portion and a ground terminal, that generates said strobe current, supplying said strobe current to said current input terminal while receiving said strobe control signal;

a constant voltage circuit connected to said current output terminal of said current mirror portion, detecting a voltage value of said input voltage supplied via said common terminal and said current output terminal and entering a continuous state to manifest constant voltage characteristics when said input voltage is equal to or greater than said preset voltage value; and wherein said output communication device is connected between said constant voltage circuit and said ground terminal, and generates said high voltage detection signal based upon said output current from said current mirror portion input via said constant voltage circuit in said continuous state.

39. A bell signal detection circuit according to claim 38, further comprising: a response speed limiting circuit that limits a response speed of said constant voltage circuit relative to a rise or a fall of said input voltage.

40. A bell signal detection circuit according to claim 37, wherein:

said high voltage detection circuit generates said high voltage detection signal to output to an external circuit when an input voltage input to said voltage input terminal is equal to or greater than a preset voltage value, and said high voltage detection circuit further comprises:

a constant voltage circuit connected to said voltage input terminal, that enters a continuous state to manifest constant voltage characteristics when said input voltage is equal to or greater than said preset voltage value;

a current mirror portion provided with a current input terminal through which a strobe current that has been input runs, a current output terminal through which an output current runs and a common terminal connected to said constant voltage circuit, through which a current constituted with a sum of currents running through said current input terminal and said current output terminal runs, said current mirror portion generating said output current by linearly amplifying said strobe current to output from said current output terminal;

a strobe input connected between said current input terminal of said current mirror portion and a ground terminal that generates said strobe current, supplying said strobe current to said current input terminal of said current mirror portion while receiving said strobe control signal and while said constant voltage circuit is in said continuous state; and wherein said output communication device is connected between said current output terminal of said current mirror portion and said ground terminal and is provided with a function for generating said high voltage detection signal based upon said output current from said current mirror portion.

41. A bell signal detection circuit according to claim 40, further comprising a response speed limiting circuit that limits a response speed of said constant voltage circuit relative to a rise or a fall of said input voltage.

42. A bell signal detection circuit according to claim 37, wherein:

said high voltage detection circuit generates high voltage detection signal to output to an external circuit when an input voltage input to said voltage input terminal is equal to or greater than a preset voltage value, and said high voltage detection circuit further comprises:

a first constant voltage circuit connected to said voltage input terminal, that enters a continuous state to manifest constant voltage characteristics when said input voltage is equal to or greater than a first voltage value;

a current mirror portion provided with a current input terminal through which a strobe current that has been input runs, a current output terminal through which an output current runs and a common terminal connected to said constant voltage circuit, through which a current constituted with a sum of currents running through said current input terminal and said current output terminal runs, said current mirror portion generating said output current by linearly amplifying said strobe current to output from said current output terminal;

a strobe input connected between said current input terminal of said current mirror portion and a ground terminal that generates said strobe current, supplying said strobe current to said current input terminal while receiving said strobe control signal and while said constant voltage circuit is in a continuous state;

a second constant voltage circuit connected to said current output terminal of said current mirror portion that performs detection of an output voltage from said first constant voltage circuit supplied via said common terminal and said current output terminal, and enters a continuous state to manifest constant voltage characteristics when said output voltage from said first constant voltage circuit is equal to or greater than a second voltage value; and wherein said output communication device is connected between said second constant voltage circuit and said ground terminal, generating said high voltage detection signal based upon said output current from said current mirror portion that has been input via said second constant voltage circuit while said second constant voltage circuit is in said continuous state, and wherein, said preset voltage value is constituted of said first voltage value and said second voltage value.

43. A bell signal detection circuit according to claim 42, further comprising a response speed limiting circuit that limits a response speed relative to a fall or a rise of said input voltage at said first constant voltage circuit, at said second constant voltage circuit or at both said first constant voltage circuit and said second constant voltage circuit.

44. A bell signal detection circuit according to claim 37, wherein: a pulse width expanding circuit that expands a pulse width in said bell signal detection signal is provided in said high voltage detection circuit.

45. A bell signal detection circuit according to claim 37, wherein said polarity inversion detection holding circuit comprises a circuit that outputs said polarity inversion detection signal, turning said polarity inversion detection signal on/off by a constant current, said polarity detection holding circuit functioning as a strobe input in said high voltage detection circuit and outputting said polarity inversion detection signal that is turned on/off by said constant current as a strobe current.

46. A bell signal detection circuit according to claim 45, wherein said output communication device in said high voltage detection circuit comprises a photocoupler that outputs said bell signal detection signal and a voltage clamping circuit that generates a clamped voltage by supplying a current output by said polarity inversion detection holding circuit, and wherein said photocoupler is driven using said clamped voltage.

47. A bell signal detection circuit according to claim 38, further comprising a photocoupler that indicates to an external device a reception of a bell signal and wherein said output communication device comprises a flip-flop provided with a set terminal for inputting said output current from said current mirror portion and a reset terminal for inputting a reset signal, said flip-flop, upon being set or reset, outputs said bell signal detection signal that is turned on/off by a constant current to drive said photocoupler with said bell signal detection signal.

48. A non-ringing reception detection circuit connected to a pair of telephone lines, said non-ringing reception detection circuit detecting a polarity inversion in said telephone lines indicating a call reception, outputting polarity inversion information to an external device and indicating reception of a non-ringing call in correspondence to a state of said polarity inversion information, comprising:

a polarity inversion detection circuit provided with a full wave rectifier circuit that performs full wave rectification on a power feed from said telephone lines, sets a source potential and a ground potential at a voltage with a constant polarity to supply a polarity inversion edge detection portion which, upon receiving said source potential from said full wave rectifier circuit, detects an edge of said polarity inversion between said telephone lines, and a polarity inversion detection holding circuit that holds said polarity inversion information until a reset signal is provided from an external device or until said source potential supplied from said full wave rectifier circuit is cut off before outputting a polarity inversion detection signal from an output terminal;

a polarity inversion detection output communication device that outputs said polarity inversion information to said external device when said polarity inversion detection signal is provided by said polarity inversion detection holding circuit;

a high voltage detection circuit with a voltage input terminal thereof connected to said source potential and a ground terminal thereof connected to a ground potential, inputting said polarity inversion detection signal from said polarity inversion detection holding circuit as a strobe control signal and outputting a high voltage detection signal from an output high voltage detection communication device:

a reset input that receives a reset input signal; and an OR circuit receiving said reset input signal provided via said reset input and said high voltage detection signal and providing said polarity inversion detection holding circuit with said reset signal.

49. A non-ringing reception detection circuit according to claim 48, wherein:

said high voltage detection circuit generates said high voltage detection signal to output to an external circuit when an input voltage input to said voltage input terminal is equal to or greater than a preset voltage value, and said high voltage detection circuit further comprises:

a current mirror portion that is provided with a current input terminal through which a strobe current that has been input runs, a current output terminal through which an output current runs and a common terminal connected to said voltage input terminal, through which a current constituted of a sum of currents running through said current input terminal and said current output terminal runs, said current mirror portion generating said output current by linearly amplifying said strobe current to output from said current output terminal;

a strobe input connected between said current input terminal of said current mirror portion and a ground terminal, that generates said strobe current, supplying said strobe current to said current input terminal while receiving said strobe control signal;

a constant voltage circuit connected to said current output terminal of said current mirror portion, performing detection of a voltage value of said input voltage supplied via said common terminal and said current output terminal and entering a continuous state to manifest constant voltage characteristics when said input voltage is equal to or greater than said preset voltage value; and wherein said output high voltage detection communication device is connected between said constant voltage circuit and said ground terminal and generates said high voltage detection signal based upon said output current from said current mirror portion input via said constant voltage circuit in said continuous state.

50. A non-ringing reception detection circuit according to claim 49, further comprising a response speed limiting circuit that limits a response speed of said constant voltage circuit relative to a rise or a fall of said input voltage.

51. A non-ringing reception detection circuit according to claim 48, wherein:

said high voltage detection circuit generates said high voltage detection signal to output to an external circuit when an input voltage input to said voltage input terminal is equal to or greater than a preset voltage value, and said high voltage detection circuit further comprises:
a constant voltage circuit connected to said voltage input terminal, that enters a continuous state to manifest constant voltage characteristics when said input voltage is equal to or greater than said preset voltage value;

a current mirror portion provided with a current input terminal through which a strobe current that has been input runs, a current output terminal through which an output current runs and a common terminal connected to said constant voltage circuit, through which a current constituted with a sum of currents running through said current input terminal and said current output terminal runs, said current mirror portion generating said output current by linearly amplifying said strobe current to output from said current output terminal;

a strobe input connected between said current input terminal of said current mirror portion and a ground terminal that generates said strobe current, supplying said strobe current to said current input terminal of said current mirror portion while receiving said strobe control signal and while said constant voltage circuit is in said continuous state; and wherein said output high voltage communication device is connected between said current output terminal of said current mirror portion and said ground terminal and is provided with a function for generating said high voltage detection signal based upon said output current from said current mirror portion.

52. A non-ringing reception detection circuit according to claim 51, further comprising a response speed limiting circuit that limits a response speed of said constant voltage circuit relative to a rise or a fall of said input voltage.

53. A non-ringing reception detection circuit according to claim 48, wherein:

said high voltage detection circuit generates said high voltage detection signal to output to an external circuit when an input voltage input to said voltage input terminal is equal to or greater than a preset voltage value, and said high voltage detection circuit further comprises:
a first constant voltage circuit connected to said voltage input terminal, that enters a continuous state to manifest constant voltage characteristics when said input voltage is equal to or greater than a first voltage value;

a current mirror portion provided with a current input terminal through which a strobe current that has been input runs, a current output terminal through which an output current runs and a common terminal connected to said constant voltage circuit, through which a current constituted with a sum of currents running through said current input terminal and said current output terminal runs, said current mirror portion generating said output current by linearly amplifying said strobe current to output from said current output terminal;

a strobe input connected between said current input terminal of said current mirror portion and a ground terminal that generates said strobe current, supplying said strobe current to said current input terminal while receiving said strobe control signal and while said constant voltage circuit is in a continuous state;

a second constant voltage circuit connected to said current output terminal of said current mirror portion that detects an output voltage from said first constant voltage circuit supplied via said common terminal and said current output terminal and enters a continuous state to manifest constant voltage characteristics when said output voltage from said first constant voltage circuit is equal to or greater than a second voltage value; and wherein said output high voltage communication device is connected between said second constant voltage circuit and said ground terminal and generates said high voltage detection signal based upon said output current from said current mirror portion that has been input via said second constant voltage circuit while said second constant voltage circuit is in said continuous state, and wherein, said preset voltage value is constituted of said first voltage value and said second voltage value.

54. A non-ringing reception detection circuit according to claim 53, further comprising a response speed limiting circuit that limits a response speed relative to a fall or a rise of said input voltage at said first constant voltage circuit, at said second constant voltage circuit or at both said first constant voltage circuit and said second constant voltage circuit.

55. A non-ringing reception detection circuit according to claim 48, wherein:

a delay circuit having a capacitor for delaying said polarity inversion information is provided in said polarity inversion detection output communication device;

said output high voltage detection communication device comprises a thyristor that outputs said high voltage detection signal; and a diode is provided between an output terminal of said thyristor and a terminal of said capacitor to discharge a charge accumulated at said capacitor during a delay operation.

* * * * *